(12) United States Patent
Katzfey et al.

(10) Patent No.: US 7,725,359 B1
(45) Date of Patent: May 25, 2010

(54) ELECTRONIC REALTY SYSTEMS AND METHODS

(76) Inventors: Jennifer Katzfey, 131 Windwood Dr., Wexford, PA (US) 15090; Frank L. Divers, 426 E. Carol Ann Way, Phoenix, AZ (US) 85004

( * ) Notice: Subject to any disclaimer, the term of this patent is extended or adjusted under 35 U.S.C. 154(b) by 282 days.

(21) Appl. No.: 11/408,593

(22) Filed: Apr. 21, 2006

Related U.S. Application Data

(60) Provisional application No. 60/674,317, filed on Apr. 21, 2005.

(51) Int. Cl.
G06Q 30/00 (2006.01)

(52) U.S. Cl. ......................................... 705/26; 705/27

(58) Field of Classification Search .................. 705/26, 705/27

See application file for complete search history.

(56) References Cited

U.S. PATENT DOCUMENTS

| | | | |
|---|---|---|---|
| 6,594,633 B1 * | 7/2003 | Broerman ...................... 705/1 |
| 6,684,196 B1 * | 1/2004 | Mini et al. ...................... 705/26 |
| 7,085,735 B1 * | 8/2006 | Hall et al. ...................... 705/26 |
| 2002/0052814 A1 * | 5/2002 | Ketterer ......................... 705/35 |
| 2002/0178087 A1 * | 11/2002 | Henderson et al. ............. 705/26 |

OTHER PUBLICATIONS zipRealty.com: Internet Archive Wayback Machine; www.archive.org; www.ziprealty.com; Feb. 8, 2004; 1pg.*

* cited by examiner

*Primary Examiner*—Robert M. Pond

(57) ABSTRACT

Systems and methods for providing an interactive electronic real estate web site. Buyers, sellers and a variety of different service providers are electronically and communicatively connected with each other to facilitate residential and commercial real estate transactions. Through the use of customized online forms, buyers and sellers are guided through the real estate transaction process through the use of a virtual real estate agent. Direct communication in the form of internal messaging and document sharing between buyers and sellers (and service providers) makes the transaction process more efficient and replaces the need for brokers and broker commissions. A timeline approach to the real estate transaction process affords efficiency and realistic expectations to the parties involved, user rewards are used as incentives for buyers and sellers to use preferred service providers.

18 Claims, 19 Drawing Sheets

FutureNet™ REALTY TECHNOLOGIES

200     Seller Registration: List Property

Improve your listing by providing as much information as possible.
Have Handy . . . Photos, Taxes & Insurance Amounts, Year Built, Maintenance & HOA Fees, Room Dimensions \* = Required Fields

Login & Password
- *Login Name:
- *Password:
- *Re-enter Password:
- *Email Address:

( Save & Finish Later )

205    Your Contact Information
- *HomeOwner Name:
- Co-Owner Name:
- click to add additional co-owners
- *Primary Phone:
  - Show this number on listing? ☐ yes
- Secondary Phone:
  - Show this number on listing? ☐ yes
- *Property Address:    Unit:
- *City:
- *State: PA ▼
- *Zip/Postal Code:
- Country: USA ▼

( Save & Finish Later )

210    General Property Information
- *List Price: $
- Property Headline to appear in listing:
- When available to show?
- Describe Property as you would like it to appear in listing:
- Exclusions:
- Inclusions:

( Save & Finish Later )

215    Directions
Enter Directions to your property here:

Property Details    220
- Year Built:    Under Construction? ☐
- Square Footage:
- Property Type: select ▼
- Style:
- Zoning: select ▼
- Property Condition: select ▼
- # Of Bedrooms:
- # Of Bathrooms: Full:   Partial:
- Parking Type: select ▼ # Of Spaces:
- Lot Size:    acres
- Lot Dimensions:
- County:
- Area/Twnshp:
- School District:    Trans? ☐
- Property Tax: $   /yr
- Insurance: $   /yr
- Maint & HOA Fees: $   /mo
- Neighborhood & Community Info:

( Save & Finish Later )

225    Interior Features
| | Dimensions | | Dimensions |
|---|---|---|---|
| Living Room: | | Master Bedrm: | |
| Dining Room: | | Bedroom 2: | |
| Kitchen: | | Bedroom 3: | |
| Family Room: | | Bedroom 4: | |
| Den: | | Bedroom 5: | |
| Game Room: | | Study/Office: | |
| # of Fireplaces: | | Basement ?: | select ▼ |

( Save & Finish Later )

Other Information
- Construction: select ▼
- Heat Type: select ▼ Cooling: select ▼
- Water: select ▼ Sewer: select ▼
- Roof Type: select ▼
- Patio Deck: select ▼    230
- Swimming Pool: ○ yes ○ no ( Save & Finish Later )

( Cancel )   ( Save & Finish Later )   ( Submit Registration )

©2005 FutureNet Realty Technologies, All Rights Reserved. -Patent Pending- Please read

FIGURE 2

Property Brochure
Cul de Sac Dream

300

309 Pepper Lane

Property #: 123456
Address: 309 Pepper Lane
Zip Code: 12345
Property Type: Single Family
Under Construction: N
Area: Johnstown
County: Portgage
Directions:

Number Of Stories: 2
Lot Size: .8 acre
Number of Parking Spaces: 2

Annual Property Taxes: $3876

School District: Johnstown City Schools
School Transportation: Y
Description: Great backyard, updated interior
Neighborhood & Community Info:

Status: Active
Price: $209,000
Property Condition:
Style: Colonial
Zoning: Residential
Date Available:
Bedrooms: 4
Baths Full: 2
Baths Partial: 1
Square Footage: 2600
Lot Dimensions:
Parking Type: 2-car attd garage
Monthly Association Fees: N/A
Annual Insurance:
Public Trans: N

Interior Features:

| | Dimensions | Level | [M=Main; U=Upper; L=Lower] | Dimensions | Level |
|---|---|---|---|---|---|
| Living Room: | 18x12 | M | Master Bedroom: | 16x12 | U |
| Dining Room: | 12x14 | M | Bedroom 2: | 14x12 | U |
| Kitchen: | 20x14 | M | Bedroom 3: | 12x10 | U |
| Family Room: | | | Bedroom 4: | 10x10 | U |
| Den: | | | Bedroom 5: | | |
| Game Room: | | | Study/Office: | | |
| Basement: | Y | | # of Fireplaces | 2 | M,U |
| Features/amenities: | | | | | |
| Unique Characteristics | | | | | |

Other Information:

Construction Type:
Floors:
Patio/Deck: Y
Heating: gas
Water:
Specific Items to be Excluded in sale:

Year Built: 1974
Roof: asphalt shingle
Swimming Pool: N
Cooling: Central Air
Sewer:

Specific items to be included in sale:

Sign In
[username]
[password] (GO)

FutureNet REALTY TECHNOLOGIES

Buy A Home | Sell A Home | Mortgages | Certified Home Program | Your FutureNet Home | FutureNet Agent Help Register With FutureNet
( Search )

Tools:
- Step-by-Step
- Community Info
- Home Valuations
- Rewards Program
- Buying & Selling
- Tips

Future Network:
- New Homes
- Foreclosures
- Mortgages
- Title Services
- Home Improvements
- Moving Services
- Insurance
- Credit Reports
- Legal Networks

Property Search  700

City: [        ]   and State: [OH]   OR Zip: [   ]
Price Range: [0] to [any]              County: [any]
Property Type: [any]   Property Condition: [Property Cond.]   Area/Township: [    ]
Bedrooms: [any]   Full Baths: [any]   Partial Baths: [any]
Square Footage: [any]   Lot Size: [any]   Street: [    ]
Age: [any]   Parking Type: [any]   Number Of Parking Spaces: [any]

( Remember My Search )
( Restore My Search )        ( Reset )        ( GO )

---

Your FutureNet Agent can memorize your searches!

Simply click the 'Remember My Search' button above to save your search settings for your next visit. You can go back to your saved search by clicking on the 'Recall Previous Search' button.

Please read Terms & Conditions

Search

Tools:
- Step-by-Step
- Community Info
- Home Valuations
- Rewards Program
- Buying & Selling
- Tips

Future Network:
- New Homes
- Foreclosures
- Mortgages
- Title Services
- Home Inspection
- Moving Services
- Insurance
- Home Improvements
- Credit Reports
- Legal Network Offer
Property #: PA3-1489
Address: 131 Windwood Dr
Listed Price: $549,000
Inclusions: all appliances
Exclusions: dining room chandelier

Get Legal Help

Buyer Information:
Buyer First Name:
Buyer Middle Initial:
Buyer Last Name:                            1505
Co-buyer First Name:
Co-buyer Middle Initial:
Co-buyer Last Name:
Phone Number:
Offer Date:

Click here To Add Additional Co-Buyers

Price, Payments, And Key Dates:
Purchase Price:
Earnest Money Deposit: ___ (suggested: 1-2% Of purchase price)  1510 (?)
Earnest Money Deposit Date: ___ (suggested: within next business day)
Approval Date of Sales Agreement by Seller: ___ (suggested: within 3 business days)
Closing Date: ___ (suggested: at least 30 days)
Title Company: please select         1515

Seller Assist:
Amount Seller Assists Toward Closing Costs: $ ___  (?)

Financing Contingency:
○ Elect Mortgage Contingency                            1520  (?)
   Amount Of Mortgage Loan:
   Mortgage Term:
   Interest Rate:
   Interest Rate Not To Exceed:
   Discount Points Not To Exceed:
   Mortgage Commitment Date:                            1525
○ Waive Mortgage Contingency

Property Inspection Contingency:
○ Elect Property Inspection Contingency                    (?)
   Days within which to complete Inspection: ___ (suggested: 15 days)
○ Waive Property Inspection Contingency
○ Elect Wood Infestation Inspection Contingency
   Days within which to complete Inspection: ___ (suggestetd: 15 days)
○ Waive Wood Infestation Inspection Contingency
   Elect Radon Inspection Contingency
   Days within which to complete Inspection: ___ (suggested: 15 days)
○ Waive Radon Inspection Contingency

Preview and Approve Offer
(Preview Seller Disclosures) — 1530
(Preview Sales Agreement) [pdf file]  — 1535
○ Approve Offer   ○ Do Not Approve Offer
Enter Initials Here: ___   Co-buyer Initials: ___          1540

(Cancel)            (Save & Finish Later)            (Submit Offer)

FIGURE 15

Seller's Action Log 1600

Property #: PA3-1489  Address: 131 Windwood Dr
Buyer: J. Sale  Status: Offer

Offer $

1605

Step 3: Offer / Negotiation
Step 4: Prepare to Close

Next Steps

| Action | |
|---|---|
| Review Offer | ☐ |
| Approve or Negotiate Offer | ☐ |
| Confirm Escrow Funding | ☐ |

To Do's

| Date | Task | |
|---|---|---|
| 09/02/05 | Review & Approve or Negotiate Offer | ☐ |

1610

Messages

| Date | Read | Subject | Reply to |
|---|---|---|---|
| 08/04/05 | ✓ | When Showing? | J. Sale |
| 08/09/05 | ✓ | Thursday At 5:30 OK? | J. Sale |
| 08/26/05 | ✓ | Saw-will offer | J. Sale |
| 08/31/05 | ☐ | Offer | J. Sale |

Documents

| Date | Viewed | Document Name | Imported by |
|---|---|---|---|
| 07/24/05 | ✓ | Appraisal | B. Smith |
| 07/26/05 | ✓ | Survey | B. Smith |
| 07/27/05 | ✓ | Inspection Report | HouseMaster |
| 07/28/05 | ✓ | Home Certification | HouseMaster |
| 07/28/05 | ✓ | Preapproval Letter | Countrywide |
| 08/31/05 | ☐ | Offer | J. Sale |

Compose Message    Continue

Return to My FutureNet Home™

FIGURE 16

FutureNet Service Providers

At FutureNet, we want to help you save money on the ENTIRE home transaction process. That's why we offer special discounts on the services that you need. Click on the company name or coupon icon [$] for details.

— Home Buying Services —

| Home Inspectors | Mortgage Companies |
|---|---|
| Brick Kicker<br>[$] 10% discount | American Mortgage Company<br>[$] discount on closing fees (varies) |
| House Master<br>[$] 10% discount | PMI Group<br>[$] discount on closing fees (varies) |
| National Inspection Services<br>[$] 10% discount | National City Mortgage<br>[$] 1 point off at close |
| Quality Home Inspection<br>[$] 10% discount | Washington Mutual Home Loans<br>[$] 1 point off at close |

1705, 1715, 1710

— Other Home Services — 1720

| Carpet Cleaning | Landscaping | Painters |
|---|---|---|
| ABC Carpet Cleaners<br>[$] $100 off 4 rooms or more | AJ's Landscaping<br>[$] $15% off | Brian Booz' Painting Co.<br>[$] $100 off |
| John Boy's Carpet Cleaning Service<br>[$] 10% off | John Jones Tree & Lawn Care<br>[$] 10% off | College Painters<br>[$] 10% off |
| Stuart's Carpet & Drapery Services<br>[$] Varying Discounts | Smalley's Lawn & Snow<br>[$] Varying Discounts | Slick Painting & Design<br>[$] Varying Discounts |

| Home Repairs | Movers | Storage |
|---|---|---|
| AA Home Repair<br>[$] 10% off | AAA Movers<br>[$] $100 off | AAA Self Storage<br>[$] $100 off* (*see details) |
| Johnny's Home Repair Services<br>[$] 10% off | John & Joe's MOVE 4 U<br>[$] 10% off in-state moves | JB's Storage Services<br>[$] 10% off one year lease |
| Handmen On Call<br>[$] Varying Discounts | Thirteen Men & A Truck<br>[$] Varying Discounts | Trenton Stores<br>[$] Varying Discounts |

FutureNet Rewards Summary

Congratulations!

You've earned $5850 in rewards for
buying your dream home with FutureNet.

Summary of Earnings:

| Company | Service | Amount |
|---|---|---|
| Washington Mutual Loans | Mortgage | $5200 |
| House Master | Home Inspection | 200 |
| ABC Carpet Cleaners | Carpet Cleaning | 100 |
| Brian Booz' Painting Co. | Painters | 100 |
| AAA Self Storage | Storage | 100 |
| Thirteen Men & A Truck | Movers | 150 |
| Total Earnings: | | $5850 |

Return to your FutureNet Home page.

FIGURE 19

ELECTRONIC REALTY SYSTEMS AND METHODS

CROSS-REFERENCE TO RELATED APPLICATION

This application claims the benefit under 35 U.S.C. § 119(e) of the earlier filing date of U.S. Provisional Application Ser. No. 60/674,317 filed on Apr. 21, 2005.

BACKGROUND OF THE INVENTION

1. Field of the Invention

The present invention relates generally to systems and methods for providing online realty services, and, more specifically, the present invention is directed to an online realty system in which a virtual advisor replaces a broker to provide comprehensive online realty services while maximizing user convenience and efficiency.

2. Description of the Background

Although ubiquitous in nature, real estate transactions are among the most complicated legal transactions that are undertaken by everyday people. Moreover, because the choice of where to live or where to set up a business is one of such high importance, it is often undertaken with a sense of insecurity that the seller is not reaching the buyer who is willing to pay the highest price, and the buyer is not locating the available property which most clearly satisfies his or her current needs and wants. Therefore, access to a high volume of property listings in an efficient manner is continually desired.

In addition to the question of access, the complicated nature of a real estate transaction is often a source of concern for both buyers and sellers of real estate. For example, many buyers/sellers have a general idea about the progression of a real estate transaction, but few have the low level, specialized knowledge about what events and actions happen at what time. This uncertainty leads to improper expectations on the parts of both buyers and sellers and often makes for an inefficient and difficult real estate transaction process.

In an effort to address the complicated nature of the transaction, most buyers and sellers utilize a real estate agent/broker that guides the buyer/seller through the process. Although most brokers are very knowledgeable and aide the process, this comes at a great price. At closing, sellers often pay at or around 6% of the sale price of the real estate property to brokers/agents for their services. Since the process is fairly standardized for these brokers, this transaction cost appears excessive, especially in more standard real estate transactions. There is a need, therefore, to provide a "virtual" real estate agent or coach that guides users through the transaction process and incorporates service providers (such as mortgage and title companies) into the process as necessary under the law and as circumstances dictate.

One way in which some of the above limitations have been addressed is through the use of online or web page-based electronic listings for residential homes. Typically, a single real estate company in a single geographic area will create bare listings about some of the properties that they are offering for sale. Potential buyers can view basic information about the properties or view a picture of the properties via a web browser. However, this traditional real estate web site provides only a very coarse initial search for a home from a limited pool of existing homes. There is no direct communication between buyer and seller. One or more brokers, being paid the requisite commissions, are utilized to facilitate the process, and the user is not much better off than in a completely "bricks and mortar" process.

There is, therefore, a great need in the art to replace the real estate agent/broker with an online realty web site incorporating a true virtual agent which manages a real estate transaction with no commissions. Moreover, service providers for everything from mortgage and title companies to movers, painters and storage companies can be incorporated into the system to provide needed moving-related services to buyers and sellers, all while providing user rewards and other advantages over the prior art to buyers and sellers.

SUMMARY OF THE INVENTION

In accordance with at least one preferred embodiment, the present invention provides systems and methods for an electronic realty web site which replaces a traditional real estate broker with a virtual agent in order to guide the buyer and seller through the real estate transaction process. The present electronic realty system removes broker/agent commissions from the real estate process and provides user rewards to both buyers and sellers for using the system as well as for selecting and using certain service providers that are partnered or associated with the system.

In general, the present invention is comprised of an electronic realty system web site which may be securely accessed (after registration) by real estate buyers, sellers and service providers via an Internet browser on a computer in a traditional manner. The web site includes databases which store all information and documents related to a real estate property listing and purchase, and the site provides access to those documents on a "need-to-know" basis. In other words, sellers will only receive information about buyers that show interest in the seller's listed properties, and service providers (e.g., mortgage companies, title companies, painters, movers, landscapers, insurance companies, etc.) will only receive buyer or seller information after they have been selected as a service provider to perform a task related to a particular real estate transaction.

The system preferably includes additional tools that automatically match buyers, sellers and/or service providers in certain situations. For example, the system may include some artificial intelligence that helps to match buyers and sellers based on "preferences" or other characteristics that have been designated by the parties. Additionally, for example in the case of mortgage and title companies, a buyer may be automatically sent to certain required service providers once a sales agreement has been completed using the system.

Sellers can use an interactive, online wizard (or other web-based "form" tool) which guides them through a user registration and real estate property listing process. Part of the listing process for the seller includes completion of state-specific required disclosures provided by the system's legal network. Once completed, these disclosures are automatically incorporated into the process as appropriate, including the offer negotiation process, where the disclosures must be approved prior to the overall sales agreement being approved. This automatic incorporation of required legal forms simplifies the process for all involved.

After creation, the seller publishes the listing electronically and can create and edit electronic (and paper) brochures related to the listing. Buyers are able to browse all available listings (not just from one particular real estate company) electronically to find one or more candidates for purchase. (It is noted that although most examples herein are directed to the "purchase" of real estate, the invention is applicable to both residential and commercial properties as well as land, and is applicable to purchases, rentals, leases, auctions and other similar transactions.)

After a buyer selects one or more properties in which he/she is interested, the web-based system of the present invention provides for direct communication (e.g., secure email in which personally identifying information about the sender is not sent with the messages) between the buyer and seller so that the parties can get close to agreement without the need for a broker. In effect, the interactive knowledge of the system virtual advisor guides both buyer and seller through the process. Using the messaging capabilities, the buyer can ask additional questions about the property and/or schedule an appointment to view the property.

Once a specific property is selected for purchase, a buyer, again guided by the system, can use an interactive online form to prepare a sales agreement and send it to the seller electronically. The seller can review the offer, accept or reject it, or even modify the offer and send a counteroffer back to the buyer. This direct and open communication between the buyer and seller with the aide of the virtual advisor replaces much of the traditional broker process. Additional system capabilities may include the ability to rescind an offer, addend an existing sales agreement, or terminate an agreement.

Moreover, documents related to the real estate transactions (such as home certifications, inspection reports, and the like) are electronically uploaded and managed on the system, and access to these documents is controlled to only those buyers, sellers and service providers that need access or have been specifically given access to a particular document by that document's owner.

After general agreement as to the terms of the sale, various service providers to complete the purchase are automatically presented to the user for selection (e.g., via linked information about each provider). In the case of certain required service providers, such as mortgage and title companies, the buyer may be automatically directed to these companies after completion of the sales agreement.

Ancillary providers such as movers, painters and storage companies may also be selected from the system. Preferably, these providers have paid a subscription or other fee to the system in order to be listed on the system, and only these "approved" service providers are available. From this point on in the process, the selected service providers also gain access to that information (e.g. uploaded documents and messages) that are related to the transaction to which they have been selected. These service providers aid in the closing on the property, and both the buyer and seller earn and redeem user rewards at closing.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein:

FIG. 2 shows an exemplary seller registration and property listing web page;

FIG. 3 shows an exemplary electronic property brochure describing a seller's property;

FIG. 7 shows an exemplary property search page;

FIG. 12 shows an exemplary seller action log screen which tracks all information related to a sales process;

FIG. 15 is an exemplary online interactive offer sheet;

FIG. 16 shows an updated seller's action log screen;

FIG. 17 shows one exemplary embodiment of a system web page form which a user of the system may select service providers associated with the property sale and related move;

FIG. 18 shows an updated buyer property action page; and

FIG. 19 shows an exemplary user rewards summary page.

DETAILED DESCRIPTION OF THE INVENTION

Figure 1:
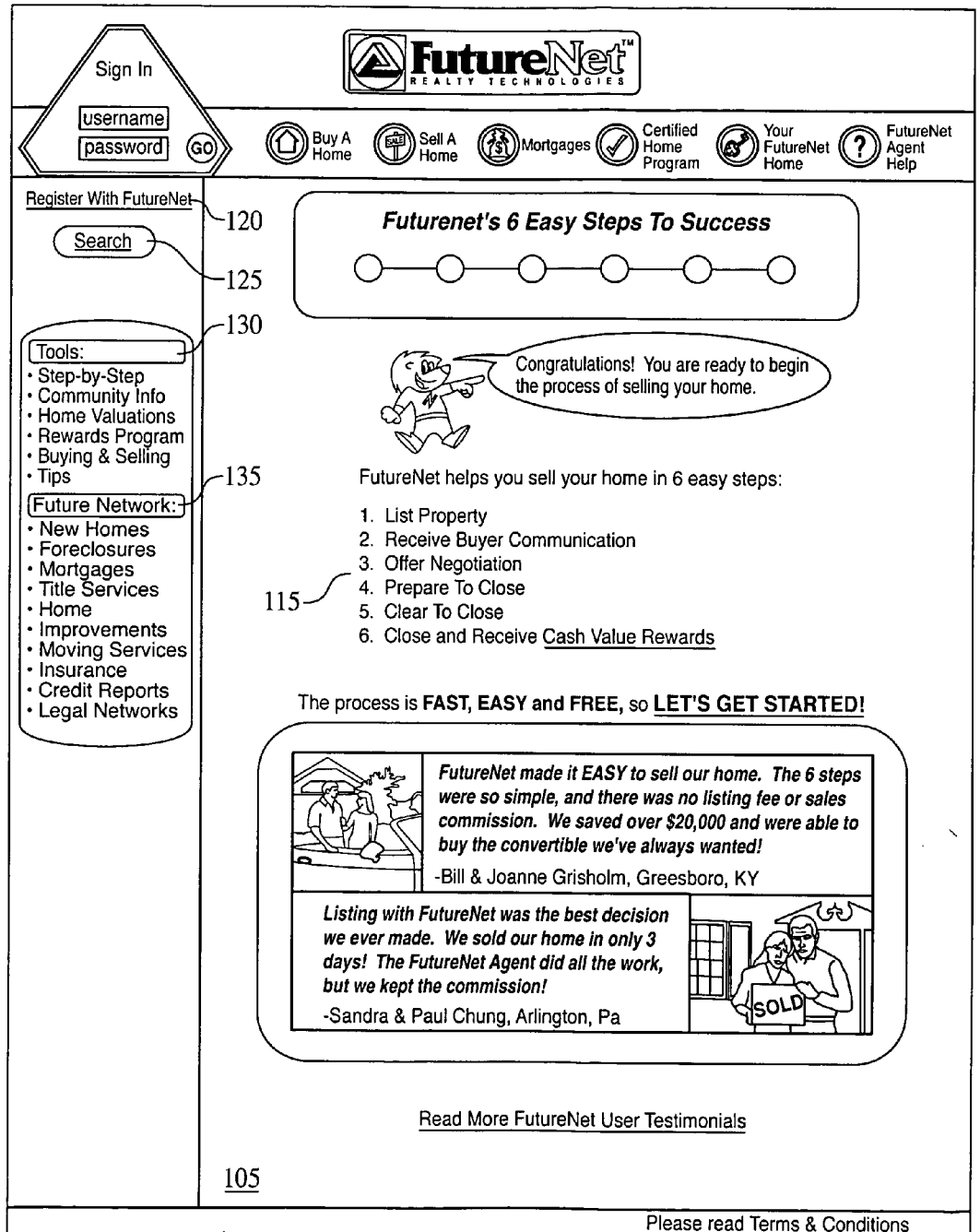
FIG. 1 shows an exemplary seller's landing web page for a seller of real estate in the present system.

It is to be understood that the figures and descriptions of the present invention have been simplified to illustrate elements that are relevant for a clear understanding of the invention, while eliminating, for purposes of clarity, other elements that may be well known. Those of ordinary skill in the art will recognize that other elements are desirable and/or required in order to implement the present invention. However, because such elements are well known in the art, and because they do not facilitate a better understanding of the present invention, a discussion of such elements is not provided herein. The detailed description will be provided herein below with reference to the attached drawings.

The present invention, in at least one preferred embodiment, provides an electronic realty system that uses the Internet to connect buyers, sellers and service providers to each other to aid efficient and cost effective real estate transactions. As described more fully below, buyers and sellers can register and log onto the system web pages to buy and sell real estate properties (either commercial or residential properties and/or land), as well as facilitate other transactions such as rental, lease, auctions and the like.

Overseeing the entire process is a "virtual" real estate agent that, through the use of prompted information, look-up and pre-populated forms, guides both the buyer and the seller through the real estate transaction and aids these parties in obtaining appropriate service providers (e.g., mortgage lenders and title companies) to complete the closing according to state and national legal requirements. In providing this information and these forms to the parties, the system automatically accounts for these national, state and/or local laws and only provides "advice" that is applicable based on jurisdiction.

At its core, the system provides online forms with pre-populated data or drop down (or other) menus that guide the parties into providing the appropriate information to the site. For example, after registration, a property seller will be presented with a form to create an online listing of their property, with the form automatically tailored to the type of property for sale and the jurisdiction(s) involved. Buyers use online search tools to locate one or more properties that may be suitable for their current property needs (or some type of artificial intelligence based on buyer preferences may be used to automatically match a buyer to a listed property).

After this preliminary match is made, the system provides direct, but non-personally identifiable, communication between buyers and sellers (and later to service providers) for the purposes of asking initial questions about the property, scheduling property showings and other meetings, making and negotiating offer sheets, and closing on the property. This direct communication facilitates a streamlined process in which buyers and sellers can work through many of the issues associated with such a complex transaction or determine at an early stage that no agreement will ever be reached. Through this feature, the knowledge gathering and negotiating processes are made more efficient when compared to traditional processes.

The invention also facilitates the efficient and comprehensive sharing of applicable documents (e.g., home inspection report and home certification) between the parties. A buyer or seller can upload important documents to the system which then allows for the management and selective access of the documents via electronic publishing. Access to the documents is restricted to only those buyers and sellers (or later service providers) that need access to the documents to maintain confidentiality. Owners of the documents can also modify or even remove the documents from the system if they show choose, and all changes occur automatically. Owners of documents can further allow additional access to a particular document, or restrict its access, as in the case of a buyer pre-approval letter. For example, a buyer may show this to all sellers, or just particular sellers. These preferences can be modified at any time by the document owner.

After a tentative agreement is reached, the system prompts the parties to select applicable service providers such as mortgage lenders and title companies (typically required for a transaction) or optional ancillary providers such as moving companies, storage facilities and insurance companies. The buyer and seller utilize the service providers to finalize the closing on the property, and all interactions, messaging, notifications, and document sharing and distribution occurs over the Internet through the secure web site. The system, therefore, enables an entirely paperless transaction, reducing the issues raised by poorly legible documents. All documents in the system will be electronically signed by all applicable parties and automatically sent to the appropriate service providers.

At closing, the system provides an accounting of user rewards that have been earned by the buyer and the seller based on their activity with the electronic real estate system and their use of service providers. These user rewards include the savings on broker commission fees and all closing discounts/rebates that are associated with the use of each particular service provider.

While using all of the functionalities described above, one key to the present invention is the presentation and use of a timeline which guides users (buyers, sellers, renters, lessees, leasors, etc.) through their respective processes. The timeline acts as a sort of checklist that guides the users through the transaction process and tracks the completion of tasks as they occur. At all times, users can visually see what the "next steps" involved in the process are, and can see where in the overall transaction process they currently reside. Moreover, "contract actions" are tied into the timeline process to provide reminders and deadlines to perform certain required tasks.

In more detail, "next steps" are the information pieces within the system that move the user form one point in the process to the next, in an analogous way to how a real estate broker/agent would guide a user through the process. The next steps that are shown graphically on the timeline (and described in more detail below) detail what steps must next be undertaken by the parties (e.g., conduct a pre-settlement walk through) so that the users follow an appropriate process and can plan their actions in advance. Not only will the system prompt you to perform a certain action at the appropriate point in the transaction, but the system will also facilitate completion of the action (e.g., the system will allow the buyer to schedule the appointment for that walk-thru directly with the seller).

Likewise, "contract actions" relate directly to dates in the contract and serve as reminders to ensure that buyers never miss important dates, like home inspection dates. The system will also send automatic reminders of these dates to the buyers to ensure they are not missed. Once an action has been completed, the appropriate service provider will upload a corresponding document (e.g., home inspection report) or message which will mark the task complete on the timeline. In the drawings these are known as "To Do's"

Users can also mark certain non-service provider related tasks complete, and can look back at past tasks within the timeline at any point. Timeline tasks are linked to either help relating to the task itself, or the ability to perform the task itself (e.g., the "get pre-approved" step would link to the pre-approval application form). The use of the timeline task list, along with all of the other interactive features of the present invention, greatly improves the efficiency and success of traditional processes.

Exemplary Usage of the System

The detailed description and summary of invention above have set forth a general description of many features and embodiments of the present invention. Below, several examples of use of one particularly preferred embodiment of an electronic realty system according to the present invention are provided to more particularly show and describe the invention. The following description is exemplary and is not intended to limit the present invention to a particular orientation or structure.

Moreover, although the following description is keyed to non-commercial users buying and selling residential property, it is noted that the present invention is equally applicable to commercial property transactions, as well as an almost limitless variety of other transactions. The only required change to the system from that which is presented herein is the alteration of the databases used with the site and the questions asked/features available to the user. To be sure, commercial users of the system could equally benefit from the streamlined and ordered electronic realty system according to the present invention.

For example, in a rental or lease situation, the buyer's activities related to searching for and selecting a property may be very similar, but the sales agreement process will be replaced with a process related to the completion of a rental agreement or lease. The legal requirements/disclosures related to a lease or rental agreement may differ from that of a property sale, and the system gathers information appropriate to these types of agreements from the sellers and buyers during the transaction completion process. Using the same underlying methodology, an almost limitless variety of transactions can be facilitated, all within the scope of the present invention as recognized by those skilled in the art.

Seller Listing and Brochure

FIG. 1 shows one exemplary main web page 100 to be used by sellers of real estate property ("seller landing page") according to a methodology including no commissions, user rewards at closing and enhanced data and time management features, all within an efficient six-step process. FIG. 1 also sets forth many of the various features and functionalities of a preferred embodiment of the present invention.

In the main window 105 of the seller landing page 100, the efficient six step process 115 for selling a home on the system is provided. Generally, these steps 115 include: (1) listing a property for sale; (2) receiving communications from buyers related to a property listing; (3) offer negotiation; (4) closing preparation; (5) close clearance; and (6) closing and receipt of system user rewards. The electronic realty system guides the user through these steps while setting forth and tracking reasonable timelines and work lists that provide the user with reasonable expectations for completing the selling process. Each of these steps, along with beneficial features associated with those steps, is described in more detail below.

The seller landing page 100 of FIG. 1 preferably also includes a link 120 to enable a seller to register on the system, a search button 125 to allow a seller to search the site to find relevant information, a series of tools 130 that aide in the property listing/selling process, as well as links 135 to the realty "network" which provide links to important information and partners to be used in the selling process, such as information on mortgages and title services, insurance, credit reports, and the law.

The seller landing page 100 of FIG. 1 may also include information comparing the electronic realty system to the traditional bricks and mortar realty process including a description of the cost savings (no commissions), time savings and benefits of user rewards. The seller landing page may also include links to testimonials of past sellers who used the electronic realty system and/or other additional information.

The first step in using the electronic realty system is to register as a user of a system and list a property for sale. As either a stand alone user registration page or as a combined user registration/property listing page 200 (see FIG. 2), a potential seller preferably registers for the system in a manner well known among online systems. For example, the seller preferably selects a username/password and provides relevant contact information about herself (e.g., name, address, phone, email address) 205.

To list a property, a new or registered user simply fills in an electronic form (200) that guides a seller through the process of providing the information that satisfies all legal requirements as well as providing the most useful information about a real estate property to a potential buyer. For example, the listing information may be broken up into several categories such as General Property Information 210, Directions 215, Property Details 220, Interior Features 225, and Other Information 230. By filling in this electronic form (200), or by selecting from pre-provided choices form the site, a seller can quickly but comprehensively put together the necessary data and information to allow the system to present her house to potential buyers.

Although the information may be different than the exemplary form (200) shown in FIG. 2, the General Property Information section 210 may include an overall view of the property such as property address, list price, a property "headline" to appear in the online listing, a timetable/availability for showing the property to buyers, a freeform description of the property, and inclusions/exclusions associated with the property. Additionally, directions to the actual property may also be entered into the system, as well availability for the seller (e.g., when the property is available to be shown), which the seller can modify instantly and often.

In the Property Details section 220, the seller is prompted to enter more detailed information about the property such as information related to the size of the house and the year it was constructed, the zoning and condition of the property, the size and dimensions of the lot upon which the house is built and information related to financial considerations (e.g., property taxes, insurance and any relevant maintenance and HOA fees. In short, the Property Details section 220 provides the opportunity to provide useful information about the property to the electronic realty system to be used in constructing the listing.

An Interior Features section 225 of the seller listing forms preferably includes entries to provide dimensions of each of the rooms of the house. This may include brief descriptions or options of some or all of the rooms of the property, such as whether a basement is finished/unfinished or whether a garage is attached/unattached/integral to the house. Likewise, the Other Information 230 section may include general interior/exterior features about the property such as the type of heating/cooling systems, the type of sewage and water systems used by the house, the roof type and the existence/size of any patio or deck.

In all, the seller registration and listing page 200 provides a convenient and ordered approach to facilitating the entry of information relevant to listing a house on the site. The examples of information provided are not limiting but represent commonly required or necessary information that buyers expect to see in a listing. The process of filling out this listing form 200 may be accomplished over a series of site visits (save and finish later). Upon completion of the form 200, the seller (at this point a potential seller) selects "submit registration" in order to electronically send the property listing information to the databases of the electronic realty system. In large part, this completes the first of the six step seller process (115).

The electronic realty system also preferably presents sellers with additional options to make the property listings more attractive to potential buyers. For example, the system may aid the seller in procuring a home certification to put buyers at ease about undetected defects in a home. Moreover, the system allows the seller to upload photographs of the property (both exterior and interior) in order to more fully inform a buyer about the property. Likewise, the system preferably allows a seller to upload other documents related to the listing, such as appraisals, surveys, and/or tax records. As documents are uploaded to the system, the system tracks all of the documents that have been provided, including the date and document owner, and allows the document owner to choose whether or not these documents should be published to potential buyers. This system document management functionality aids the seller in organizing and tracking important documents while at the same time giving the seller the flexibility to share certain information with potential buyers in an efficient manner.

Finally, the system allows a seller, throughout the sales process, to view and modify the electronic listing and to create/modify a detailed custom brochure about the property. This customizable and detailed information create a more interactive and beneficial environment for potential buyers and, therefore, allow sellers to more quickly sell their properties. These brochures can be customized by sellers and printed or emailed by any interested parties.

FIG. 3 shows an exemplary electronic property brochure 300 created by the system after all of the above information/documents have been entered into the system. Preferably, the seller may select from either a standard or custom property brochure with increasing levels of information provided to the user. The seller may create the brochure using an interactive "wizard" that queries the seller as to what information he/she would like to include in the brochure and what format the brochure should take (e.g., selected from a series of popular styles). Moreover, the seller can continually preview and update the brochure to respond to user feedback or as information changes. For example, the brochure may include secondary photographs, neighborhood and community information, directions and open house times.

The exemplary property brochure 300 of FIG. 3 highlights many of the important optional features of the brochure. For example, the brochure indicates whether the home in this listing has been certified, and the seller has provided a wide variety of full color photographs 305 of the property. The information from the registration and listing web forms (200) (see FIG. 2) is then organized and presented throughout the remainder of the property brochure. This brochure may be printed out by potential buyers (or sent to them) as well as provided to them online.

Figure 4:
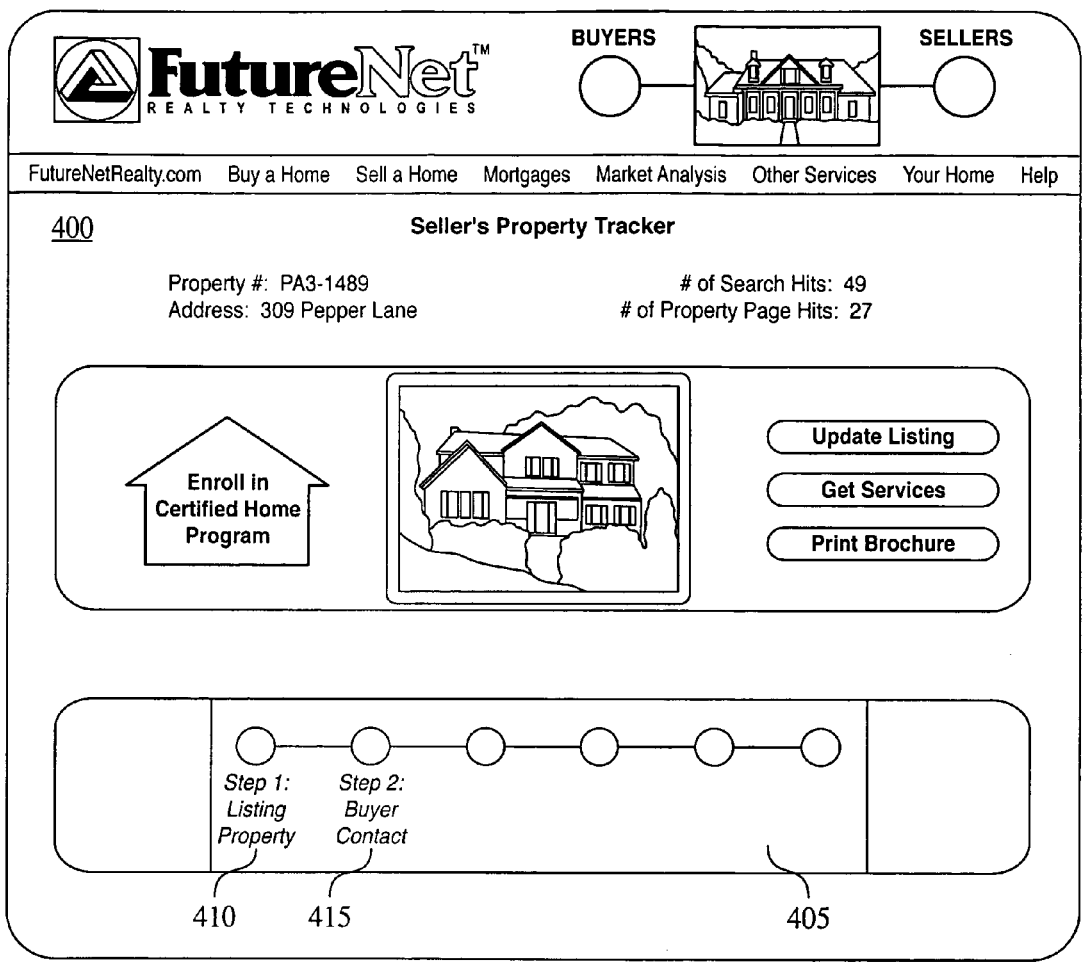
FIG. 4 shows an exemplary early stage seller property tracker web page.

After the listing process is complete, FIG. 4 provides an early stage seller property tracker web page 400. The seller property tracker provides a convenient base from which a seller can find information about his/her listing (and potential buyers' viewing of that listing) while at the same time being presented with a timeline 405 of where the seller is along the continuum of the six step process. This timeline, with its informative "next steps," is an important attribute of the present invention. As the seller moves through the various web pages of the system, the seller is always able to view their progress in the process in an overview format (step 2 of 6) as well as a detailed task level. The whole process (and the seller's current position within that process) is graphically shown to buyers and sellers at all times, allowing the system to act as coach or virtual agent to walk the user through the process.

More specifically, the upper portion of the seller property tracker page 400 (FIG. 4) may provide a link to user support and then shows a high level view of relevant information about a listed property. For example, the property listing number and address are provided right alongside a tracker that presents a variety of information related to the activities of potential buyers, such as property views, interested buyers, etc.

In more detail, property views are buyers that have viewed or "clicked" on the seller's property. Interested buyers are buyers who have added a seller's property to their watch list of properties. These potential buyers may be simply watching the property, which allows them to receive updates when the status of the property changes (e.g., under contract, price reduction, etc.). These interested buyers may also be holding a property to remember it, drive by, map, etc. Interested buyers are also buyers who have taken a further interest in the property by making contact with the seller or even making an offer on the property. All of these buyers are specifically identified to the seller by the step they are on in the process. A buyer watching a home would be denoted on step 1, a buyer who has contacted a seller (sent a message, with a question or appointment to see the property) would be denoted in step 2, buyers who have made an offer would be denoted in step 3 and so on.

This highly detailed buyer "interest" information is important feedback to the seller about the effectiveness of the seller's current listing/brochure and whether the list price may be too high or too low. The seller property tracker 400 of FIG. 4 also includes the primary photograph of the property along with links to view and update the listing. From this page, a seller can also print out a hard copy of the brochure or obtain additional services from the site. As one part of these additional services, the system will have links to a variety of service providers, ranging from home valuations (automated and traditional appraisals), certified home offerings, property preservation services, as well as other service provider offerings (e.g., home inspection, carpet cleaning).

At the heart of the functionality of the present system, the lower portion of the seller property tracker page provides the six step timeline 405 for selling a property on the electronic realty system and specifically provides an indication of where this seller resides along that timeline and an indication of next steps. In the present case, step 1 (listing the property) 410 has already been accomplished, and the seller is currently awaiting step 2 (buyer contact) 415. In this way, at the same time that the seller is presented with useful information related to the listing itself, the seller is constantly reminded about the sales process as a whole (and specifically at what stage the seller is currently engaged). Moreover, each of the steps in the seller timeline is preferably linked to information related to that step (or a future/next step). For example, the seller could click on the next step in the timeline and be presented with detailed information related to that step, including what is involved in completing the step and links to accomplishing each particular step (e.g., setting an appointment through the messaging capabilities of the system). In this way, the user (in this case the seller) is prepared for the future and has reasonable expectations about the remainder of the sales process.

Figure 5:
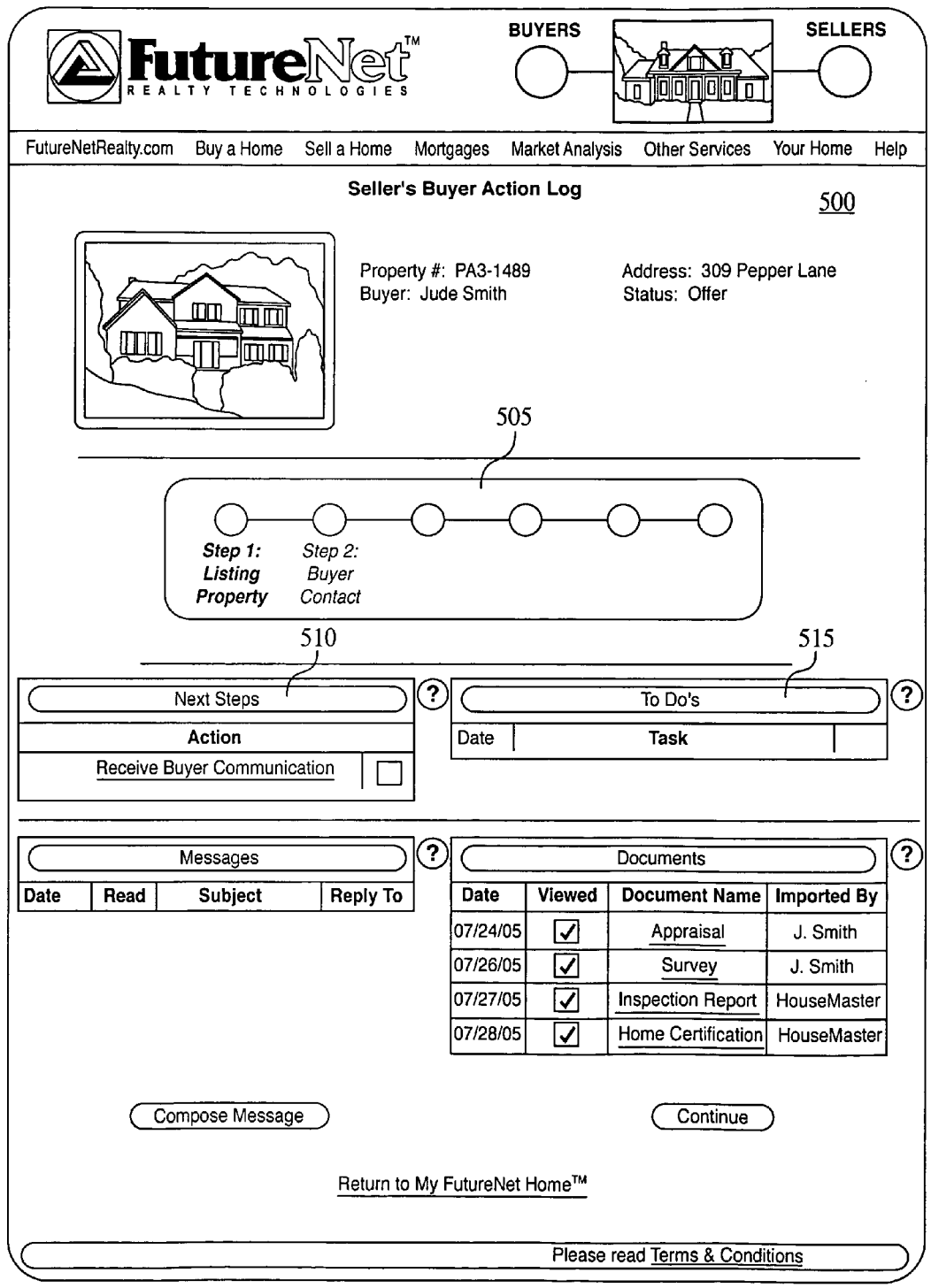
FIG. 5 shows an exemplary seller action log page.

FIG. 5 shows an exemplary seller's action log page 500 which shows the major functionality of the present invention. In FIG. 5, the overall timeline 505 of the seller process (which is altered depending on the type of transaction and type of property involved) is shown. Completed (past) steps are shown in the timeline along with current and future steps so that the seller is constantly reminded of where they are in the overall transaction process. Moreover, the seller's action log page also shows the "next steps" 510 and "To Do" list 515 along side this overall timeline. As described above, the next steps 510 alerts the seller about what is the next step in the overall process, and clicking on this next step provides a detailed view of what is necessary to complete the task as well as links to help facilitate the completion of the task. Likewise, the To Do list 515 provides a list of tasks that must be accomplished by the seller.

Unlike with traditional agents/brokers, users will have consistent experience with the present invention. The users will always be prepared for and informed about what the remainder of the transaction process entails, and the system uses pre-populated forms to make sure that no information or required task is ever left out. For example, all forms will be complete, because the system will not identify the task of completing the form as being successful if some of the form is not complete. The present invention not only informs users more than the traditional process, but better prepares and enables these users to complete each of the required tasks in a timely and efficient manner. The virtual agent "coach" enables these advantages at every stage of the process. This feature also serves to protect home buyers and sellers, as omitting information on a disclosure could pose legal consequences.

Buyer Registration and Search

Figure 6:
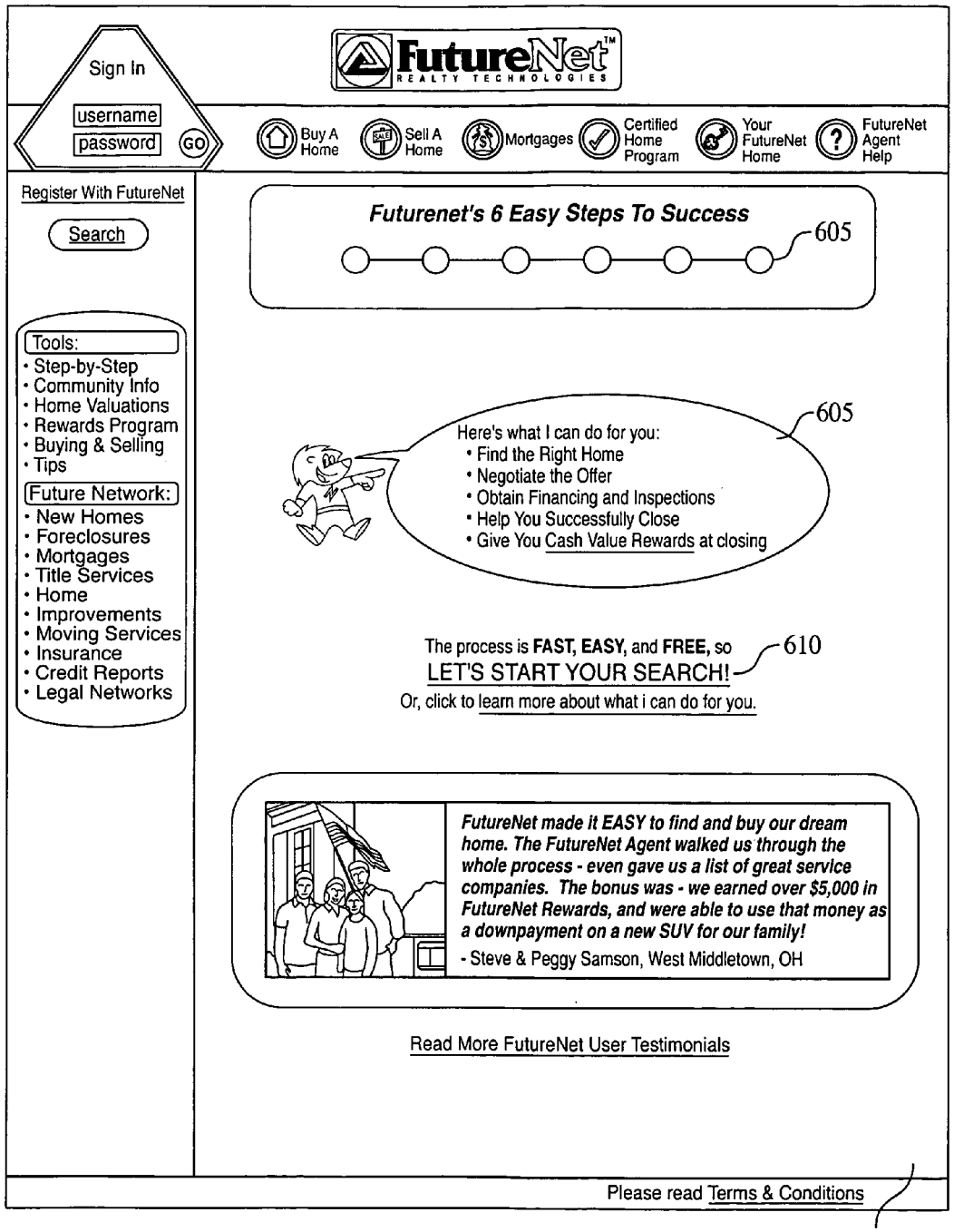
FIG. 6 shows an exemplary buyer landing web page from which the buyer process commences.

From a potential buyer's perspective, FIG. 6 shows an exemplary buyer landing page 600 from which the entire property buying experience stems. Note that the buyer landing page 600 has a very similar look, feel and information when compared to the seller landing page of FIG. 1. As with the seller process, buying a property is also guided by a six step process 605 that efficiently provides all of the information and tools that a buyer will need to successfully locate and procure the right property.

Specifically, the six step seller process 605 includes: (1) finding a property (parallel to the seller's listing of a property); (2) contacting a seller; (3) negotiating an offer on the property; (4) preparing to close on the property; (5) clear to close; and (6) closing on the property and receiving user rewards. In the buyer's case, however, it is likely that the user would like to "try out" the system by searching for a home before going through the formal registration process and saving information to the system. Therefore, the buyer landing page preferably includes a link to begin a search 610 for a property that interests the buyer as well as links to buyer testimonials, registration, site search, tools and ancillary providers, in the same way as the seller landing page. Moreover, the system preferably informs the potential buyer (and potential user of the system) about the benefits of registering for the system, including: instant notification of new properties that meet their search criteria, direct communication with sellers, online property negotiations and listing change reminders, property comparisons, and commission free purchases with user rewards. At this point, an unregistered buyer may search for a property or choose to immediately register for the system.

Whether registered or unregistered, FIG. 7 shows an exemplary property search page 700. The property search page 700 provides a potential buyer with an interactive online interface to easily drill down through selection criteria in order to locate the property (or properties) which best suits the buyer's needs. For example, the buyer may initially choose whether they are searching for a residential or commercial property. The buyer also preferably selects a price range and location for the property (either by zip code, state, county, city or any combination of the above). As part of a standard search, the buyer may also select a required number of bedrooms and full/partial bathrooms. At this point, a user may initiate a search ("GO" button), save the search for later or enter additional detailed search criteria in an advanced search section of the property search page.

If a potential buyer has more defined requirements for a property, the advanced search functionality provides a way for the buyer to drill down to more specific applicable properties. For example, the advanced search portion of the exemplary FIG. 7 may allow a buyer to enter additional property types, conditions, square footage, lot size, parking requirements or an almost limitless variety of other relevant details. In this way, the property search tools of the present invention can be as coarse or as fine as a buyer requires, and the system is therefore automatically adaptable to a wide variety of users.

Again, this part of the system can be modified depending on whether the user is interested in buying, renting or leasing a property. Moreover the user may only be interested in participating in an auction for a residential or commercial property or land. Buyers can also search by property condition. Specifically, sellers rate their properties during the listing process from "new" to "complete rehab," with various conditions in between. In this way, buyers can be more specifically matched to properties meeting their criteria. For example, an investor might only be looking for a complete rehab, but a first time home-buyer might be looking for a fixer upper or a dated home in good condition. The tools of the present invention can be modified to account for all of these characteristics.

The buyer search section of the system may also utilize artificial intelligence to refine the search process. For example, as a user searches and builds preferences over time, the system will become "smarter" as a user views then selects certain properties by tracking the selections made by the user. This process can be improved as seller and buyer feedback is harnessed. The system can track any and all search criteria, as well as any database item. System (artificial) intelligence can then be used to refine searches for current and even past users. In this way, a homeowner who purchased a home with the system in the past will have a better experience in the future as the system will be aware of user preferences and may be able to reduce search time and number of houses physically viewed and inspected significantly. The system will also allow a user to relist a property—as in the case of a seller who is transferred and must move in 6 months. All of their paperwork is now here, in one place, and it is an easy process to relist.

Matching buyers and sellers based on their motivations is also important. Search criteria may preferably include a seller's anticipated move date (immediate to 3 mo, 6 mo, etc) which can be used to indicate a seller's urgency and motivation. Motivated buyers and sellers can be matched by the system to facilitate a quick sale. Moreover, buyers may be prompted to provide feedback to sellers after viewing their property. This feedback can be freeform or can be selected from a series of system responses (price is too high, out of my price range, condition is not what I expected, etc.) which will also be used in the matching process. In the world of traditional agents, this is a hope of most sellers—that their agent will be working with a buyer, will know their preferences and will then show the particular buyer their home, facilitating a match. In actuality, there is no process (universal) that allows this to occur. Agents work with a very limited group of buyers and sellers and are further limited by the geography they cover and cannot conceivably know each buyer's preferences and each home on the market. The present invention accomplishes this and more on a global basis.

Figure 8:
FIG. 8 shows an exemplary search results page in which three properties were located on the system which satisfied a buyer's requirements.

As the process continues, FIG. 8 shows an exemplary search results page 800 in which ten properties (first five are shown) were located on the system which satisfied a buyer's requirements. The search results page 800 provides a compact view of each of the properties including photographs 805 and important details 810 of each specific property so that a potential buyer can easily compare these important attributes (such as whether the home is certified, the list price and number of bedrooms/baths). They can also see which homes have upcoming open houses. Moreover, a buyer can select to view more details 815 of any or all of the search results with a single mouse click for each listing. Preferably, selecting to view more details will take the user to the property's "brochure" page. As described above (see FIG. 3), the electronic brochure provides a detailed look at all of the relevant characteristics of a listed property and provides a potential buyer with various photographs of the listing. When this page is viewed, the seller who listed the page will be provided notice that his property is being viewed, for example in the Seller Property Tracker web page (see FIG. 4). The search results page may also include a link to "compare" a selected subset of search results in a side-by-side manner. This comparison feature preferably gives the seller a detailed picture of each property and their attributes, including number of bedrooms, square footage, and even financing considerations through display of the mortgage calculator.

Preferably, when a potential buyer (registered or unregistered) views a property brochure, the brochure also includes additional information that may be relevant to a buyer. For example, at the side of the web page (outside of the brochure itself), the property details page (e.g., the electronic brochure)

preferably includes a link to a system partner which provides pre-approval to a buyer (which may be an important bargaining tool later in the property-buying process. Moreover, the property details page may include a simple mortgage calculator which offers the buyer details about approximate monthly payments for various types of mortgages (e.g., 15/30 year fixed, 5-1 ARM, and 10/30 interest only) based upon the list price, current mortgage rates, and a user defined percentage of list price put as a down payment. It also includes taxes, insurance and any homeowners' association fees or dues specified by the seller, allowing a true cost comparison of similar properties.

At this point, a potential buyer has seen the advantages of the present system over traditional paper and electronic realty systems, and the user will select to register with the system. Similar to the seller registration page (see FIG. 2), a buyer registers by providing a username and password, an email address, and certain demographic or contact information such as name, phone number and address. In a preferred embodiment, a user can choose to be pre-approved for a mortgage during this registration process. After registering, the user can take advantage of the complete electronic realty system and track the property buying process from beginning to end.

Figure 9:
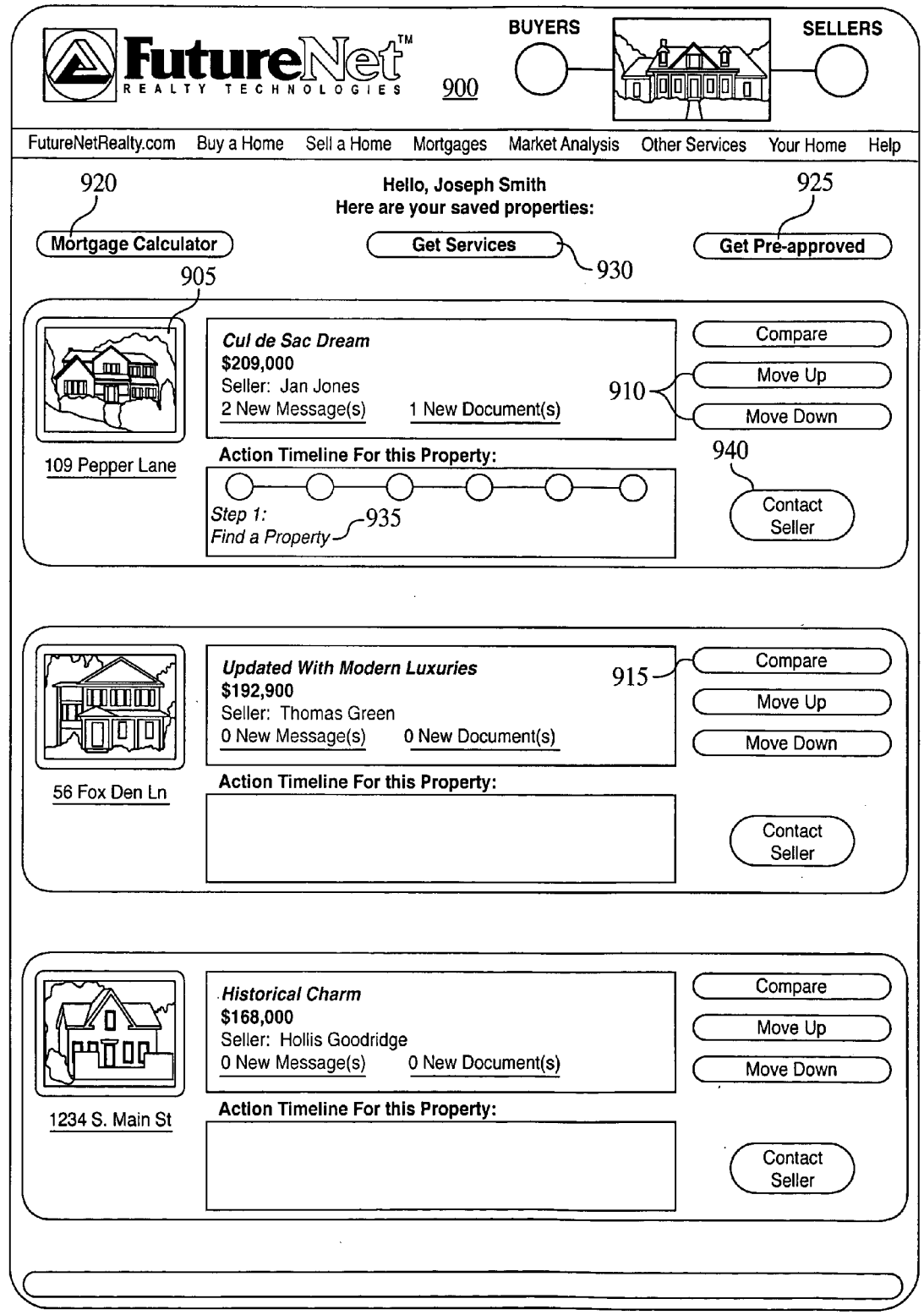
FIG. 9 shows one exemplary saved properties screen after the user has searched for and selected a single property as a potential match.

After registering with the system, the potential buyer will be presented with a "buyer's saved properties" web page 900 as a starting point in their use of the system. FIG. 9 shows one exemplary saved properties screen 900 after the user has searched for and selected several properties as potential matches. Note that the buyer's experience tracks that of the seller in that important information about potential homes that buyer may purchase (top of FIG. 9 property listing) along with associated functionality, is shown in tandem with the six step timeline (bottom of FIG. 9 property listing) which guides the potential buyer through the overall process of purchasing home. As in the seller's case, the simultaneous presentation of details about the current step in the property buying process (in this case, searching for a home) with a timeline of the entire process aids the buyer to "keep on task" and provides a useful baseline for reasonable expectations of the time/details of the home buying process. As with the seller, the virtual agent walks the buyer through the process, allows the buyer to understand the process and plan for current and next steps, and prevents mistakes in the complicated legal processes associated with real estate/property-related transactions (buying, selling, renting, leasing, etc.).

In this example specifically, the potential buyer has searched for and selected to save several properties for further analysis or purchase. High level details about the properties and a primary photograph 905 of the property are presented in a list ordered by preference. As shown in FIG. 9, if/when more than one property are selected by a buyer, they will be listed in the buyer's saved properties page in a user-defined order which may be easily altered ("move up," "move down" buttons 910), and a property comparison 915 may be carried out as described above.

Other relevant tools may be easily accessible to the potential buyer from this page such as a mortgage calculator 920 (as described above), a link to get pre-approved for a mortgage loan 925, and/or a link to additional services 930 as described above.

By selecting loan pre-approval, the potential buyer is preferably presented with an online pre-approval request form. In this form, the user can select between various loan providers, and the user will enter financial and other information to make a request for pre-approval. The selected financial institution will also have registered with the system, and, upon next logging into the system, the mortgage provider will be presented with the buyer's electronic request for pre-approval. If the buyer is pre-approved for a certain mortgage amount, this pre-approval will be electronically sent to the user so that it becomes part of the saved data of the system (to be used by the buyer and/or the seller).

As with the seller's property page (FIG. 4), the overall buyer timeline is presented to the buyer on the same page with saved properties. Again, this is a hyperlinked timeline which a buyer can use to get additional information about the present step in the property buying process as well as information about subsequent next steps. In addition to the next steps section, the To Do section includes items that are to occur per the sales agreement itself. Once a sales agreement has been initiated by a buyer, the To Do section becomes active and is populated by dates in the user's specific contract and is personalized by the offer presented. For example, the seller might have 2 days to respond to the offer per agreement. This date will then be shown in the To Do section of the timeline and each party will be automatically notified by the system as critical dates approach. When the parties are further into a transaction, they may have To Do tasks, such as getting a financing commitment from the lender. Once the lender uploads the commitment to the system, the timeline To Do or associated next step will be shown as complete. In the event that a To Do task is missed, the system will also generate a response to all appropriate parties.

This multiple presentation format (i.e., timeline, next steps, To Do list) maximizes the user's knowledge of the immediate task as well as the process as a whole, and provides reasonable expectations for the user throughout the process. In the specific example of FIG. 9, the buyer is in the initial stages of searching for and selecting a property, and the overall timeline appropriately reflects that this buyer is in step 1: finding a property 935.

Figure 10:
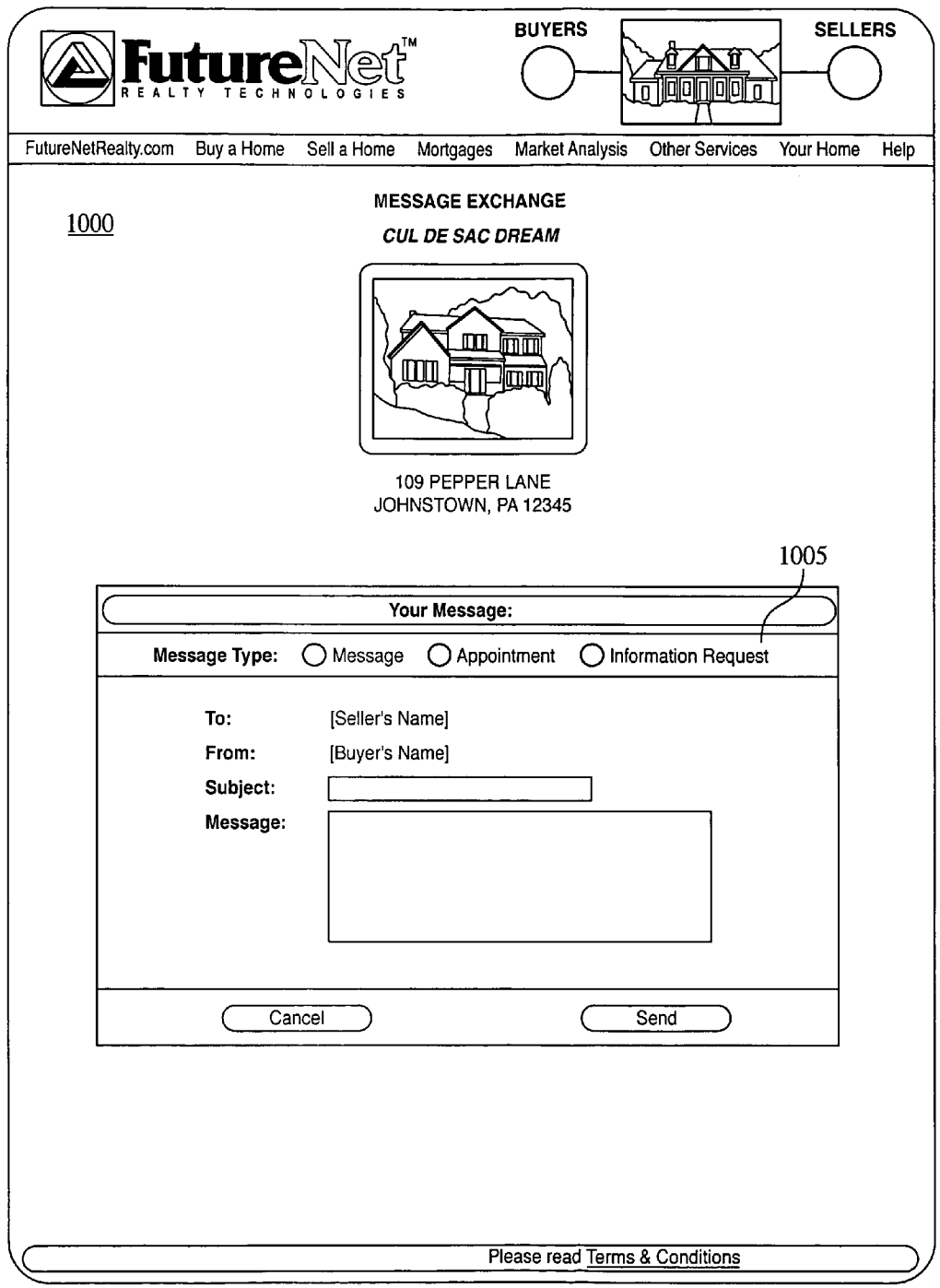
FIG. 10 shows an exemplary message screen from which messages may be sent between the buyer, seller and/or service provider.

After searching and selecting one or more potential properties to investigate further, FIG. 9 also shows the functionality to engage in the next step in the buying process—contacting the seller 940. By selecting the "contact seller" button, a messaging screen 1000 such as the one shown in FIG. 10 is presented to the potential buyer. In this example, the buyer may select the type of message (message, appointment or information request) 1005, and a pre-addressed email message to the seller of the selected property is presented to the buyer. The buyer need only complete the subject and body of the email to contact the seller with any questions, requests for additional information, to schedule an appointment to view the property, or other reason. Once sent, the message will be electronically provided to the appropriate seller (preferably after passing through profanity and/or spam filters) for receipt. This messaging system may be internal to the system itself (no outside Internet bridge), and the messages typically only include a "user name" and do not include any personally identifiable information about the user.

Seller/Buyer Contact

Figure 11:
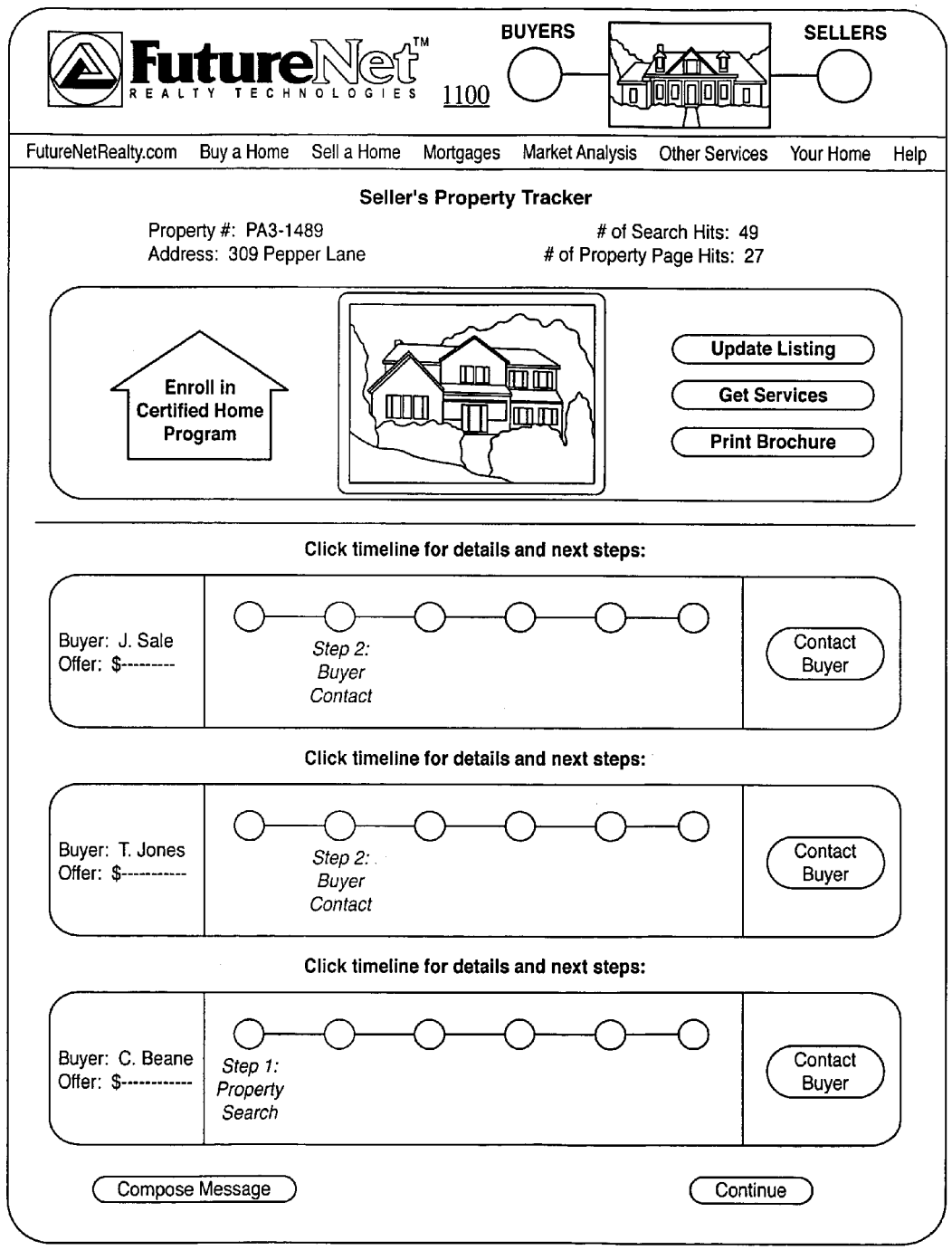
FIG. 11 shows an updated seller's property tracker web page for a property after three different potential buyers have shown at least some interest.

FIG. 11 shows an updated seller's property tracker web page 1100 for the property after several different potential buyers have shown at least some interest in the property by adding this property to the buyer's watchlist from the property detail page (electronic brochure), as described above. Note that in the updated property tracker, the detailed information about the property (top of FIG. 11) is shown on the same page with the overall timeline for the selling process (bottom of FIG. 11). Here, however, several potential buyers are tracked, and each buyer may be at a different step in the six step process. The present system separately tracks each of these potential buyers and presents the seller with separate timelines for each buyer. In this case, the first two buyers are at stage 2 in the process (buyer contact) which means that these buyers have sent a message to the seller. The third potential buyer has just selected to add this property to their watchlist from the property detail page (brochure) and is therefore still at step 1 (property search). Note that this "step 1" reflects where the buyer is in the process (searching for a property) and not the seller's first step (which was "listing a property"). This information may aid the seller in identifying "serious" home buyers more readily. The seller can contact any of these buyers using the messaging system (choosing "contact buyer") in the same way as the buyers initially contacted the seller.

Figure 12:
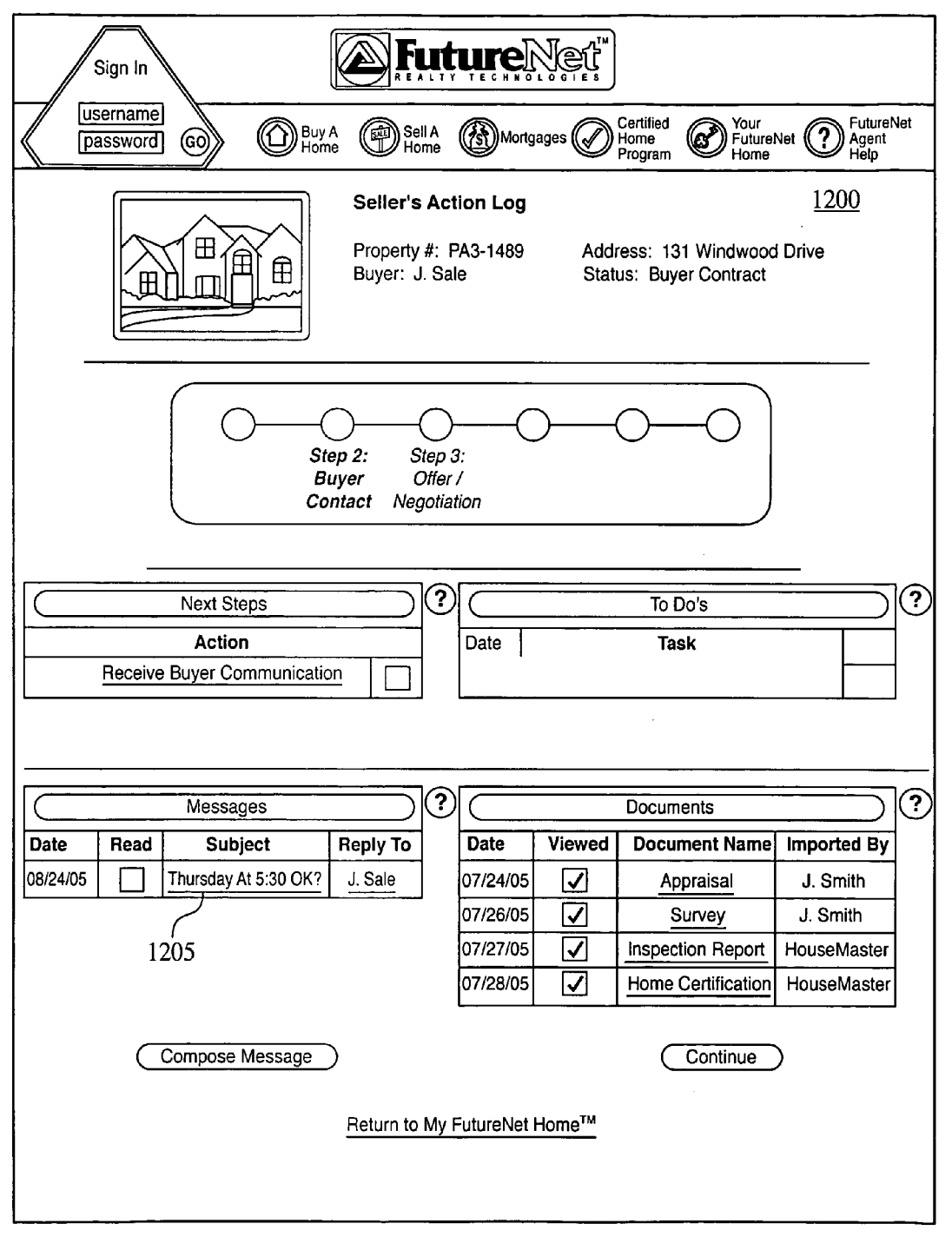

As briefly described above, an additional tool to track the selling process is the seller's action log. An exemplary seller action log screen 1200, which tracks all information related to a sales process, is shown in FIG. 12. In this exemplary seller action log 1200, the listed property and overall timeline are shown at the top of the page. The lower portion of FIG. 12 contains additional information related to the sales process, such as "next steps," a "To Do list," "messages," and a listing of uploaded documents. In the present example, the message from a first potential buyer 1205 (who sent the message to the seller above) is shown in the "messages" section of the seller's action log. By selecting this message, the seller can read and/or reply to the buyer's message and move forward with the sales process. The "next steps" describes all of the items that a user is required to accomplish in order to advance to the next one of the six steps, and the "To Do" list (which is alternatively called "contract actions") provides a list of tasks that must be completed per the sales agreement. These contract actions or To Do tasks only become active in the system after a sales agreement is agreed upon. The seller's uploaded documents, as described above, may be also managed from this action log 1200.

Figure 13:
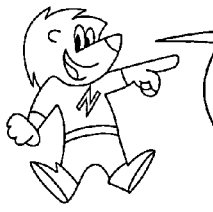
FIG. 13 shows an updated buyer's saved properties screen in which the buyer is now tracking three different properties.

FIG. 13 shows an updated buyer's saved properties screen 1300 in which the buyer is now tracking three different properties. In the present case, the buyer has contacted the sellers of the first two properties via the system's messaging capabilities (note that the status timeline of these two properties reflects that the buyer is in the step 2 seller contact stage 1305). With respect to the third listing, the buyer has not contacted the seller, and the timeline reflects that the buyer is still in the step 1 finding a property stage 1310. As exemplified in FIG. 13, the present invention allows a buyer to progress through the buying process (or renting, leasing, auction process) of a variety of different properties at the same time, all while being reminded about the present tasks and the overall timeline of the buying process for each of the multiple properties. This ability to easily track and manage multiple buying scenarios is a great advantage over the prior art.

Property Offer/Negotiation

Figure 14:
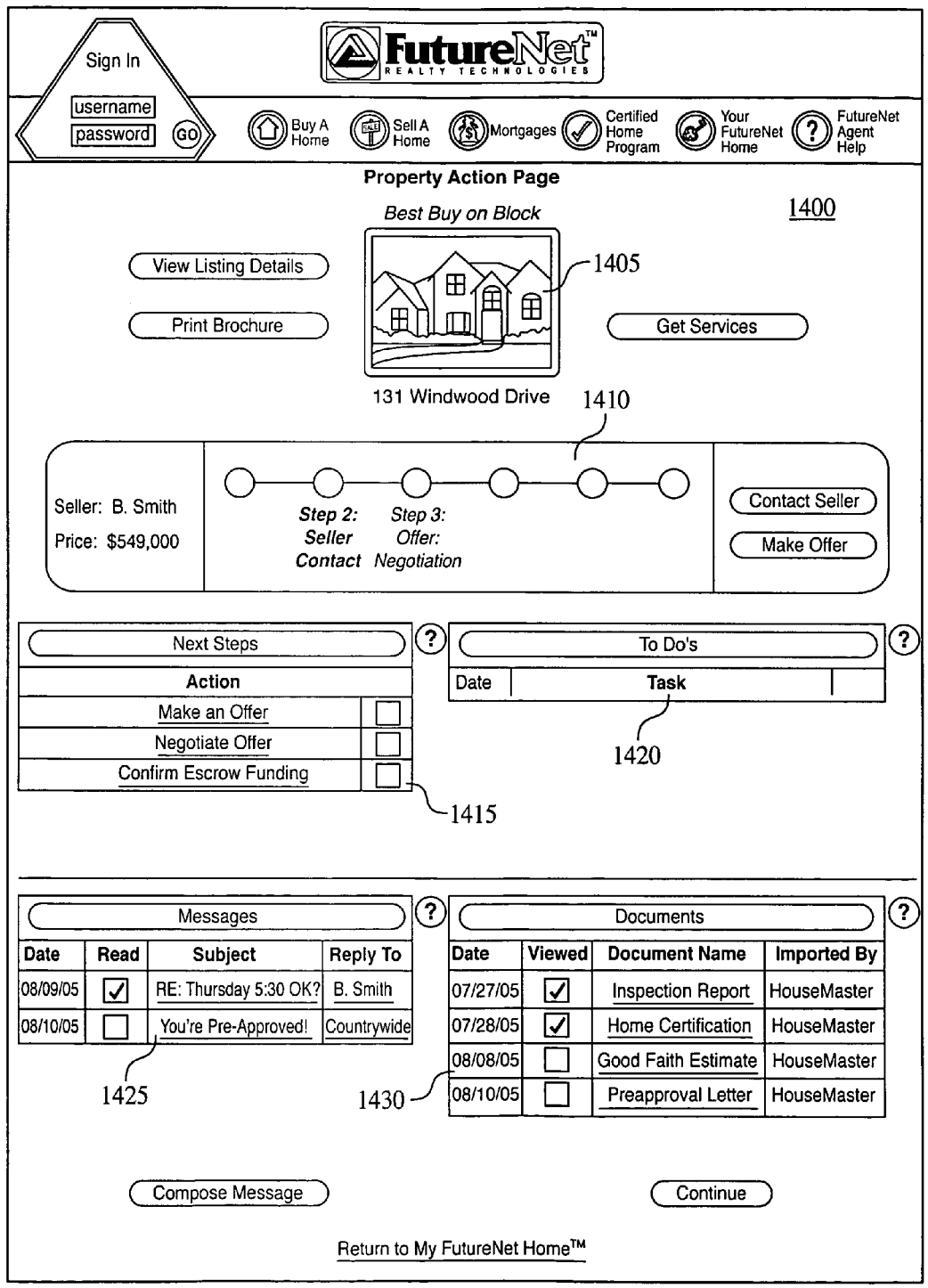
FIG. 14 shows an exemplary buyer property action page which provides all of the information necessary for a buyer to manage their buying tasks.

After messaging with one or more sellers and viewing individual properties, a buyer will eventually determine that they would like to move forward with the process and make an offer on a property. Similar to the seller action screens, FIG. 14 shows an exemplary buyer property action page 1400 which provides all of the information necessary for a buyer to manage their buying tasks. Specifically, the upper portion of the buyer property action page includes the primary photo 1405 of the property and links to the listing details and electronic brochure. In combination with this detail, the overall buyer timeline 1410 is shown with the current step updated to "seller contact" and the next step shown as "offer/negotiation."

Below the timeline, the buyer property action page preferably includes information that is relevant to the current buyer process. For example, the "next steps" 1415 related to the offer/negotiation step of the six step buyer process includes three parts: (1) making an offer; (2) negotiating the offer; and (3) confirming escrow funding. These three "next steps" are what needs to be accomplished in order to move to the next one of the six steps in the transaction process. Also shown in the lower portion of the FIG. 14 buyer property action page is a "To Do" list 1420 (contract action list) for the buyer (which, when active after a sales agreement is reached, lists agreement-related tasks), the messages received from various entities 1425 (in this case including the seller and the pre-approval mortgage company) and the documents 1430 related to the property and the transaction (e.g., inspection report, home certification, and pre-approval letter).

As mentioned above, the overall buyer timeline 1410 includes a link to the system's message center ("contact seller") to send additional requests for information to the seller. When the potential buyer determines that they are ready to make an offer on the property, he/she will select "make offer" from the buyer timeline section of the buyer property action page and be presented with an offer sheet similar to that (partially) shown in FIG. 15. By filling in and sending the offer sheet to the seller, the potential buyer is making a legal request to purchase the property according to the terms of the offer sheet, as detailed below.

The beginning of the offer sheet 1500 of FIG. 15 includes certain descriptive information about the property listing such as its property ID number, street address, list price, inclusions and exclusions. The offer sheet continues as an electronic form (with applicable drop down boxes and other selection mechanisms) to aid the buyer in providing relevant information about the offer. In the "buyer information" section 1505 of the offer sheet, the buyer must include contact information such as name (and name of any co-buyer), address and phone number information. Next, a "price, payments and key dates" section 1510 includes financial and date-specific information about the offer. Preferably, this information includes information such as: purchase price; deposit amount and date of deposit; approval date of sales agreement by seller; and closing date and title company.

The offer sheet may also include information such as a "seller assist" (1515) amount of money that the seller will put forth for closing costs, additional information about inclusions/exclusions (not shown), financing contingency information 1520 (e.g., a maximum procurable interest rate or maximum amount of discount points), and property inspection information 1525 (e.g., general inspection contingency, wood infestation inspection contingency, and/or radon inspection contingency). Preferably, the system also provides guides or suggested data ranges for which to use in the offer sheet, such as a 15 day period for each of the inspection contingencies.

The final portion of the offer sheet includes links to preview the seller disclosures 1530 (which are saved on the system) and to preview the sales agreement 1535 as it will appear to the seller when sent. While creating and editing this document, the buyer can also save a draft of the sales agreement to the system for later editing and forwarding to the seller. After the buyer is content with the terms, the sales agreement is sent to the seller by selecting "approve offer," entering the buyer's initials in the online form, and selecting "submit offer" 1540. This process electronically submits the offer sheet to the seller to be reviewed the next time the seller logs into the system.

The information from this offer sheet is used to pre-populate the actual sales agreement which is saved to the system (e.g., as a .PDF file). The offer can include additional fields that are specific to a particular state (e.g., additional required inspections) and can also include a free-form text addendum box for a buyer or seller to add further additions or remove elements from the contract. Likewise, the offer sheet explained herein can be replaced with terms for a rental agreement, lease or the like, depending on the type of transaction that is involved in the current process.

FIG. 16 shows an exemplary seller's action log screen 1600 the next time the seller logs into the system (after the offer sheet is sent to the seller). Note that the overall timeline 1605 has been updated to step 3 (offer and negotiation). Note also that the "next steps" and "To Do" list sections of the seller's action log page have also been updated to reflect the current stage of the six stage buyer's process. Specifically, the seller now has a sales contract-related task assigned to them to review and approve or negotiate the offer that was sent to the seller 1610. Again, the next steps provides a list of what must be accomplished in order to progress to the next of the six step transaction process, and the To Do section lists sales agreement-related tasks that must be accomplished.

Moreover, the current "next steps" include reviewing the offer sent from the buyer, approving or negotiating (counter offer) this offer sheet, and confirming the escrow funding of the buyer. Additionally, the "messages" and "documents" sections of the seller's action log have been updated to include any new messages or documents (in this case a message about the offer sheet and the offer sheet itself, shown in bold as a new message in the appropriate sections of FIG. 16.

In this sales agreement process, as described above, all of the indications of agreements are accomplished electronically. For example, users can type in their initials and select certain clickable boxes to electronically indicate acceptance of an agreement. Digital signatures, authentication devices and other electronic means of assuring assent can be utilized by the system, and the system may tailor the means of assent to the specific jurisdiction involved.

When ready, the seller selects to view the sales agreement from the buyer and is presented with an offer that appears similar to the buyer's offer of FIG. 15. All of the information provided by the buyer in the offer sheet is communicated to the seller electronically for review and approval. Preferably, after reviewing the contents of the offer, the seller can electronically accept the offer, not accept the offer, or make a counteroffer. If the offer is rejected, then the buyer is electronically notified of this result. If the offer is accepted, then the buyer is notified and the parties move on in the process as described below.

Alternatively, if the seller wishes to make a counteroffer, the seller is presented with an online form similar to that presented to the buyer when the initial offer was made (preferably pre-populated with the information pertaining to the buyer's initial offer). The seller then utilizes this form to alter the buyer's initial offer in order to present the buyer with a revised offer that is acceptable to the seller. In much the same way as with the buyer's initial process, the seller can electronically review the updated offer letter and can send the offer to the buyer after initialing the form electronically.

Assuming a counteroffer was made, the next time the buyer logs into the electronic real estate system, the buyer's property action web page will be updated to include this new counteroffer, including updating the message list, To Do list (which now includes the contract-related tasks of reviewing the counteroffer and funding escrow) and the documents list. Upon selecting to review the counteroffer, the buyer now has the same choices as the seller did previously (accept, reject, counteroffer). This back-and-forth between the seller and the buyer may proceed through several iterations, but, if successful, either the buyer or the seller will eventually choose to electronically accept the offer and notice to such effect will be sent to the other party.

Because parties may think twice about an offer after it is made, additional system functionality includes the ability to rescind an offer once it has been made but before it has been accepted. Similarly, the system provides the ability to addend (or amend) an existing sales agreement (which involves much of the same back and forth process described above, with an addendum only becoming valid if both parties agree) and/or the ability to rescind a valid sales agreement (which may incur legal consequences).

Closing and Service Providers

After acceptance of the offer, the parties are invited by the system to select service providers to close on the property. In some instances, the parties may be directed to corporate partners that will provide the required service, and in other embodiments the users may be provided with a list of several approved potential service providers from which the users can select an appropriate service provider. For example, the buyer may be requested to select a mortgage provider and a home inspection service. In addition to required service providers, the buyer (and even the seller) is afforded the opportunity to select additional partners such as insurance services, moving companies, utilities and the like. As described below, the more services that the buyer (or seller) selects and uses, the more user rewards that are given back to the user at the end of closing. These rewards could alternatively be given out as a bulk rewards package or rewards could occur simply as users take advantage of a provider's product or service.

FIG. 17 shows one exemplary embodiment of a system web page 1700 from which a user of the system may select service providers associated with a property sale and related move. In the upper portion of FIG. 17, the essential "home buying services" are put into an online list. In this example, the user selects a home inspector 1705 and a mortgage company 1710 from the list of providers that are part of the electronic real estate system network. Preferably, each of the providers is listed along with the user reward 1715 that is sponsored by that particular provider. For example, the reward may be a percentage discount over regular service fees, or the reward may be a fixed savings amount. The user can learn additional information about each provider by selecting the hyperlink associated with the provider's name which brings the user to a prepared "commercial" for that service provider, and the user can eventually select a specific provider via the online menu.

The remainder of the service provider web page includes optional providers that may be useful to a buyer during its purchase of and move into a new home. For example, the "other home services" 1720 may include a list of: carpet cleaners, painters and home improvement stores for the repairs/modifications to be made to the home after the buyer moves in; movers and storage companies to store and ship the buyer's belongings before, during and after the move; and landscaping companies to take care of the buyer's lawn and/or the new home's lawn after the buyer moves into the property. Other categories of service providers may also be presented depending on the situation. For example, a commercial real estate transaction may include a wide variety of service providers and insurers that would not be applicable to a residential home sale. Likewise, a lease or rental agreement may be associated with a separate list of relevant service providers.

Preferably, the system only presents applicable service providers to suit a particular real estate transaction.

The mortgage company, title company, home inspector and/or any other service provider may log into the system and post messages, documents, and other information as applicable to a particular real estate transaction. At the beginning of the "prepare to close" process, the settlement company confirms that the proper escrow amount has been deposited, and the settlement company logs into the system and confirms the escrow amount and date received. Once all additional contract conditions are met and the HUD settlement statement is posted by the settlement company, the buyer and seller are notified that they are clear for closing on the real estate transaction. The final step in the process is for the parties to review the final settlement statement to insure that all information on this document is correct. The settlement service provider will electronically contact the parties and inform them of the date and time of the settlement and what materials must be brought from each of the parties to the closing. This information will be housed in the next steps section of the timeline.

Figure 18:
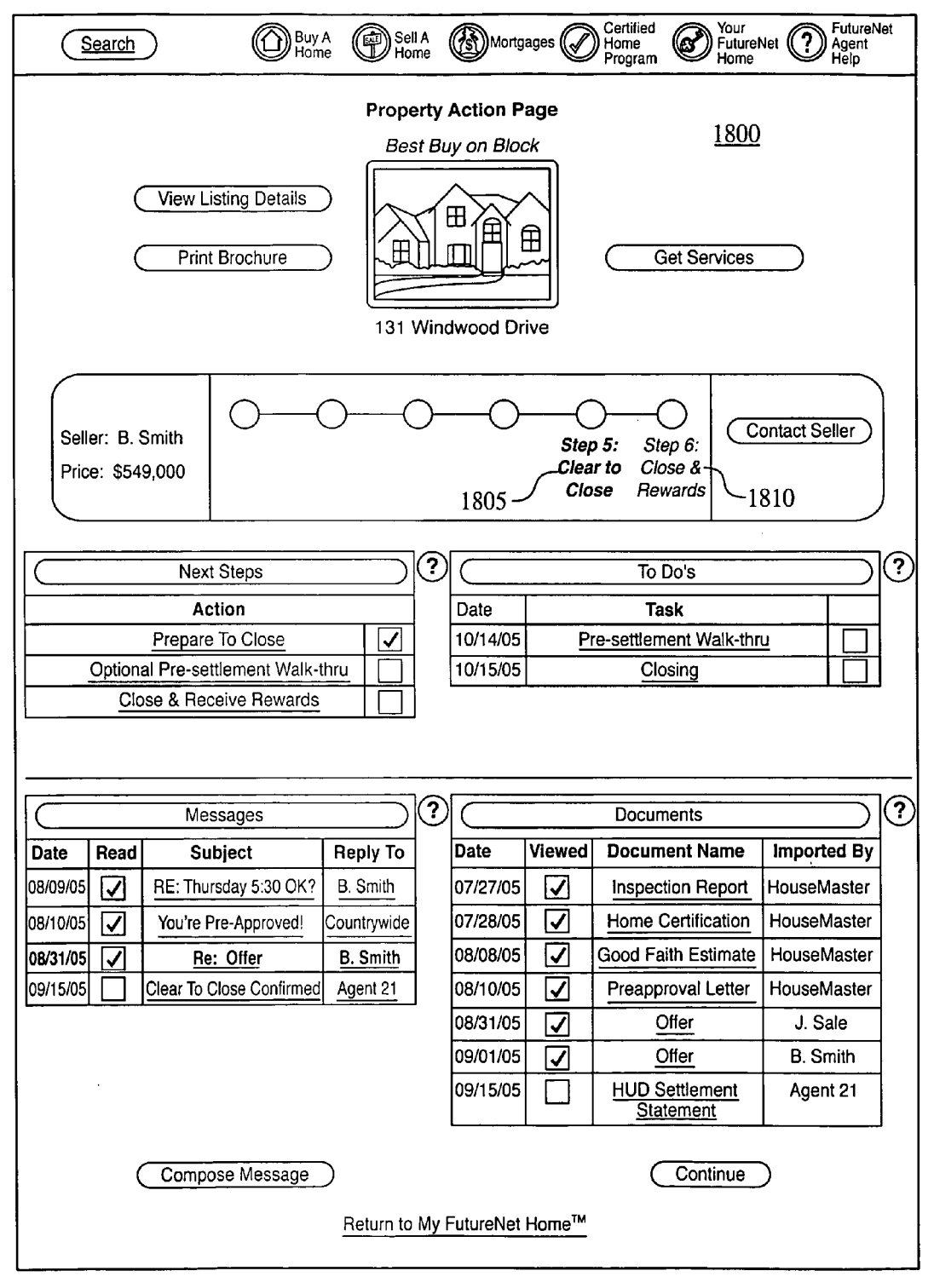

FIG. 18 shows an updated buyer property action page 1800 at this point in the process—just before closing. As seen in FIG. 18, the buyer has now entered step 5 (clear to close) 1805 in the six step home buying process and is preparing to enter step 6 (close and rewards) 1810. Here, the buyer's "next steps" and "To Do" (contract actions) lists have been updated to reflect the optional pre-settlement walk-thru and impending closing. The closing date is populated directly from the sales agreement itself, and could be changed or modified by mutual agreement (as in the case of an addendum). Moreover, any accepted modifications to the sales agreement (addendums) will result in the system automatically sending the new documents directly to the appropriate service providers.

After closing, the title company representative logs into the system and confirms the date and time that closing took place. The property has now transferred ownership from the seller to the buyer or buyer's representative. At this point, both the seller and the buyer are midway through step 6 (closing and rewards), and both parties are ready to receive and review their user rewards. FIG. 19 shows an exemplary rewards summary web page 1900 that lists all of the user rewards earned by a buyer during the purchase of the property. The example in FIG. 19 shows that the buyer earned $5,850 in user rewards in addition to any commission savings, which are often substantial. The rewards summary also breaks down the user rewards into each specific type and amount of reward earned. Here, the buyer utilized a variety of different system service providers such as a mortgage company, a title company, home inspector, painters, storage companies and more. Each of these different service providers saved the buyer money over what the buyer would have had to spend outside of the present invention.

Additional Features

In addition to the core concepts described above and detailed below, the system web pages may also include other optional features that provide a more efficient and comprehensive user experience. For example, in addition to user rewards, the system may also incorporate electronic couponing as is known generally in the Internet arts. Moreover, in addition to still pictures, the system may include streaming video of real estate properties, and the system itself may contain a wide variety of educational materials related to real estate transactions. These and other optional features will be recognized by those skilled in the relevant art.

Nothing in the above description is meant to limit the present invention to any specific materials, geometry, or orientation of elements. Many part/orientation substitutions are contemplated within the scope of the present invention and will be apparent to those skilled in the art. The embodiments described herein were presented by way of example only and should not be used to limit the scope of the invention.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered only to facilitate comprehension of the invention and should not be construed to limit the scope thereof.

"APPENDIX"

| FutureNet Web Site | Future Net<br>System Design and Functional Specification |
|---|---|

Table of Contents

1 ABOUT THIS DOCUMENT ................................................................................ 7

1.1 PURPOSE OF DOCUMENT ................................................................................ 7
1.2 INTENDED AUDIENCE ...................................................................................... 7
1.3 DOCUMENT ORGANIZATION ............................................................................ 7

2 FUTURE NET OVERVIEW ................................................................................. 8

2.1 OBJECTIVES ..................................................................................................... 8
2.1.1 ELEGANT SIMPLICITY ..................................................................................... 8
2.1.2 OBTAIN 2,000 PROPERTY LISTINGS BY PHASE 1 ROLL-OUT ......................... 8
2.1.3 CONVERT FSBO CLIENTS TO FUTURE NET .................................................. 8
2.1.4 REACH WESTERN PENNSYLVANIA ................................................................ 8
2.1.5 GENERATE REVENUE STREAM VIA SERVICE PROVIDER REFERRALS ............. 8
2.1.6 PROVIDE A VIRTUAL AGENT .......................................................................... 8
2.1.7 RETAIN COMMUNICATIONS AND ACTIVITIES WITHIN THE SYSTEM ................ 9

3 GLOSSARY ......................................................................................................... 9

3.1 DEFINITIONS .................................................................................................... 9
3.1.1 CM ................................................................................................................. 9
3.1.2 CMA ............................................................................................................... 9
3.1.3 SERVICE PROVIDER (AFFILIATE) .................................................................. 9

4 HIGH LEVEL SYSTEM FUNCTIONAL DESCRIPTION ................................. 9

4.1 VIRTUAL AGENT CONCEPT ............................................................................. 9
4.2 GENERAL CONTENT ...................................................................................... 10
4.3 TIMELINE ........................................................................................................ 11
4.3.1 GENERAL CONCEPT .................................................................................... 11
4.3.2 TIMELINE VARIANCES .................................................................................. 14
4.3.3 TIMELINE PROGRESSION ............................................................................. 14
4.3.4 TIMELINE - WIZARD ..................................................................................... 15
4.3.5 TIMELINE DATE POPULATION ..................................................................... 16
4.3.6 PRE-APPROVAL ........................................................................................... 16
4.3.7 SUPPORTING CONTENT .............................................................................. 17
4.3.8 VIRTUAL NEGOTIATION ............................................................................... 17
4.3.9 VIRTUAL CLOSE ........................................................................................... 17
4.3.10 OFFER WITHDRAW ...................................................................................... 17
4.4 INFORMATION SECURITY / SHARING ............................................................ 18

APPENDIX

FutureNet Web Site  
Future Net  
System Design and Functional Specification

| | | |
|---|---|---|
| 4.4.1 | GENERAL SECURITY / SHARING GUIDELINES | 18 |
| 4.4.2 | SERVICE PROVIDER INFORMATION ACCESS | 19 |
| 4.4.3 | TITLE COMPANY ACCESS | 19 |
| 4.5 | SEARCH LISTINGS | 19 |
| 4.6 | REGISTRATION | 20 |
| 4.7 | DOCUMENT MANAGEMENT | 21 |
| 4.7.1 | ONLINE DOCUMENT FORMS | 21 |
| 4.7.2 | DOCUMENT ENGINE | 22 |
| 4.7.3 | ONLINE FORM FIELDS | 22 |
| 4.7.4 | FUTURE NET DOCUMENT REFERENCES | 23 |
| 4.7.5 | DOCUMENT SECURITY | 23 |
| 4.7.6 | DIGITAL FORMS SIGNATURE | 24 |
| 4.7.7 | NEGOTIATION | 24 |
| 4.7.8 | DOCUMENT RECEIPT SIGNATURE | 24 |
| 4.8 | MESSAGING | 24 |
| 4.9 | CONTENT MANAGEMENT | 25 |
| 4.10 | MORTGAGE CALCULATOR | 27 |
| 4.11 | HELP YOURSELF – CUSTOMER SELF SERVICE | 28 |
| 4.11.1 | ONLINE FORMS | 28 |
| 4.11.2 | CLOSING COST CALCULATOR | 29 |
| 4.12 | ONLINE SUPPORT (CHAT, TEXT) | 29 |
| 4.13 | EVENT NOTIFICATION | 29 |
| 4.14 | MAP SERVICE | 30 |
| 4.15 | ELECTRONIC PAYMENTS SYSTEM | 30 |
| 4.16 | SUPPLEMENTARY SERVICE PURCHASE & COUPON REDEMPTION | 31 |
| 4.16.1 | COUPON REDEMPTION | 32 |
| | 4.16.1.1 Potential Coupon Redemption Solution | 33 |
| 4.17 | PUBLIC AND PRIVATE PAGES FOR CLIENTS | 33 |
| 4.17.1 | SELLER PAGES: | 34 |
| 4.17.2 | BUYER PAGES: | 35 |
| 4.17.3 | GENERAL BUYER & SELLER GUIDELINES | 35 |
| 4.17.4 | SHOPPING CART | 36 |
| 4.17.5 | CLOSING | 36 |
| 4.17.6 | LISTED PROPERTY CHANGES | 37 |
| 4.17.7 | OTHER | 37 |
| 4.18 | PORTALS | 37 |
| 4.18.1 | OUT-OF-NETWORK AFFILIATES | 39 |
| 4.19 | PAYMENT SCHEDULES | 39 |
| 4.20 | INFORMATION AUDIT TRAIL | 39 |
| 4.21 | ONLINE APPOINTMENTS [FUTURE] | 40 |
| 4.22 | OBSCENITY/PROFANITY FILTERING | 40 |
| 5 | SYSTEM ARCHITECTURE | 40 |
| 5.1 | TOTAL COST OF OWNERSHIP | 40 |

APPENDIX

FutureNet Web Site         Future Net
System Design and Functional Specification

| | | |
|---|---|---|
| 6 | SYSTEM USE CASES | 41 |
| 7 | USER INTERFACE CONCEPT DESIGNS | 67 |
| 7.1 | ANONYMOUS LANDING PAGE | 67 |
| 7.2 | BUYER CHANNEL LANDING PAGE | 68 |
| 7.3 | SEARCH RESULTS PAGE | 69 |
| 7.4 | MAKE AN OFFER PAGE | 70 |
| 7.5 | BUYER PRIVATE PAGE – ACTIVE PROPERTY | 71 |
| 7.6 | SELLER PROFILE PAGE – BUYER OFFERS | 72 |
| 7.7 | BUYER / SELLER COMMUNICATION | 73 |
| 7.8 | BUYER SEARCH PROFILE PAGE | 74 |
| 7.9 | SERVICE PROVIDER TO-DO PAGE | 75 |
| 7.10 | SERVICE PROVIDER DETAIL PAGE | 76 |
| 8 | CORE BASE DATA MODEL | 77 |
| 9 | EXTERNAL INTEGRATION AND INTERFACE REQUIREMENTS | 81 |
| 9.1 | SEARCH PROXIMITY | 81 |
| 9.2 | MAPPING SERVICE | 82 |
| 9.3 | CMA | 82 |
| 9.4 | OBSCENITY/PROFANITY CONTENT FILTERS | 82 |
| 9.5 | PAYMENT TRANSACTION SERVICES | 82 |
| 9.6 | DOCUMENT MANAGEMENT | 82 |
| 9.7 | CREDIT REPAIR AGENCIES | 83 |
| 9.8 | SEARCH ENGINES | 83 |
| 9.9 | AUCTION (EBAY) | 83 |
| 10 | MARKETING SERVICES | 84 |
| 11 | SUPPLEMENTARY SYSTEMS REQUIREMENTS | 84 |
| 11.1 | FUNCTIONALITY | 84 |
| 11.1.1 | LOGGING AND ERROR HANDLING | 84 |
| 11.1.2 | REPORTING AND BUSINESS METRICS | 84 |
| 11.2 | MULTI-LINGUAL | 84 |
| 11.3 | USABILITY | 84 |
| 11.4 | SYSTEMS AVAILABILITY | 84 |
| 11.4.1 | AVAILABILITY | 84 |
| 11.5 | PERFORMANCE | 85 |
| 11.6 | SCALING ISSUES | 85 |
| 11.6.1 | EXPECTED USER BASE | 85 |
| 11.6.2 | DATABASE VOLUMES | 85 |

APPENDIX

| FutureNet Web Site | Future Net<br>System Design and Functional Specification |
|---|---|

| | |
|---|---|
| 11.7 Security | 86 |
| 11.7.1 Users | 86 |
| 11.7.2 Web Access | 86 |
| 11.7.3 Application Server Database | 86 |
| 11.8 Applications Support | 86 |

APPENDIX

FutureNet Web Site

Future Net
System Design and Functional Specification

1 About this Document

The System Design and Functional Specification Document (SDS) intends to provide a high-level systems design and functional specification for the Future Net web site. This defines the scope of functionality that is included in initial system roll-out to ensure that a realistic deployment can be achieved, and identifies functionality that will be deferred for future releases. A delivery timeline will be outlined that supports key business activities and objectives. Primary artifacts included in this requirements document include system architectural and operational components, functional description, use cases, user interface concept designs, and entity model showing core data objects.

Functional or components that are considered for future plans, but not included in the scope of initial delivery for phase 1 will be noted as such.

1.1 Purpose of Document

The SDS explains the system requirements with an emphasis on what the system is do (behaviors and activities) more than how it will be accomplished. The process of constructing a detailed component design and user interface (the "how") will be performed by the contracting firm to develop the system as part of initial phases of actual system construction.

This document is by no means definitive, but attempts as reasonably possible to convey all understood aspects of system capabilities to the reader. At the time of this writing general business guidelines and approaches are still being discussed and changes of material difference are expected in the final design. Certain aspects of this are discussed at a cursory level while others are described in more detail, understanding that as design commences, all aspects of the system are required to be documented in full detail.

1.2 Intended Audience

The audience for this SDS document is primarily three-fold:

1) Future Net for the purposes of confirmation that the system requirements described encompass the full scope and breadth of intended systems capabilities 2) Technology contracting firms to produce competitive bids for system construction, deployment, and ongoing support 3) Presentations to potential investors

1.3 Document Organization

Following a high level introduction of Future Net, the SDS document contains high-level system design artifacts for the Future Net web site. The SDS provides the following information for the online system:

- Glossary
- High-level System Functional Description
- System Architecture
- System Uses Cases
- User Interface Concept

APPENDIX

| FutureNet Web Site | Future Net |
|---|---|
| | System Design and Functional Specification |

- Core Data Model
- External Integration and Interface requirements
- Supplementary Systems Requirements

2 Future Net Overview

Future Net represents a radical shift in the way conventional real estate transactions are managed. Not only is the intermediary (realtor) removed form the process (as it is with FSBO properties), but Future Net carries the concept further to use the Internet to facilitate the entire real estate transaction life-cycle in addition to bringing Buyers and Sellers together in the marketplace.

2.1 Objectives

2.1.1 Elegant Simplicity

The Future Net web site will be designed with simplicity as one of its foremost goals as an enabler toward achieving high levels of user satisfaction and product adoption.

2.1.2 Obtain 2,000 property listings by phase 1 roll-out

2.1.3 Convert FSBO and Traditional Real Estate clients to Future Net

2.1.4 Reach Western Pennsylvania

2.1.5 Generate revenue stream via Service Provider referrals

The long-term revenue model is to sustain Future Net from revenues generated primarily from service provider fees (transaction and subscription. At the outset, member service providers will be a source of revenue enabling the Buyer and Seller to utilize a free service. In the future, a transaction fee may be assessed to users of the system.

2.1.6 Provide a Virtual Agent

A Virtual Agent concept is the fundamental concept behind the web system, since it is the Realtor (agent) being replaced in the online process. The system will act as the intermediary for holding communications, documents, personal reminders, etc. – activities typically performed by the realtor.

This will enable online clients to have complete control over their buying/selling process.

The Virtual Agent will also provide buyer functions. Acting as system coach, it will enable the Perfect Home Finder function. This function will allow staged response to search criteria. Specifically, there will be an initial series of questions, followed by subsequent search questions to narrow criteria. This function will illustrate number of matches at each level, so users can easily filter through listings.

APPENDIX

FutureNet Web Site

Future Net
System Design and Functional Specification

2.1.7 Retain communications and activities within the system

A goal of Future Net is to retain general communications and activities within the system. A client will receive the expected benefit of Future Net's value proposition when all appropriate aspects of a transaction take place within the system. This includes, for example, obtaining member providers services from whom discount are received when purchased through the system. Once an activity transpires outside of the boundaries of Future Net, some degree of value is lost.

2.1.8 Document Repository

Further developing the idea of communication retention within the system, is to provide system capabilities that allows users to store documents on the system so that FutureNet becomes a document repository for all property / financial related documents. This extends beyond a single transaction, and has potential application for future activity (i.e. refinancing, additional home property purchases, etc.) by providing ready access to existing documents previously housed on the site.

3 Glossary

*3.1 Definitions*

3.1.1 CM

Content Management: A system component used to dynamically publish content on a web page based on pre-defined rules and parameters.

3.1.2 CMA

Competitive Market Analysis

3.1.3 Service Provider (Affiliate)

A company who provides supplementary services to a real estate transaction: Service providers are broken into two tiers: 1) Those that are instrumental in the real estate transaction process, 2) Those that augment a client's experience with Future Net by providing aspects of convenience or additional financial benefit (discounts) not critical to the transaction life-cycle.

The term "affiliate" and "service provider" and "member service provider" are used synonymously in this document.

4 High Level System Functional Description

*4.1 Virtual Agent Concept*

One of the primary enablers of Future Net's value proposition is the Virtual Agent in which the system behaves as a "coach", bringing negotiating parties together online, walking the transacting parties through their respective events, serving forms, providing valuable information in order to make decisions, and bringing clients the services providers and supplementary resources to augment the transaction experience.

APPENDIX

| FutureNet Web Site | Future Net |
|---|---|
| | System Design and Functional Specification |

The systems functionality collectively described below will embody the behavior of what will become the Virtual Agent.

4.2 General Content

A wealth of ideas has been developed for content creation and publishing on the web site. The content described in this section is not comprehensive, but highlights the general areas of interest in order to provide an understanding of systems capabilities. It is beyond the scope here to enumerate all of the concepts, types and components of content that will be published. The purpose of this section is to identify the fact that there will likely exist a significant amount of content to be published on the web site.

The system contains content types including:

- Company information
- Privacy policy
- Terms of acceptance
- Disclaimers
- Fee Structures
- Site Map
- Coupons
- Feature Listings
- Video
- Property Images
- Documents and Forms
- Educational components
- Affiliate advertisements Some of these will be elaborated on later. Specific content will be provided during site design. The static user interface design "concept" screens shown later contain the framework for some of this content.

Other content (related to Future Net business operations) exist outside of the boundaries of the system and will not be included in the functional specification. Content for these activities may be driven from information captured within the system (such as a Welcome Wagon mailing) but are beyond the scope of this functional description. Investigate data replication and/or data warehouse capabilities for future consideration.

Upon initial systems deployment, FutureNet will utilize external marketing services and regionalization expertise for marketing material distribution. NOTE: Identification and selection of marketing services is a key action to be taken by FutureNet.

A comprehensive list of documents, images, and site copy will be required when detailed system design commences.

Royalty fees may be paid to Future Net attorneys for legal documents used during any transaction process. Royalty fee schedule is to be determined. It is anticipated that

APPENDIX

| FutureNet Web Site | Future Net |
|---|---|
| | System Design and Functional Specification | documents will be provided by attorney providers to FutureNet users at no cost. There will be additional costs payable to that service provider for legal assistance on a per contract or per hour basis.

Other content such as published advertisements for service providers will be paid for the affiliates and represent revenue to Future Net.

4.3 Timeline

4.3.1 General Concept

The timeline is one of the single most important concepts in the system pertaining to a workflow transaction. The timeline conveys the events during the life-cycle of a real estate transaction.

The system will support multiple timeline entities.
- A Seller entity timeline starts when a property is listed.
- A Buyer entity time starts when registration is complete.
- A Property-Transaction entity timeline starts when a property of interest in initiated by a Buyer and becomes visible to a Seller when an offer is made by the Buyer.

Each timeline will invoke events represented by a wizard-based user interface. These dialogs will assist the user to progress through the various stages of the entity life-cycle.

A timeline will exist (visually) for each occurrence of a Seller-Buyer transaction. A transaction-specific timeline will begin at the point when a property is approved by a Seller to be listed to the public. The timeline extends beyond the abstract to be represented as a visual set of images that identify specific activities and milestones (events that are associated with action required by a Buyer, Seller, or service provider).

Sellers will have tracking capabilities on their personal home page which will count number of times their property came up in searches, number of actual page viewings, and number of buyers holding their listing in their personal page. Specific buyer information on who is holding the listing is not shown. Communication is not available until contact is made by the buyer.

Possible milestones represented on the timeline are:

- Offer Made
- Offer Accepted
- Deposit Confirmed (Escrow Funded)
- Required and Optional Services Purchased
- Disclosure(s)
- Survey
- Appraisal

*APPENDIX*

FutureNet Web Site

Future Net
System Design and Functional Specification

- Financing Commitment
- Inspection
- Other certification tests (varying by type of transaction, geographic region, etc.)
- Insurance Verification
- Walk-Through
- Clear to Close Not all milestones will be applicable to each transaction as some events are optional (i.e. home inspection). The timeline events and dependencies will be stored in a timeline reference table. Additionally, some events which are represented by milestones on the timeline, can operate in parallel. One example would be a home inspection and a mortgage commitment, both of which are mutually exclusive, both pertain to the same real estate transaction, both can be in process simultaneously, but both are dependent on the milestone of "Offer Accepted". System design has to accommodate for a configurable rules-based timeline. The table below gives an example of the type of rules (not comprehensive) that timeline processing must support. (The table below requires further definition and clarification).

| Timeline Milestone | Buyer/Seller/Affiliate/Both | Required | Dependencies |
|---|---|---|---|
| Offer Made | Buyer | Y | |
| *Offer Accepted | Buyer/Seller | Y | Offer Made |
| Required Services Purchased (Title) | Buyer/Seller | Y | Offer Accepted |
| Deposit Confirmed (Escrow Funded) | Affiliate | Y | Offer Accepted |
| *Survey | Either | | |
| Financing Contingency | Buyer | Per contract | Escrow Funded |
| Inspection | Buyer | Per contract | Escrow Funded |
| Insurance Verification | Buyer | | |
| Seller's disclosures | Buyer/Seller | Y | Seller must submit; Buyer must review |
| Walk-Through | Buyer/Seller | Per contract | |
| Clear to Close | Buyer/Seller | Y | Per contract |

*Varies by state. System design has to accommodate variances between states pertaining to real estate transaction conventions. The user will be prompted to select their state prior to making an offer. Geographic parameters are required in the rules-based timeline design. The timeline will be structured so that it is universal in nature, but will also be flexible. As each milestone is completed, the timeline will be updated on both the Buyer's and/or Seller's timelines as appropriate, with consideration for privacy issues. Appropriate parties will have the capabilities of sharing information and milestones with each other. Ex. The buyer may share the home inspection report with the seller, or vice versa if the seller has the home pre-inspected. If a milestone does not

APPENDIX

| FutureNet Web Site | Future Net |
|---|---|
| | System Design and Functional Specification | apply, it will still remain displayed on the timeline but in state that visually indicates a not applicable state. The reason for this is to ensure that the timeline will be visually consistent.

*As discussed, some contract and closing requirements are regionally specific. The primary responsibility for ensuring both parties are aware of these responsibilities will be on the Settlement provider. The technology will enable all providers to communicate any requirements through the process.

State selection will automatically be done by the system based on which state the listing is located in.

Mortgage and Title company services will handle closing cost calculations due to variability. FutureNet will display a "Good Faith Estimate" (Base calculation to be determined and included in the specification here).

If a buyer is being making an offer without a mortgage (if NO mortgage contingency is checked and the user is pre-approved for financing), the system will prompt the user to confirm if the transaction is a "cash deal". In situations where the virtual agent thinks there may be an error, the system will prompt additional questions.
Please identify what types of errors the virtual agent would perceive?

The system will include automation for notification of critical events. NOTE: FutureNet is to enumerate a list of specific events.

The user interface will be designed such that elements in timeline will reference back (link) to help section. This is especially critical in the offer section. It will also be designed such that as a user needs service provider assistance, ex. Legal, title, mortgage, they will be available at the appropriate places on the timeline.

Purchasing of supplementary services, will not be referenced on the timeline (since there is no direct impact on timeline progression), but will available throughout the system on several screens. Legal services links, for contract help and dispute resolution, will be provided within the timeline pages.

A log within each buyer and seller personal page will keep track of all communications and the purchase of services. Communication specific to each particular home should be accessible under each home viewing. Ex. A buyer may have 5 homes in their personal home page. As they click each home, they will find the communications for that property. This information will stay within that timeline through close. It is possible to have multiple timelines go to closing – ex. An investor.

The system will generate default scheduling days and times ex. (for the property walk-thru, where applicable) to assist in scheduling.

The timeline will always be visible and accessible throughout the site. All areas of the timeline will refer to their corresponding text in the Help Yourself section.

4.3.2 Timeline Variances

It is possible that a timeline will be different for a real estate transaction for a lot listing than for a home listing. For example, a lot may require a soil test for expansive soils or for septic systems. This is a derivative form of the home inspection, although similar in nature with potential timeline impact, but different in purpose and detail.

The Buyer's and Seller's time for a transaction have the same basic representation. The merged timeline is created when a Buyer makes an offer on a property. In other words, when a contract is approved and submitted online by a Buyer, the timeline will show up in both the Buyer's and Seller's private pages.

A Seller's "virtual" timeline will actually start when a Seller lists the property. Likewise, a Buyer's "virtual" timeline will start when a property search has begun.

If a Seller has listed a property, until a Buyer has made an offer, the "virtual" timeline will be shown (with respect to no pending transaction) beginning with the "property listed" stage. Likewise with a Buyer, even if no offers have been submitted, the "virtual" timeline will be shown beginning with the "pre-approval" stage. The reason for this is to help clients to prepare for the process by guiding them through important steps using a wizard-driven approach.

Once an offer is accepted, an auto notification will be sent by the system to notify those parties with the home in their private buyer page (including those that may have submitted an offer) that the property is Under Contract. If there are any contingencies (home sale, financing, home inspection), the property will show Contingent. The help yourself section will define the difference between Under Agreement and Contingent Sale. Buyers will still be able to contact sellers during the period in which the home is Under Contract or Contingent Sale. Sellers will have the ability to change their status to Under Agreement once contingencies are met- the system will also be required to automatically change status once contingencies are met. Further clarification on this area is required.

4.3.3 Timeline Progression

Each milestone requires an action posted by some party (Buyer, Seller, or Affiliate). Once this is done, the milestone can be flagged (identified by a certain UI attributes – color/shade/font) with its appropriate status and then proceed to subsequent activities.

APPENDIX

FutureNet Web Site

Future Net
System Design and Functional Specification

> Some milestones would be: Have you read and signed the appropriate disclosures? Other milestones would be, have you received a CMA, been pre-approved, submitted an offer, had offer accepted, set up home inspection –within this category it would show the home inspection period of time (populated with Steps in the wizard will be determined based on where the user is in the process with respect to the transaction milestone. The wizard will have either a confirmation dialog sequence and/or an event-specific data entry forms associated with each process in a timeline. A confirmation for each milestone or event will be required. Confirmation can take several forms:

- Simple wizard dialog box confirmation (Buyer indicates financing not required – cash deal)
- Party signing a document (Seller signing disclosures)
- Two negotiating parties both signing a document (signing a sales agreement)
- Posting confirmation by an affiliate (i.e. mortgage commitment letter posted)
- Documents review confirmation (i.e. read property disclosure)

Some of the information will be directly populated by the service providers in network that enables timeline progression.

Certain events have to be categorized in the system in order to determine the type of action required to satisfy the milestone (to identify complete) in order to allow it to proceed to the next activity. This logic must be built into transaction workflow.

Due to privacy concerns, some information will not be posted to all parties, unless permitted access is given.

Need to identify which information. This would be a user-profile setting that restricts/permits this privacy feature.

4.3.4 Timeline - Wizard

Example of Timeline context-based Wizard:

The user interface would direct each user (Buyer or Seller) through their appropriate actions in a step-by-step manner to progress through each activity and milestone of the timeline.
An example would:

APPENDIX

| FutureNet Web Site | Future Net |
|---|---|
| | System Design and Functional Specification |

In Pennsylvania, a possible question posed to a Buyer to check off would be: "Have you read and received a Seller's disclosure"? If the answer is no, it could automatically prompt them to the Buyers disclosure, which would have been previously filled out by the Sellers and attached to their home page. The system could also prompt the user, when they get to the make and offer area, "Would you like a CMA before you write an offer?" The client could receive a free CMA or pay for the CMA at that point from an outside vendor.

Note that a Buyer pre-qualification would apply to any property that falls within the amount specified in the pre-qualification.

Once an offer is made by Buyer the official "transaction" timeline starts. The system will then continue to behave in an interactive manner that displays dialogs, prompting the user to take specific action(s) - asking questions that guides a client through the process.

4.3.5 Timeline Date Population

Once a contract is accepted by both parties, the system will automatically populate the timeline dates based on dates entered in the sales agreement contract. These dates will drive alerts to the client, reminding the user of certain events. Dates especially critical to the timeline are:

- Closing Date
- Offer Acceptance (Date & Time)
- Escrow Account Funding (Date & Time)
- Financing Application Date
- Inspection Contingency Date
- Financing Commitment Date Users must be able to amend the Agreement through the FutureNet system by Agreement. The system will not allow Addendums or Amendments not "signed" by both parties. When Amendments occur, the system pre-populated dates will change to reflect the new contract terms. Ex. Buyer and Seller agree to extend the closing date.

What happens is there is a disagreement regarding a closing date change? How is this interaction handled and what is the recourse?

4.3.6 Pre-approval

Prior to making an offer, if a client does not have a pre-approval letter from a mortgage lender (part of a Buyer's profile), the system will automatically refer the Buyer to a mortgage affiliate.

Within this area, we could explain that pre-approved Buyers offers are taken more seriously – "would you like to be pre-approved for a mortgage" – link to our lenders. This will also be available within the Help Yourself section, which will explain the benefits of pre-approval.

APPENDIX

FutureNet Web Site | Future Net
--- | ---
 | System Design and Functional Specification

4.3.7 Supporting Content

An educational component of the timeline exists that links each item in the timeline to other information. For each milestone, there is an area that explains its purpose. This information should be geared for both Buyers and Sellers (i.e. Sellers will also need to know why it is important that their Buyers are pre-approved).

This element will be a key step in the educational component. The goal is to develop a forum where consumers are able to learn what it takes to buy and sell, demystifying the process and making it less likely that they will engage the services of a realtor.

4.3.8 Virtual Negotiation

Buyers will have the ability to give Seller feedback about a property. The system will provide the ability to enable a Buyer to give feedback to the Seller. Messages will appear in the Seller's general message area.

Documents are a critical part of the online negotiating process. The document manage section describes the requirements on how to negotiate with online documents.

Virtual Appointment Scheduling- Buyer (and Sellers) will have access to a calendar to click and request an appointment online. The calendar will send day, date, and requested time emails to the appropriate party for response. The appropriate contactee (seller, service provider) will respond back to the proposed appointment. Once an appointment date (agreed) has passed, the system will send an auto-note to the buyer requesting feedback for the seller. This can be a free form (email type) or templated document. The seller could even provide a non-public rating of the home for the seller – ex. 3-4 stars. This system would also be utilized to schedule appointments with service providers. Messaging notification functions like text, email, and paging will be applicable.

*If enabled by seller, buyer may also choose to contact seller via telephone number provided.

FUTURE: Other forms of Virtual Negotiation include a forum where Buyers and Sellers can request an appointment on-line (using integrated calendaring systems).

4.3.9 Virtual Close

Currently providers have some "virtual close" capabilities. FNT will enhance these abilities through allowing correspondence and document sharing to occur in an electronic format online. The virtual close function itself is performed by an outside service provider, not FNT, although the FNT system may faciliate and enable the virtual close to occur by linking to the external service provider.

4.3.10 Offer Withdraw

An offer may be withdrawn by a Buyer up to contract acceptance. Once beyond this point, the contract is binding assuming all other contingencies are met. If a contingency is not met, the system will respond appropriately to a variety of conditions (based on configurable timeline rules), allowing the user to respond to varying scenarios, including

APPENDIX

FutureNet Web Site  Future Net
System Design and Functional Specification offer withdraw. If an offer is withdrawn, the timeline will be reset to the appropriate stage (or removed if necessary).

Further clarification is required to identify scenarios, define guidelines, and determine system behavior and subsequent activities around offer withdraw.

Possible points of failure in a transaction once an offer is accepted are:

- Escrow Funding
- Inspection(s)
- Financing
- Funds availability expires
- Walk trough
- Death
- Responsibility for escrow funds will be solely with the provider holding those funds. FNT will have no ability to negotiate or release escrow funds. System guidance for escrow funds will be to contact the escrow agent (settlement company).

4.4 Information Security / Sharing

4.4.1 General Security / Sharing Guidelines

The system will protect client information by only disclosing specific information to appropriate parties. As an example, Seller information, by default, is restricted such that only the public listing data is shown on a public page to a Buyer.

A Seller's personal information including name, phone number and e-mail address will not be shown to the public at large. If designated by the Seller, the information may be shown to a pre-qualified Buyer once contact is made through the system. The seller must have first identified that it is permissible for their phone number to be shown. Some sellers will prefer email contact. This may also protect sellers against unwanted contact by realtors. It is necessary to maintain visibility at some basic level for potential Buyers interested in a property to have visibility of a Seller's contact information so that a viewing can be arranged. The contact information will be shown to Buyers that make a specific inquiry into the property, by stating they want to make an appointment. An opt-out provision, whereby sellers can elect not to reveal this information to the buyer community, will be provided. As a design element, consider using a pop-up for non-pre-qualified Buyer's that inquire about a property.

Buyer and Seller information is restricted to only the parties that require their information to complete a given part of the transaction (allowed into specific "views" of data). Specific security rules are yet to be determined.

A Buyer and Seller will each have the ability to identify whether the specific documents (provider supplied documents) are allowed to be viewed by their negotiating counterpart. This content/document sharing flag can be set ay any time for any document (and its corresponding data entered by the service provider) in the document management portlet. However, once sharing is turned on for a document, it cannot be revoked.

*Appendix*

| FutureNet Web Site | Future Net |
| --- | --- |
| | System Design and Functional Specification |

4.4.2 Service Provider Information Access

Each service provider will have access to post information related only to their area of business. Generally, the Buyer's general contact information as well as the public property information will be accessible by service providers for the purpose of verifying identification.

Furthermore, only the service providers designated to satisfy transaction requirements for a given real estate transactions are permitted to view information related to that specific transaction. The transaction information will be shielded from all other service providers.

A mortgage company will have access to specific Buyer information and property information, and have the ability to import documents related to financing, appraisals, surveys, etc. Mortgage providers will have the ability to submit customary documents into the FutureNet system for use and review by their clients, but those documents will not be provided by FutureNet. Users can submit documents online and offline to a service provider.

4.4.3 Title Company Access

The designated title company for a given transaction will have the broadest access including visibility to all Buyer and Seller documents since they hold the responsibility for transaction closure.

4.5 Search Listings

All guests entering the Future Net web site are permitted to search for properties without registering, however they be required to enter minimal information when they would like to list a home or utilize the benefits of the system, including but not limited to timeline functions, auto-notification of new listings, contacting a seller of a property:

- Name
- Phone
- Email address

The system will allow listings searches to include, but is not limited to, the following attributes:

- Listing type: new construction, existing home, foreclosures, All (default)
- Geographic proximity (within nn miles of zip code)
- Price range
- Property attributes
- Number of bedrooms
- Square footage
- Lot size/Acreage
- Number and type of garage(s)
- Number of bathrooms

APPENDIX

FutureNet Web Site  Future Net
  *System Design and Functional Specification*

- Age of house

Property listing information will also allow search based on Property Conditon. Users can specify whether a property needs a complete rehab, fixer upper, needs updated, fair, good, excellent condition. Users can search only Certified Homes.

"Perfect Home Finder" -Setting search criteria may be phased, allowing buyers to submit as little or much information as they desire. Search results best meeting their criteria will be identified first (top of page) along with Featured and Certified homes. Consider using a % matching system for criteria specified. 100% matches will be denoted as the "Perfect Home". This changes the scope of the search capability. Estimates need to be given for additional development time to support this request.

The system will identify with an image (icon) homes with open houses within the coming time period (i.e. weekend).

Search results will be displayed with several listings on a page (with pagination) including primary property photo. From the search results page(s), each property is linked to its detailed view that contains all property information and all photos.

The Buyer can select a property to be added to its "active" list. These will be kept on the bottom portlet of a Buyer's page for easy retrieval.

4.6 Registration

The registration process is similar for both Buyers and Sellers. In fact, there is no distinction between roles until a transaction/activity commences. A Buyer can be a Seller using the same login.

Consider for future implementation: Once a Buyer makes contact with a Seller, then a pre-approved notification is sent to the Seller. This is intended to encourage intra-system communications between parties.

When a user selects a user interface control to "List" a property, for example, the user is at that instant acting as a Seller, and the corresponding screen context is established.

When a property search takes place, the user, at that instant, acts as a Buyer, and the corresponding screen context is established.

The user can change contexts by clicking on the appropriate screen context (i.e. tab context).

For a user, the user's role "landing page" (Buyer or Seller) is based on the recent role acted upon. In other words, a Seller would always see the Seller landing page when logging in again.

For anonymous users, channel selection must be done (Buyer vs. Seller) to direct the system to the appropriate role.

Registration is required to perform activities beyond property searches (or just reviewing public site content).

*APPENDIX*

| FutureNet Web Site | Future Net |
|---|---|
| | System Design and Functional Specification |

Registration information includes (at minimum):

- Username
- Password
- Name
- Organization (if applicable)
- Address
- Marketing Source Information (how did you find out about Future Net)
- Reasons for buying/selling
- What time frame are you considering buying/selling
- Phone
- E-mail address
- Preferred communication method-What information would you like alerts for and how would you like to be notified? Ex- Notify me by all methods of a 100% (Perfect Home) Match. Offer notification as well as Offer negotiation correspondence may want different notification. Traditional communication will be via email with a note bringing the user back to FNT.
Need to enumerate the events that would initiate notification.

Other profile information includes:

- Preference to only show Seller listing to pre-qualified Buyers
- Show name, phone number, and e-mail address to Buyer/Seller Users may login into the system and update their profile at any time.

The user's payment profile may be maintained at any time, although the user will not be prompted for payment information until the first instance of a transaction requiring payment.

When listing their home, Seller's will be asked whether or not they would like their personal contact information to be shown to buyers that are not pre-approved. If they select this private option, an icon will be displayed to the buyer submitting a query for this property. It will then prompt the buyer to get pre-approved or enter their pre-approval information if it is through an outside lender.

The system is to track how many communications and offers buyers make. The purpose of this audit is to provide information for manual review so that identify potential fraud or realtor solicitation of listings.

4.7 Document Management

4.7.1 Online Document Forms

As mentioned in the Help Yourself section, a comprehensive list of information to assist in the sale of a home will be available to print. Forms completion and submission

APPENDIX

| FutureNet Web Site | Future Net |
|---|---|
| | System Design and Functional Specification | requires additional processes which are integrated with a document management system and the Timeline. Generally, Sales Agreements will not be made available to print without fee to the appropriate provider of such forms.

Note: For online forms that use an approach by which a screen entry form contains fields that are merged onto a PDF file generated by the system as "the document", a snapshot of the current state of the form entry fields will be maintained. This will enable a user to modify the document based on current field values and submit an alternate version of the document (i.e. counter offer). This is also considered a key candidate for audit trail logging.

All documents published online can be printed.

Service providers will be permitted access to documents. NOTE: Need permissions based rules for document access and specification of document access business rules.

Certificate Provider for document signature authentication. [openca - sourceforge]. There are a number of services such as VeriSign and other components that will provide the level of security required for the signature. Further investigation is required to determine the most appropriate approach and service to implement.

4.7.2 Document Engine

A document management component is a required part of the system architecture. A large number of documents are expected - proportional to the number of real estate listings.

The document engine will store the actual documents in its internal format (normally compressed)

All imported documents regardless of original import form should be converted to PDF format. (I.e. a MS-Word document is converted to PDF file upon import).

All document retrieval will be viewed and printed in PDF file format.

4.7.3 Online Form Fields

The user interface will contain the data fields necessary to propagate its respective online form. Each form can be "previewed and printed" before submitted. The preview propagates the transaction-specific content in the form. Once a form is "approved", the form is "digitally signed", converted to a PDF file, and then stored in the document management system. Once approved, the original form is signed and posted and cannot be altered. However, an updated version can be created. This provides an audit trail of changes.

A new version of a form can be submitted. The system will maintain a record of the most recent data entered for each form. To submit a new version, the user will modify the data in the screen corresponding to its particular document/form and then "approve". This will merge the modified information onto a new version of the document to be stored in the document engine as a new version.

*APPENDIX*

| FutureNet Web Site | Future Net |
|---|---|
| | System Design and Functional Specification |

4.7.4 Future Net Document References

The Future Net database does not store the actual document, but rather a reference to the file stored by the document management system. The document management system is required to provide a unique identifier referencing the stored document. In turn, the document engine must be able to retrieve the file to the caller when passed the unique document identifier.

The Future Net system identifies stored document references based on document data identification in the Future Net database (as well as from within the document engine). To display a document, the user clicks on a link representing its corresponding document, and the document engine retrieves the document in the browser.

Future Net will neither e-mail nor route documents. Documents are only viewed, uploaded, or downloaded within Future Net. Documents pertaining to transactions with FutureNet service providers will be available for view within the Service Provider To-Do Page.

4.7.5 Document Security

User authentication is always required in order to access areas that permit forms and document processing.

Documents are only allowed to be seen by parties when:

- Buyer/Seller gives permission
- Required by a designated affiliate for processing Only Service Providers that are specifically chosen by the parties involved will have access to documents. If a Buyer selects a Mortgage, Title, and Home Inspector from our list of providers, all necessary documents (ex. Sales Agreement, Property listing information), will be routed to the appropriate provider. Business rules will be developed to ensure documents are accessible by appropriate providers. A Home Inspector would not have access to the Sales Agreement, but the Title Provider would. Buyers and Sellers will both agree and disclaim prior to any information sharing with Service Providers. As a condition of using our services and Service Providers, Buyers and Sellers will be aware that documents related to the closing process will be shared with network providers.

An additional layer of protection in information sharing will also exist within the Timeline. Any time a Buyer or Seller would like to share information with any party, Service Providers included, they will be required to check that they are permitting that party access. A Buyer could allow a Seller to read a Home Inspection report, for example, but Seller's would not otherwise have access to that document. Likewise, any mortgage documents, particularly Pre-Approval letters, Application confirmation, and Mortgage Commitment will all require approval before sharing with another party. This is not an inclusive list as there are many other examples. The main

APPENDIX

| FutureNet Web Site | Future Net |
|---|---|
| | System Design and Functional Specification | point is that all information being shared must be given access by the appropriate party.

4.7.6 Digital Forms Signature

A Digital Signature will be comprised of an enterable field where initials are required, and a checkbox identifying either the "signing" ("approval") or "rejection" of the form, and clicking a button that indicates "Submit Signed Form".

4.7.7 Negotiation

The negotiation process will take on a different nature using online document management and storage than with physically signed documents. As an example, a Sales Agreement form will not directly be filled out, but rather, a web for with fields corresponding to blanks on the legal form will be filled out by the user. When signed, the fields are propagated on the document (analogous to a mail-merge) and converted to a PDF file and a record of signature is recorded in the system. If a negotiating part requires changes before approval, the document itself cannot be modified, but rather, the fields on the web form corresponding to the document are modified. When changes are made, the process of field propagation, PDF generation, and signature recording is repeated, until both parties accept the document without change.

4.7.8 Document Receipt Signature

Signature is required by both parties on several documents during the transaction life-cycle. The document signature process will be use throughout the system. An official signature is described above. In the situation where a document may impact a milestone (i.e. offer accepted) once a document that requires signature by both parties has been accepted, the status for the respective timeline event is updated and the timeline progresses to the next stage.

A document is considered accepted and "signed" by both parties when a both parties digitally sign a document without any changes submitted between signature, and when a signature record is recorded in the system. Information pertaining to a digital signature record includes:

- Unique Document Identifier
- Document Type
- User ID
- Time/date stamp
- Initial used to sign in text signature field
- All field content entered that correspond to the document form fields

4.8 Messaging

An integrated component of the Future Net system is an integrated message component. This component functions like an email system, however, no email addresses are actually specified – login user names (or aliases) are used. Using an email engine, messages are routed automatically by alias to the appropriate e-mail

APPENDIX

| FutureNet Web Site | Future Net |
|---|---|
| | System Design and Functional Specification | destination. Each registered use will have a corresponding system-generated e-mail address (transparent to the user), which resides within the Future Net domain. This e-mail address is different than the one declared by the user in the profile (user's public email address outside of Future Net).

Message capabilities are limited but include:

- Send messages
- Notification of unread messages
- Read new messages and review existing messages
- Delete message
- Reply to message A user may also elect to have messages forwarded to an external email address (via smtp gateway). This is maintained in the user's profile.

A Buyer is not required to make an offer in order to communicate to a Seller.

A Seller can elect to "block" communications from a specific Buyer (or globally for all Buyers). If a Seller blocks message capabilities, an image (icon) indicating the Seller "block" is shown in the Buyer screen.

Messages exist only between the Buyer and Seller for a given real estate transaction.

Messages between a Buyer and Seller are exclusive to that relationship. No other parties have access to these communications.

Messages may exist between a Service Provider and a Buyer or Seller.

Event / Alert notification includes paging, e-mail, and cell text-message notifications.

If an offer is made below certain percentage of asking price, provide system audit tracking and system administration (manual review) monitoring.

DO NOT INCORPORATE BLOCK FUNCTION. Let the system mentor users from inappropriate offer behavior (% below listing price). Possibly put auto-block offer if below certain percentage of asking amount. Consider incorporating as a parameter in the Seller's profile the minimum accepted offer, under which offers would be blocked.

4.9 Content Management

In part, a content management component is required to support marketing requirements on behalf of the service providers and Sellers.

Service Providers are required to pay either transaction fees or subscription fees to Future Net based on the type of program offered. For such fees, service providers will be considered Future Net members and qualify for certain benefits including online

APPENDIX

| FutureNet Web Site | Future Net |
|---|---|
| | System Design and Functional Specification | space advertisements. A content management publisher component will be required to dynamically generate service provider advertisements (rotating ads, coupons, etc.).

A template will be provided within which to fill content (including logos) for the service provider coupons.

Sellers can also purchase premium services such as a "featured listing" which provides a picture (with its corresponding information and link) to be placed in a prime screen location(s) on a rotating basis that guarantees all featured listing subscribers equal visibility (i.e. shown on a general public home page).

Another section of dynamically generated content is similar to an Entertainment book on-line. It will include a network of neighborhood providers, similar to the "Welcome Wagon" concept. As outlined in a Portals section, each affiliate would have their own home page on Future Net in which they will be able to maintain company data and coupon offer information. Annual subscription fees will be paid to participate in this program.

Service providers will be able to sign up online to be a provider with FNT. Their application will be send to FNT for review. Qualifications may apply.

Need to provide an additional Administrator capability to enable review and approval of applications. This would include a search panel to review outstanding registrations/ applications and then approve (or decline) applications. Need to provide time and cost estimates for additional panel(s).

A yellow pages directory including listings for all member service providers will be published.

Advertisements publishing on the web site will be initially templated.

Affiliates will be able to submit graphics content and video (FUTURE: FutureNet will provide access to designated streaming video service providers) for online posting in lieu of or in addition to text-based content that is templated by Future Net.

Virtual Tour (FUTURE: Also done by FutureNet streaming video service providers) providers will be able to submit links to video clips of a property shown from their site. These services will typically be contracted by a Seller. The system will ultimately have to be capable of showing the virtual tours to any public (anonymous) user.

Geographic-specific content will be published that enables users identifying information and characteristics of their local community. Types of information might include school district information, city comparisons, neighborhood profiles, cost of living, climate, etc. Initially, a link to an outside supplier of these services will be provided. Any time a link is initiated, the user will be able to view and access the information but will remain in FutureNet's site. Initial phase will consist of an external link to public community site.

Include in initial phase Testimonials demonstrating that Future Net is easy to use, step-by-step, easier than selling with an agent.

House for sale Readying tips- this will be an area where tips are given on getting the house ready for sale, like cleaning carpets, changing old light bulbs, etc. Ideally, "Home Detailing Co." can provide this and we can link to their services directly from this page.

APPENDIX

| FutureNet Web Site | Future Net |
|---|---|
|  | System Design and Functional Specification |

A link (external link – not an integration point) to a "Your credit report" provider (describing why it is important to get a copy – to be written by Future Net in the Help Yourself section). There are also providers that "fix" credit scores that could become affiliates.

A provision in the system will allow Future Net's attorney network to modify and create new forms, then upload them to the system, much like a service provider network. Initially, standard forms will be loaded by a Systems Administrator role. The attorney provider will be able to make changes to current forms or add Addendums to insert into the system. These will not be available universally, only for the selected transaction Timeline.

FUTURE: Upcoming Seminars.

- View a seminar on-line
- Review written presentation on-line (why to attend, what is covered)
- Find dates and locations If prior to launch FNT has on-line seminars, video explanations, or other content available, they will be included in the initial rollout.

For New Construction Properties: Insurance rates may be able to be pre-populated into the system by a designated insurance company. Investigate integration to web servces for insurance service providers.

4.10 Mortgage Calculator

Considered a critical tool and a key ingredient in ease of use is the mortgage calculator.

Use pre-populated sample down-payment based on finance program.

The capabilities envisioned here extend beyond the traditional mortgage calculators since the calculator is contained within the context of each specific property listing which holds relevant information including listing price and annual property taxes. A form-based screen calculator will automatically show estimated mortgage payments based on 6 pre-defined common financing programs at current market rates and various downpayment methods.

Variables, including down-payment, sale price, and interest rates will be able to be modified by a Buyer viewing a particular loan possibility. System defaults will always be current market data populated by Mortgage Provider, as well as listing information. This 6 Ways to Borrow will be printable by Buyers and Sellers. Sellers may use this tool as a piece of marketing collateral to display at their home with their printed listing information. Consider including 6-Ways to Buy on the Buyer's landing page. Highlight lowest cost/most favorable terms, calling out using visual means (i.e. pop-up).

APPENDIX

FutureNet Web Site          Future Net
System Design and Functional Specification

Mortgage rates will have to be housed on Future Net (entered on a basis of which the frequency is determined by changes in the market rates from a key service provider (expect daily rate changes).

The calculator would utilize annual insurance amounts stated by the seller in its calculations. An estimate of the the annual insurance premium based on key property attributes (i.e. square footage and price) from rate information may also be provided by a primary insurance service provider (particularly for new construction). Calculation rules for estimates will be determined by the contributing Insurance Provider.

The mortgage calculator is a key benefit to Future Net users so it will be prevalent and accessible from several places.

If not available for the target transaction or property information, the user will have the ability to enter estimated property taxes, insurance, in addition to a down-payment amount.

Any screen where mortgage information exists, if a registered user is not pre-approved through FutureNet (based on the user's profile) a "get pre-approved" link should appear. This will invoke the appropriate portion of the Buyer wizard.

A Good Faith Estimate of Closing Costs will be available from the Mortgage Provider. Buyers will be able to receive this information from multiple locations, including Seller listing pages and within the Timeline.

FUTURE: Consider integrating to Lending Tree as a possible source for a premier lending provider.

A special feature would include a property comparison in which a Buyer selects two properties for which the mortgage calculator is run, showing the difference in payments between the two properties. Include property attributes in vertical comparison.

4.11 Help Yourself – Customer Self Service

The site contains additional content that aids in customer self service.

Explanatory Area: This is where Buyers and Sellers can obtain information on how the site works, Q and A, an overview of our tools available, and a site map. A Home Selling guide will be provided within this section. This may be populated by FutureNet or an outside partner.

Home selling guide video presentation.

4.11.1 Online Forms

Online Forms: Once a user is registered as a user, access is permitted to the Customer Self Service area. Content available includes a comprehensive list of real estate forms by state including:

APPENDIX

FutureNet Web Site

Future Net
System Design and Functional Specification

- Contracts
- Disclosures and Consume Notices
- Sales Agreements

4.11.2 Closing Cost Calculator

Closing cost calculator: The anticipated net "owe/take" at closing will be estimated. This function should be built into the timeline at the Seller listing page and available when an offer is made. As previously discussed in the Mortgage Calculator section, the Mortgage Provider will perform this function in the form of the Good Faith Estimate. Data from the listing will assist the mortgage company in providing accurate estimates. Prior to closing, the Title Provider will provide both parties with a HUD 1, a standardized document showing proceeds and settlement charges. The Title Provider will upload this document into the system prior to close. It will also be a Pre-Requisite to move to the Final Step, Closing.

*4.12 Online support (chat, text)*

Although the intention of system design is focused on ease of use and simplicity, support is always necessary. Required support will be in the form of telephone through a toll-free number, and online chat, and an e-mail submission form to a Webmaster.

An online chat component is a required part of systems architecture and the link to invoking online support should be visible from any page.

The e-mail support form will be available from a link on the global user interface template ("contact us" tab).

Level one application support for online clients is an option required to be part included as part of the bid proposal process.

Need support quote.

*4.13 Event Notification*

The system will provide notification to clients in variety of manners:

- When milestones have been closed
- When a property price changes that an interested party has in its active portfolio
- When a new listing that fits within a Buyer's profile is met. A Buyer's notification profile (similar to a search) is maintained in a Buyer's profile. Only one notification profile will be saved per Buyer.
- When the property for an interested Buyer (property select to be included in a Buyer's "active list") is scheduled to have an open house.

APPENDIX

FutureNet Web Site  
Future Net  
System Design and Functional Specification

- A Buyer can maintain multiple profiles, particularly useful for Investors. A user can submit multiple offers and have multiple timelines occurring simultaneously. This changes the system scope and design. Additional analysis is required to determine how this would be handled and impact to the system design, database schema, etc. The initial national roll-out can accommodate this by allowing multiple log-in ID's.

Event – term used to reflect a specific point in the timeline

Notification will be performed through:

- A message (email) within the Future Net system
- An email message forwarded to a client's external email address (if set up in the user's profile). The system will still log a message within the Future Net message area.
- FUTURE: A text message to a client's text messaging system (also defined in the user's profile)

Notification of email messages forwarded to a client's email will consist of the subject of the email message and a link to the Future Net system, but will not contain the email details. An example would be a new listing alert in which an email is forwarded that contains a subject line "Future Net New Property Listing" and the message body would resemble the subject line with the http link to Future Net, but would not include the specific details about the property listing in the email body. By doing so, information is not exposed to public email, providing a better level of information protection within Future Net. Furthermore, users will be driven to Future Net by withholding the specific details until the user logs into the web site (which is intended to improve "stickiness").

The system will provide auto-alerts of new property listings to Buyers based on profile. Profile parameters and event / alert rules to be defined by FutureNet.

The milestone dates (based on the sales agreement contract) will be used to alert the user, providing notification of coming (or elapsed) dates.

FUTURE: A notification event may be sent to a current/potential Buyer (or homeowner already who has previously closed on Future Net) if interest rates are changing for refinancing purposes.

*4.14 Map Service*

This is also referenced as a point of integration.

A mapping service provider (Mapquest) will be contracted that enable a user to click on a link on the property detail screen that forwards the property listing being viewed to the map location using the property address.

*4.15 Electronic Payments System*

This is also a referenced as a point of integration.

APPENDIX

FutureNet Web Site      Future Net
                                                        System Design and Functional Specification

An electronic payments provider(s) will be used to process payments automatically for any potential real estate transaction fee as well as supplementary services purchased. Payments to fund the escrow account will not be processed through Future Net. Rather, these will be managed through a title company. Note that escrow funding payments are not allowed to "create debt".

Payments types include:

- Credit Card (American Express, Master Card, Visa)
- Debit Card
- Wire Transfer Payments processing information will not be solicited until the first point at which a Future Net client incurs a charge. Information request depends on payment type.

For credit card:

- Billing Address
- Credit Card Type
- Electronic Check
- Name of Card
- Expiration Date For Debit Card:

- Bank Number
- Routing Number
- Name on Account

Both an approval request screen and a payment confirmation screen will be used in the payment transaction process. The confirmation screen will be printable. Payment transaction history will be viewable either on one of the user's profile pages or accessed via a link from one of the user's profile pages (depending on service provider capabilities). A list of transaction will be displayed which link to a detailed page of the transaction payment details.

A Seller will pay for any supplementary services purchased.

A Buyer will pay for only for any supplementary services purchased.

The payments service provider will host all payment profile and transaction information offsite. A FutureNet internal reference, mapping the user's FutureNet user profile to the payment service profile will be maintained. This will enable processing of future transactions without requiring re-entry of all payment data (i.e. credit card or bank account data).

*4.16 Supplementary Service Purchase & Coupon Redemption*

NOTE: Need to address cancellation or change of services, handling of payment terms for various services, and "Code of Ethics" requirements for service providers.

APPENDIX

| FutureNet Web Site | Future Net |
| --- | --- |
| | System Design and Functional Specification |

Supplementary services can be purchased by a Buyer or Seller. This is done by selecting service options (for specific providers) from a form.

Additionally, to simplify system use, a bundled package of standard services can be purchased by click on a given package option.

Either a Buyer or a Seller can purchase affiliate services directly from the provider through our system and through the Timeline.

At the first point where a service is purchased that is paid outside of real estate closing, payment information form is required. For some items Paid Outside of Close (POC)

When a Tier 1 affiliate that is required to post information on the Future Net site for a real estate transaction on behalf of a Buyer or Seller, the activity of creating the posting simultaneously generates the record of transaction fee charge payable to Future Net. At the point of the first transaction (for either a Buyer or Seller) payment method information is solicited.

Once a contract is accepted, the system will prompt the user to optionally select a title company, set up home inspection, home warranty purchase, mortgage lender, etc.

The ability to select Tier 1 services (or Tier 2 services) needs to be accessible from several points within the system.

Some services for Tier 1 providers can also be purchased outside of a real estate transaction (i.e. survey, home inspection, and appraisal). The system will not limit the services purchased. If an outside customer would like to use one of our Service Providers, they will be allowed provided appropriate registration has been made. Their purchase will be tied to their newly created Buyer Timeline, which may have gaps since they not using FutureNet for their entire transaction. All clients of this nature will be categorized as Buyers.

4.16.1 Coupon Redemption

Electronic coupon processing is a concept that reaches beyond the scope of guaranteed transaction fee recovery due to manual operations and system interactions required to support coupon redemption. Conflicting objectives exist between the inherent nature of electronic coupon redemption and providing coupons that can be printed online and the quoting, contracting, and scheduling of services. The nature of contracting services outside the system is diametrically opposed to the concept of working to retain activities within the system. Furthermore, the cost for most services is highly variable and requires an estimate (quote) prior to service procurement, and the quoting process naturally resides outside of the system. Additionally, there are no mechanisms to enforce an affiliate to "declare" that a Future Net coupon was received which in turn would incur an additional transaction fee to the affiliate.

Only those services purchased that are a dependent part of the timeline can be enforced since service provider posting is required.

Online coupon redemption is problematic from a business process standpoint and several gaps exist that would prohibit effective management of Tier 2 service provider purchases transaction management from within the system.

APPENDIX

FutureNet Web Site

Future Net
System Design and Functional Specification 4.16.1.1 Potential Coupon Redemption Solution One concept to resolve this situation will involve these primary aspects:

- Coupons can be printed only when a "Click to Redeem Coupon" button is pressed for a given coupon. This event will record the service provider action in the system with the client real estate transaction.
- Service providers contracted by Future Net clients are paid out-of-pocket (outside of closing costs) at regular quoted rates with a discount promised at closing time, paid by Future Net.
- A check for discounted services is received by client at closing. Before the closing cycle, the user is prompted to "check" on the service providers which were contracted on behalf of the client. A screen is dynamically generated that includes only those for providers for which coupons were redeemed. Upon submission of this form, Future Net can notify the vendor the coupon is being redeemed. The service providers would respond only if the services were not paid for/rendered.
- Upon verification with service providers that the services were rendered, the client will receive a check for the aggregated amount of discounts at closing. (Negative confirmation will be used for service providers. In other words, if a service provider does confirms that a client did NOT use their services, then the rebate will not be issued. In the absence of a confirmation, it is assumed that the services were rendered. This is intended to simplify the process by managing the exceptions).
- Periodic reporting will be provided to affiliates regarding the amounts to be refunded to Future Net based on the discounts given to clients for affiliate services discounts. A provider may also set up an Automatic Payment account to pay FutureNet for these services. These issues are yet to be fully defined.

Any SP can be paid at close if the SP agrees and the title company is notified. This is the preferred option since the rebate is given at closing time. Otherwise, payment discount rebate at closing becomes problematic.

The benefits of this program are that:

- The marketing potential of clients receiving an additional check at closing
- Users will be required to identify
- Business process provides a check and balance that is verifiable
- Service providers have additional cash since they temporarily hold clients' discounts.

Another issue not yet fully defined is how to refund/credit customers who are not currently in the transaction process. Ex. A Buyer who purchased a home through FutureNet and now would like to get their carpets cleaned by one of our providers.

*4.17 Public and Private Pages for Clients*

Distinct portals will be created for various players whom each have unique roles in the system. These roles are:

APPENDIX

| FutureNet Web Site | Future Net |
|---|---|
| | System Design and Functional Specification |

- Seller
- Buyer

4.17.1 Seller Pages:

FutureNet to provide Seller listing sample information.

The Seller Portal contains:

- CONTENT: Marketing content demonstrating value proposition – advantages of listing a property through Future Net. Links are provided to support this marketing content (QA, overcoming objections, etc.)
- Sample Seller Listing Pages as well as a How to Navigation.
- 6 Ways to Borrow Mortgage Calculator.
- CONTENT: Explanation. Here is where an explanation is given that Future Net is not in any way affiliated with realtors. Also, an explanation is given that if their home is listed with a broker while listed with Future Net too, they would have to pay their broker a commission
- Private page(s) for information that is only seen by the Seller (User Interface shown later)
- A public page (pertaining to a specific property listing) that can be seen by anyone on the site (User Interface shown later). This page will be utilized by the Seller for printable fliers.

A Seller's private page will include information relating to:

- Wizard Portlet (Direct use what to do next) with To-Do's
- Pending Transactions (Timelines)
- Messages
- Documents
- Number of hits on a property
- Other profiles (payment information)
- Number of buyers holding home in their private page
- A notepad function (If this is just a text field in the private page, then can be included in initial scope. If, however, there is to be a dynamic notepad function accessible from multiple places, this is beyond current scope and will be additional T&M).

The listing property information will become visible to the public. Listing information includes:

- Property address
- Property Tax Number
- Description. The description is a key area for the Seller in that it is the marketing copy which holds the creative story of the property, community information, etc.
- A full representation of MLS-like information

APPENDIX

| FutureNet Web Site | Future Net |
|---|---|
| | System Design and Functional Specification |

- Open house dates

4.17.2 Buyer Pages:

The Buyer Portal contains:

- A private page(s) for information that is only seen by the Buyer (User Interface shown later)

Unlike a property, the Buyer submits no content that can be seen by a Seller, other than:

- Name, phone, e-mail address
- Whether the Buyer is pre-qualified

A Buyer's private page will include information relating to:

- Pending Transactions (Timelines)
- Messages
- Documents
- A notepad function (If this is just a text field in the private page, then can be included in initial scope. If, however, there is to be a dynamic notepad function accessible from multiple places, this is beyond current scope and will be additional T&M).

The notepad function will be available at any time for users to make notes about a property, make notes of verbal communications, compare homes or service providers, etc.

4.17.3 General Buyer & Seller Guidelines

A Buyer can also be a Seller and a Seller can also be a Buyer (of different properties)

A Seller can list multiple properties.

A Buyer can make offers on multiple properties and have communications with several Buyers concurrently.

One specific feature in this area (although it will actually occur when the Seller is submitting a listing or editing his/her profile page), is for the Seller to indicate whether to show contact information to Buyers that are not pre-approved.

A component of the Buyer profile will indicate whether the Buyer is pre-approved. The system will inquire the Buyer upon registration whether they are pre-approved with FutureNet. If not already pre-approved, the Buyer will be asked if they would like to be pre-approved with one of the Future Net vendors. If approved, we will ask with whom and for how much. We will also ask the Buyer to provide contact info for that service provider.

Design elements will include specification of which points in the user interface documents will be loaded (i.e. survey).

APPENDIX

| FutureNet Web Site | Future Net |
|---|---|
| | System Design and Functional Specification |

An investor tab will be included. Investors will be treated as a separate user community. This has significant marketing content implications.

The Seller will be able to import up to 10 photographs and designate the "primary" photo shown on a search (or a featured listing) (Builder can import additional photos).

The Seller will be able to complete forms-based disclosure(s) documents provided by the attorney provider.

The Seller has the option to disclose their name, phone number, and email information to a specific Buyer. All other information will be restricted to only the Seller's private page(s). Conversely, Buyers will have the same option in communicating with Seller's.

Buyers and Sellers can import documents into their own Timelines. Ex. A Seller could import a survey.

FUTURE: A Seller has the ability to "block" communications from a specific Buyer (or any Buyers) for a property. Any blocking will send a communication to FutureNet to investigate potential problems. This issue is yet to be defined, as instead of blocking we may simply have a reporting function to report users not using the system properly.

A Buyer can also submit feedback to a Seller relating to a specific property that is only visible to the Seller (restricted from any other Buyers)

A Bank is a derivative form of a Seller with the distinction of listing foreclosure properties. A bank (Seller) will have the ability to import additional addendums (documents) relative to the foreclosure property.

A Builder is a derivative form of a Seller with additional benefits of listing multiple properties. An additional feature provided for a Builder-Seller is the ability to create a profile for a home (based on a specific model) and duplicate those properties for another listing, thus relieving the user from having to re-key all property listing information. Additional features include the ability to import additional photos (i.e. of the construction progression for a specific property), blueprints, floor plans, etc. A builder can update the stage of construction under which a property exists.

A property investor is also a derivative form of a Seller (or a Buyer). A property investor acting as a Seller will use the system in the same manner as any other Seller, however will do so on a discounted transaction fee basis.

4.17.4 Shopping Cart

The Seller will have the ability to purchase signage.

FUTURE: The Seller will have the ability to purchase new print ads through Future Net

4.17.5 Closing

The system provides a function to allow the Seller to take their listing down (in cases where an out of network service is used to close). In this case, the Seller will be required to identify the closing title company and contact information as well as the Buyer information. This will enable billing the Seller directly through Future Net or submitting a bill to the closing title company if fees are later charged and will assist us in

APPENDIX

| FutureNet Web Site | Future Net |
|---|---|
| | System Design and Functional Specification | tracking closings, including the number occurring with out of network. Further clarification is required on this topic.

*[We should rewrite this section, since the rule business rule has been established to not allow use of outside service providers.]*

It is to be determined yet who is responsible to take a listing down (Seller or Title Company)

Provide a special investor portal that permit only investor Buyers/Sellers. Initial implementation would use the regular buyer/seller portal but allow investor designation during registration. A custom portal would be considered outside of scope. Further definition of portal requirements is required so a proper time and cost estimate can be given.

4.17.6 Listed Property Changes

A Buyer will be able to see the complete progression for each property. This inherently means that there is a separate timeline for each property transaction.

A Seller needs to have the capability to update information and correct errors on a property listing. The system will have an audit trail on key information changes.

4.17.7 Other

FUTURE: Future Net will consider support for other types of properties (commercial, rental, leases).

4.18 Portals

Multiple types of service providers exist:

Tier 1 providers:

- Mortgage companies
- Title companies
- Insurance
- Attorneys
- Home inspectors
- Home warranty companies
- Cleaning services
- Surveyors
- Virtual Tours Tier 2 providers:

- Moving companies
- Painters

APPENDIX

| FutureNet Web Site | Future Net |
|---|---|
| | System Design and Functional Specification |

- Landscapers
- Electricians
- Plumbers
- HVAC
- Laundromats
- Restaurants
- etc

*This is not an inclusive or yet determined list

Both Tier 1 and Tier 2 Service Providers have access to a web form through their portal used for maintaining marketing information used for public display (i.e. service fees, logo, business hours, contact, phone, address, etc.). This information will be used by the content management component to display service provider advertisements, yellow pages, etc. Service providers will be able to upload information as it relates to their business. Ex. A Home Inspector may choose to upload National Standards onto their site for review by the public. A local municipality or township may choose to load an event calendar.

Possible information on the service provider portal includes:

- Name
- Logo
- Photo gallery
- Company information
- Offers
- Printable / Electronic Coupon Identifier Effective workflow management is predicated upon member service providers participating in a timely manner to post information on Future Net pertaining to specific real estate transactions. The Future Net system is based on the premise that affiliates will cooperate such that client transaction information is posted promptly (i.e. mortgage commitment, title provider will notify when escrow funded, etc.)

The Tier 1 portal will consist of a "To Do" section that contains a list of all pending client transactions and their respective activities required to be performed by the affiliate. Each transaction in the "To Do" list will drill-down into a detailed view of the transaction with client/property specifics. Upon completion of the affiliate's business task (i.e. Home Inspection Report), the corresponding posting information is required in order to identify within Future Net that the milestone (task) has been completed.

All entries posted by service providers will be time-date stamped.

FUTURE: It may be necessary to measure service provider performance with respect to timeliness of postings. Affiliate score-cards may be generated that measure performance.

FUTURE: Client may also provide feedback to service providers and possibly use a ratings system to rank perceived performance.

APPENDIX

FutureNet Web Site

Future Net
System Design and Functional Specification

4.18.1 Out-of-network Affiliates

By Definition, FutureNet will not allow out-of-network affiliates.

FUTURE: If a client obtains outside of network services (service providers not contracted with Future Net as member service providers), the user (Buyer or Seller) is required to post information (i.e. Letter of Mortgage Commitment) including institution and contact information:

- Name of Institution
- Contact
- Phone
- Transaction-specific information

It then becomes the Title Companies responsibility to verify the information with respect to closing-related postings.

To diminish the desire for clients to go outside of network, Future Net commits to guaranteeing a "lowest cost" program for critical services (primarily mortgage rates). In this way, there is less motivation for a Buyer to seek other alternatives outside of the network.

4.19 Payment Schedules

Payment schedules are based solely on subscription fees.

The system does not need to accommodate for fee schedule management.

4.20 Information Audit Trail

NOTE: This section is to be priced as a separate feature.

An audit trail (historical record of changes) will be kept on the following information:

- Registrations
- Property Listings
- Real Estate Transactions
- Timelines
- Affiliate Content Postings
- Documents
- Messages
- Images
- Click-throughs
- Property Searches Initially, no programmatic reporting on the audit trail will be provided. It is sufficient that the audit trail is available on an ad-hoc basis.

APPENDIX

FutureNet Web Site | Future Net
System Design and Functional Specification

4.21 Online Appointments [FUTURE]

FUTURE: At some point, Future Net will have the capability to allow a client to schedule online an appointment with a service provider, or possibly even with their corresponding negotiating partner (Buyer – Seller). Due to the nature of complexity of this operation, this will be discussed during a later phase. Buyers and Sellers will still be able to communicate with each other and service providers to set mutually agreeable days and times. The future application will allow selection from a preprogrammed calendar where the Service Provider or Seller has left open appointments to be selected.

Consider using open source calendar control for visual reminder of events and appointments. Alternatively, consider using a wizard-based approach or pop-up.

4.22 Obscenity/Profanity Filtering

To prevent system abuses, the system architecture has to include system components that filter both text content and images since clients have the ability to load images into the system.

Any abuses should be logged and systems administration staff should be notified immediately.

Any violation will result in immediate termination of a Seller listing or Buyer privileges.

FUTURE: A client may be able to import video (in addition to still photos). When this capability is provided, a video-based filtering mechanism should be incorporated. Service providers will be able to input video, which will be reviewed prior to public availability.

5 System Architecture

5.1 Total Cost of Ownership

The system should be designed and implemented to minimize the total cost of ownership for the Company. The system architecture and class level design needs to directly address the following goals.

1. The system should scale linearly in relationship to the hardware used. Future Net needs to be able to anticipate the infrastructure costs associated with providing access to all site functionality in relation to both the amount of data and the number of concurrent users. To meet these needs Future Net world prefer to scale out with a larger central database and smaller "pizza-box" style web servers.

2. Partner and referral sites as well as packages should be isolated from the core system functionality. While the relationships with partners are valued, affiliates and the value that external packages bring, the provided functionality may need to be replaced as a result of changes to business

APPENDIX or pricing models. As a result the system design needs to insure that future net's business model is not held hostage as a result of a tight coupling with an external resource.

3. The site and system design should account for the addition of features not currently in the scope of the project.

The system should be architected such that standard system components, development methodologies, tools, and practices are used so that the system becomes both extensible and maintainable, and that both the technology platform and application software is supportable.

The web site will be hosted externally at a web hosting site service provider contracted by Future Net. The hosting company is to provide access to system for support and upgrades to the contracting developer at all times.

6 System Use Cases- These require additional work.

System Use Cases are descriptions for how people will interact with the system in context. The Use Cases are designed to be independent of the user interface and focus more on what generally is supposed to happen as opposed to how specifically something will happen.; to illustrate what a user will input, and what the system will return without addressing how (technically) the system will work.

These use cases are high level, illustrating the broad brush strokes of system functionality, but not every aspect of the system.

6.1 Actors Referenced In These Use Cases

The actors are the "roles" of users who will interact with the system. This in no way implies exclusivity, as at given instant an individual can play a different role.

- User: A user of *Future Net*.
- Seller: Register User with a Sellers account, and who agreed to the Sellers agreement.
- Buyer: Registered User with a Buyers account, and who agreed to the Buyers agreement.
- *TA - Title Agency User: A registered user who has a title agency account, who will interface with the system on behalf of her company.*
- *MA - Mortgage Agency User: A registered user who has a title mortgage account interface with the system on behalf of her company.*
- *GA – General Affiliate: Someone who wants to use Future Net to sell services to non-agency users of Future Net.*

Overall Flow of the Use Cases

APPENDIX

| FutureNet Web Site | Future Net |
|---|---|
| | System Design and Functional Specification |

6.2 General Exception Flows applicable to all use cases.

General Error Handling Exception Flow for Data Entry Errors 6.2.1.1  Where there are errors, the user will be presented with the data entry page, and an indication that there is an error, and a message indicating which fields have errors.

6.2.2 Anytime the system fails for non-data entry reasons.

6.2.2.1  An error page with the error message is displayed.

6.2.2.2  An email with the error message will be sent to the application administrator.

6.2.3 Where Logging-In is a Pre-Condition and the User Is Not Logged In 6.2.3.1  Goal:

*6.2.3.1.1  Log In the user*

6.2.3.2  Pre Conditions:

*6.2.3.2.1  None.*

6.2.3.3  Post Conditions:

*6.2.3.3.1  User is logged in.*

6.2.3.4  Main Scenario:

*6.2.3.4.1  The users will be prompted to enter their username and password.*

*6.2.3.4.2  The user will be taken back to the function they were doing.*

6.2.3.5  Exception Scenario, New User

*6.2.3.5.1  Goal: Assign username and password.*

*6.2.3.5.2  Pre Conditions: None.*

*6.2.3.5.3  Post Conditions: Username and password established.*

*6.2.3.5.4  Main Flow:*

APPENDIX

FutureNet Web Site — Future Net
System Design and Functional Specification 6.2.3.5.5 Users will be asked to create an account.

6.2.3.5.6 User will enter a 6.2.3.5.6.1.1 Username 6.2.3.5.6.1.2 Password 6.2.3.5.6.1.3 Confirming password 6.2.3.5.6.1.4 Valid email address 6.2.3.5.6.1.5 Check a box (or other indicator) saying they agree to the user agreement.

6.2.3.5.7 User returned to the page they were on, or asked to create an account.

6.2.3.5.7.1.1 Sub Exception Scenario for data entry errors detailed above.

6.2.4 Sub Exception Scenario, User Can't Log In 6.2.4.1 Goal:

*6.2.4.1.1 Give user new password.*

6.2.4.2 Pre Conditions:

*6.2.4.2.1 User has established a name and password.*

6.2.4.3 Post Conditions:

*6.2.4.3.1 Users gets new password.*

6.2.4.4 Main Flow:

*6.2.4.4.1 User indicates they forgot their password.*

6.2.4.4.2 System takes to an appropriate password page

*6.2.4.4.3 User enters identifying information based on password system requirements, including hint, and username.*

*6.2.4.4.4 User notified that an email with a new password will be sent and returned to the login screen.*

*6.2.4.4.5 Password Arrives in users inbox.*

APPENDIX

| FutureNet Web Site | Future Net |
| --- | --- |
| | System Design and Functional Specification |

6.2.5 Where the Creation of an <u>Seller Account</u> Is a Pre Condition, and One Does Not Exist

6.2.5.1 Goal:

6.2.5.1.1 Create Seller account.

6.2.5.2 Pre Conditions:

6.2.5.2.1 User has established a name and password.

6.2.5.3 Post Conditions:

6.2.5.3.1 The user's identity has been verified via credit card authorization

6.2.5.4 Main Flow:

6.2.5.4.1 User indicates they want to create a Seller account so that they can list items.

6.2.5.4.2 User taken to an entry page.

6.2.5.4.3 User enters credit card information based on chosen merchant services provider. (Credit Card Number, Billing Address, Expiration Date, number on back of card, etc.)

6.2.5.4.4 The system lets the user know the account has been created successfully.

6.2.5.4.4.1 User is returned to the last page they were on.

6.2.5.4.5 User accepts the Seller contract.

6.2.5.5 Exception Flow:

6.2.5.5.1 Invalid data is handled as above, as is an unauthorized account number.

6.2.5.5.2 Note: This can be a way for the site to charge the Seller for billing too.

APPENDIX

| FutureNet Web Site | Future Net |
|---|---|
| | System Design and Functional Specification |

6.2.6 Where the Creation of a <u>Buyer Account</u> Is a Pre Condition, and One Does Not Exist

6.2.6.1      Goal:

*6.2.6.1.1    Create Buyer account.*

6.2.6.2      Pre Conditions:

*6.2.6.2.1    User has established a name and password.*

6.2.6.3      Post Conditions:

*6.2.6.3.1    The user has provided information for fee based transactions with affiliates.*

6.2.6.4      Main Flow:

*6.2.6.4.1    User indicates they want to create a Buyer account.*

6.2.6.4.2 User taken to Buyer page.

6.2.6.4.3 User Accepts Buyer Contract 6.2.6.4.4 User enters credit card information based on chosen *merchant services provider.* (Credit Card Number, Billing Address, Expiration Date, number on back of card, etc.)

*6.2.6.4.5    The system lets the user know the Buyer account has been created successfully.*

6.2.6.5      Exception Flow:

*6.2.6.5.1    Invalid data is handled as above, as is an unauthorized account number.*

*6.2.6.5.2    Note: This can be a way for the site to charge the Seller for billing too.*

6.2.6.6      Other Options

*6.2.6.6.1    Based on the merchant services provider, work could be done to add multiple payment options, and manage those options via pay pal.*

*APPENDIX*

| FutureNet Web Site | Future Net |
|---|---|
| | System Design and Functional Specification |

6.3 General System Interactions Referenced In Use Cases

6.3.1 Standard Mortgage Timeline 6.3.1.1 Primary Actor:

*6.3.1.1.1 Buyer, Seller*

6.3.1.2 Goal

*6.3.1.2.1 Display the current state of the home buying process.*

6.3.1.3 Preconditions:

*6.3.1.3.1 None.*

6.3.1.4 Success Guarantee (Post conditions):

*6.3.1.4.1 Updated Visual Display.*

6.3.1.5 Main Success Scenario (or Basic Flow):

*6.3.1.5.1 The timeline will reflect the buying or selling progress when key actions are made.*

> *6.3.1.5.1.1 The System will update itself when key actions are made, and the vendor validation system is the mechanism for updating the timeline when there is a third party involved. See the offer and acceptance process below.*

*6.3.1.5.2 Key events included*

> *6.3.1.5.2.1 LIST PROPERTY*
>
> *6.3.1.5.2.2 PRE-APPROVAL WITH MORTGAGE AFFILIATE*
>
> *6.3.1.5.2.3 PRE -APPROVE BUYER*
>
> *6.3.1.5.2.4 BID ON PROPERTY*
>
> *6.3.1.5.2.5 RECEIVE BID Offer*
>
> 6.3.1.5.2.5.1 Accept Offer
>
> 6.3.1.5.2.5.2 Reject Offer

*6.3.1.5.3 FUND ESCROW ON ACCEPTED BID*

*APPENDIX*

FutureNet Web Site

Future Net
System Design and Functional Specification

6.3.1.5.4 VERIFY CONDITIONS

6.3.1.5.4.1 Any contract conditions such as

6.3.1.5.4.1.1 Home Inspection 6.3.1.5.4.1.2 Repair Work 6.3.1.5.4.1.3 Mortgage Funding

6.3.1.5.5 CLOSE, OFFER ARCHIVE SERVICE

6.3.1.6 Exception

6.3.1.6.1 FAILURE TO MEET CONTRACT CONDITIONS; WITHDRAW OFFER

6.3.1.6.1.1 Timeline on the property will be reset if the offer fails, or is rejected.

6.3.2 Document Repository Interaction 6.3.2.1 Primary Actor:

6.3.2.1.1 Buyer, Seller, Any Affiliate

6.3.2.2 Goal

6.3.2.2.1 Upload, download, and share files.

6.3.2.3 Preconditions:

6.3.2.3.1 All parties who are communicating in the system are registered with the system.

6.3.2.3.2 Relevant party is logged in.

6.3.2.4 Success Guarantee (Post conditions):

6.3.2.4.1 System will have a copy of the all relevant documents to be shared.

6.3.2.5 Main Success Scenario (or Basic Flow):

6.3.2.5.1 User indicates that they want to share a document.

APPENDIX

| FutureNet Web Site | Future Net |
|---|---|
| | System Design and Functional Specification |

*6.3.2.5.2 The system asks for the title of the document.*

*6.3.2.5.3 System indicates that the document must be loaded in the repository to be shared and prompts with a file upload box.*

*6.3.2.5.4 The user selects the file to be uploaded.*

*6.3.2.5.5 The system uploads the file and a display icon representing the document is uploaded.*

*6.3.2.5.5.1 At this point the document is accessible to the Message System described below.*

6.3.3 General Messaging Between Parties 6.3.3.1 Primary Actor:

*6.3.3.1.1 Buyer, Seller, Any Affiliate*

6.3.3.2 Goal

*6.3.3.2.1 Contain communication within the system.*

*6.3.3.2.2 Provide an audit trail for all communication.*

6.3.3.3 Preconditions:

*6.3.3.3.1 All parties who are communicating in the system are registered with the system.*

*6.3.3.3.2 Relevant party is logged in.*

6.3.3.4 Success Guarantee (Post conditions):

*6.3.3.4.1 Message notification is delivered to relevant parties.*

6.3.3.5 Main Success Scenario (or Basic Flow):

*6.3.3.5.1 Registered users indicate they want to send or receive message to a Buyer/Seller, or affiliate.*

*6.3.3.5.2 System displays a messaging screen which lists all messages, indicating those that have been read and not read.*

*6.3.3.5.2.1 A not registered user will need to register to see messages, as all data is stored on the server.*

APPENDIX

| FutureNet Web Site | Future Net |
|---|---|
| | System Design and Functional Specification |

6.3.3.6      Sub Flow: Read Messages

*6.3.3.6.1 Clicking on the message they want to read.*

*6.3.3.6.2 The system will display the message in detail.*

*6.3.3.6.3 For all attachments, the user can add them to their "document repository" for further reference.*

6.3.3.7      Sub Flow: Respond to Messages

*6.3.3.7.1 User can respond to the message by telling the system via a mouse click or some other means. (This will be the functional equivalent of creating a new message with pre-filled text.)*

6.3.3.8      Sub Flow: Compose Messages

*6.3.3.8.1 User will indicate if they want to send a message to a Buyer, Seller, or any affiliate. User may also enter a valid email address.*

*6.3.3.8.2 User will be taken to a free form text box, and allowed to write text.*

*6.3.3.8.3 User can "include" files from the document repository.*

*6.3.3.8.4 These files will not be sent, per say, but the message will contain a valid link to the docs so that the user can see them.*

*6.3.3.8.5 User will select send.*

*6.3.3.8.6 System will send and mail indicating that a message was written and is available on the Future Net site, along with a URL to read the message. The actual message will not be sent. It will only be readable on the computer.*

6.3.4 Affiliate Verification System 6.3.4.1      Primary Actor:

*6.3.4.1.1 Affiliate Mortgage or Title Company, or other relevant affiliate.*

*6.3.4.1.2 Any other affiliate who needs to, as a third party, verify some item for a sale of real estate.*

6.3.4.2      Goal

*6.3.4.2.1 A third party indication that a particular item is either valid or not valid.*

APPENDIX

| FutureNet Web Site | Future Net<br>System Design and Functional Specification |
|---|---|

6.3.4.3     Preconditions:

*6.3.4.3.1     Valid, in network, affiliate.*

*6.3.4.3.2     Valid item to be verified, such as pre-approval, or escrow funding.*

6.3.4.4     Success Guarantee (Post conditions):

*6.3.4.4.1     System displays an invalid or validated indication on the fact in question.*

*6.3.4.4.2     System sends an email to the appropriate parities.*

6.3.4.5     Main Success Scenario (or Basic Flow):

*6.3.4.5.1     In network affiliate (INA) user receives an email indicating that validation is needed.*

*6.3.4.5.2     The INA user logs on to FutureNet.*

*6.3.4.5.3     The INA user indicates they want to verify an item.*

*6.3.4.5.4     The system displays a list of all items needing verification.*

*6.3.4.5.5     The INA user selects an item to be verified.*

*6.3.4.5.6     The system displays a description of what is being verified along with relevant identifying information on the user. (Depends on the affiliate agreement.)*

*6.3.4.5.7     They INA use selects something to the equivalent of "I assert this is true" "I assert this is not true", "I decline to verify" and adds comments as to why.*

*6.3.4.5.8     The systems displays a preview of the verification and asks if this is correct.*

*6.3.4.5.9     The INA user selects OK, or No to go back an edit.*

*6.3.4.5.10     The System sends emails to the Buyers and Sellers indicating the item to be validated and the result.*

*6.3.4.5.11     The System updates the timelines on the relevant buy and Sellers screens.*

APPENDIX

FutureNet Web Site

Future Net
System Design and Functional Specification

6.4 Property Purchase Use Cases

6.4.1 List Property

6.4.1.1 Primary Actor:

6.4.1.1.1 Seller.

6.4.1.2 Goal

6.4.1.2.1 To list a property so that it can be sold.

6.4.1.3 Preconditions:

6.4.1.3.1 Seller is logged in.

6.4.1.3.2 Valid Seller

6.4.1.4 Success Guarantee (Post conditions):

6.4.1.4.1 Property is described so that it can be purchased.

6.4.1.5 Main Success Scenario (or Basic Flow):

6.4.1.5.1 Seller indicates that they would like to sell a residential home

6.4.1.5.2 Seller is taken to an add residential home page

6.4.1.5.3 Seller inputs standard category fields

6.4.1.5.4 Property

- 6.4.1.5.5 Property Address: (ex. 2010 World Wood)
- 6.4.1.5.6 City: (Pittsburg)
- 6.4.1.5.7 State/Province: (Pennsylvania)
- 6.4.1.5.8 Zip/Postal Code: (ex. 11111)
- 6.4.1.5.9 Sq Footage (Sq. ft.): (ex 1600.00)
- 6.4.1.5.10 Setting:
- 6.4.1.5.11 Lot Size (acres): --
- 6.4.1.5.12 Zip/Postal Code: (ex. 93001)

6.4.1.5.13 House

Page 51.

APPENDIX

FutureNet Web Site

Future Net
System Design and Functional Specification

---

6.4.1.5.14    Number of Bedrooms: (ex 4)

6.4.1.5.15    Number of Bathrooms: (ex. 4)

6.4.1.5.16    Year Built: (ex 1930)

*6.4.1.5.17 User Enters Freeform Text Description*

*6.4.1.5.17.1 Note: All other data can be entered, (other than external links).*

*6.4.1.5.18 Upload User Media to Property*

*6.4.1.5.19 User clicks on a button to upload an attachments*

*6.4.1.5.20 System displays a file open box.*

*6.4.1.5.21 User browses their computer to identify a: gif, jpg.)*

*6.4.1.5.22 System displays full path of file to be uploaded.*

*6.4.1.5.23 Step is repeated for every file.*

*6.4.1.5.24 User selects upload.*

*6.4.1.5.25 System indicates the user should be patient while data is transferred.*

*6.4.1.5.26 System displays the image in the data entry screen.*

*6.4.1.5.27 Seller selects Listing Details*

*6.4.1.5.28 User selects when the add will begin and end (Month, Day, Year)*

*6.4.1.5.29 User selects if they want to pay to have this be a featured listing*

*6.4.1.5.29.1 Per discussion, listings are free but one must pay for them to be "featured."*

*6.4.1.5.30 Seller Enters price*

*6.4.1.5.31 Seller has the option to go to a "pricing assistant" which will recommend a price. The price will \*not\* be auto populated, though.*

*6.4.1.5.31.1 Note: Pricing Assistant factors not specified yet.*

*6.4.1.5.32 User Selects Preview*

*6.4.1.5.33 The item is displayed as it will be when viewed*

APPENDIX

FutureNet Web Site — Future Net System Design and Functional Specification

*6.4.1.5.34 The user selects edit to repeat the process*

*6.4.1.5.35 The user selects submit*

6.4.1.6     Extensions (or Alternative Flows)

*6.4.1.6.1 Billing*

*6.4.1.6.1.1 In the case where there is billing,*

*6.4.1.6.1.2 The user is displayed a total.*

*6.4.1.6.1.3 The user is asked to acknowledge that their credit card will be charged (as appropriate.)*

*6.4.1.6.1.4 The user selects "OK."*

6.4.2 Search for Property 6.4.2.1     Goal

*6.4.2.1.1 Search for property to buy*

*6.4.2.1.2 Search for similar items to help with pricing*

6.4.2.2     Preconditions:

*6.4.2.2.1 User is logged in.*

*6.4.2.2.2 Success Guarantee (Post conditions):*

*6.4.2.2.3 List of available property matching criteria is displayed.*

6.4.2.3     Main Success Scenario (or Basic Flow):

*6.4.2.3.1 User indicates they want to search*

*6.4.2.3.2 System takes the user to a search page*

*6.4.2.3.3 User choose from a set of standard criteria and or key words*

*6.4.2.3.3.1 Property*

*6.4.2.3.3.2 Property Address: (ex. 2010 World Wood)*

*6.4.2.3.3.3 City: (Pittsburgh)*

6.4.2.3.3.4 State/Province: (Pennsylvania)

APPENDIX

FutureNet Web Site — Future Net System Design and Functional Specification 6.4.2.3.3.5 Zip/Postal Code: (ex. 11111)

6.4.2.3.3.6 Sq Footage (Sq. ft.): (ex 1600.00)

6.4.2.3.3.7 Setting:

6.4.2.3.3.8 Lot Size (acres): --

6.4.2.3.3.9 Zip/Postal Code: (ex. 93001)

6.4.2.3.3.10 House 6.4.2.3.3.11 Number of Bedrooms: (ex 4)

6.4.2.3.3.12 Number of Bathrooms: (ex. 4)

6.4.2.3.3.13 Year Built: (ex 1930)

*6.4.2.3.4 List of property are displayed, "featured first."*

*6.4.2.3.5 Extensions (or Alternative Flows)*

*6.4.2.3.6 If no data is found, the user is advised to widen their search.*

6.4.3 Pre-Approval with Mortgage Affiliate 6.4.3.1 Primary Actor:

*6.4.3.1.1 Buyer*

6.4.3.2 Goal

*6.4.3.2.1 Encourage Buyer to use an affiliate mortgage provider.*

*6.4.3.2.2 Make it easier for the Buyer to bid on a home.*

6.4.3.3 Preconditions:

*6.4.3.3.1 User with a valid Buyer account.*

6.4.3.4 Success Guarantee (Post conditions):

*6.4.3.4.1 Mortgage Company has user's contact information.*

*6.4.3.4.2 System is aware of the Buyer's pre-approval state.*

APPENDIX

| FutureNet Web Site | Future Net<br>System Design and Functional Specification |
|---|---|

6.4.3.5     Main Success Scenario (or Basic Flow):

*6.4.3.5.1    Buyer indicates he wants to be pre-approved.*

*6.4.3.5.2    System displays in process, and completed pre approvals.*

*6.4.3.5.2.1 This will be empty initially.*

*6.4.3.5.3    Buyer indicates he wants to start a new pre-approval.*

*6.4.3.5.4    System takes Buyer to a financial profile page.*

*6.4.3.5.5    Current financial and asset data will be displayed which the Buyer can edit.*

*6.4.3.5.5.1 Initially this will be empty.*

*6.4.3.5.6    Buyer will enter all data relevant to pre-approval that mortgage provider requires through mortgage provider, including:*

*6.4.3.5.6.1 Income*

*6.4.3.5.6.2 Assets*

*6.4.3.5.6.3 Debt, etc.*

*6.4.3.5.7    Buyer will select affiliate mortgage company(ies) to get pre-approved with.*

*6.4.3.5.8    Buyer will authorize data transfer.*

*6.4.3.5.9    System will display a list of pre-approvals, with the status of "in progress."*

*6.4.3.5.9.1 When approval has been completed, the status will say "approved" or "not approved at this time."*

6.4.4     Pre –Approve Buyer 6.4.4.1     Primary Actor:

*6.4.4.1.1    Mortgage affiliate*

6.4.4.2     Goal

*6.4.4.2.1    Indicate that a given Buyer is pre-approved.*

APPENDIX

FutureNet Web Site

Future Net
System Design and Functional Specification

6.4.4.3  Preconditions:

*6.4.4.3.1  Request for pre-approval submitted.*

6.4.4.4  Success Guarantee (Post conditions):

*6.4.4.4.1  Approval status changed from "in process" to "approved" or "not approved at this time."*

6.4.4.5  Main Success Scenario (or Basic Flow):

*6.4.4.5.1  Mortgage Affiliate User (MAU) will receive email that a request for approval has been submitted.*

*6.4.4.5.2  MAU will log into Future Net and indicate they want to view pre-approval requests.*

*6.4.4.5.3  System will display a list of all pre-approval requests.*

*6.4.4.5.4  MAU will select a request to review.*

*6.4.4.5.5  The system will bring up the relevant user data.*

*6.4.4.5.6  The MAU (after reviewing data) will select "Approved," or "Not Approved at this Time" or may send a message to the Buyer asking for more data.*

*6.4.4.5.6.1  Note: It is recommend that the MAU can only approve based on System information. If data is incorrect, the Buyer must update the system data as opposed to sending separate data to the MAU.*

*6.4.4.5.7  Upon the selection the System will update the status of the Pre-Approval Application*

6.4.5  Bid on Property 6.4.5.1  Primary Actors:

*6.4.5.1.1  Buyer*

6.4.5.2  Goal

*6.4.5.2.1  Submit a bid for the property*

6.4.5.3  Preconditions:

*6.4.5.3.1  User is logged in.*

APPENDIX

FutureNet Web Site — Future Net System Design and Functional Specification

- *6.4.5.3.2 Valid Buyer.*
- *6.4.5.3.3 Seller has selected a property.*
- 6.4.5.4 Success Guarantee (Post conditions):
  - *6.4.5.4.1 A bid has been submitted.*
- 6.4.5.5 Main Success Scenario (or Basic Flow):
  - *6.4.5.5.1 Buyer selects property to make an offer on, and indicates they would like to offer.*
  - *6.4.5.5.2 Buyer is taken to write an offer (forms).*
  - *6.4.5.5.3 Buyer filled in the data he would like the offer submitted.*
  - *6.4.5.5.4 System updates the document with the data, and pre-populates all dependent dates.*
  - *6.4.5.5.5 Buyer fills in the dollar amount to offer.*
  - *6.4.5.5.6 Buyer fills out additional terms, conditions etc.*
  - *6.4.5.5.7 Buyer selects to include pre approval contact information*
    - *6.4.5.5.7.1 If yes system displays in-network pre-approvers*
    - *6.4.5.5.7.2 Buyer selects escrow amount to go with offer.*
  - *6.4.5.5.8 Buyer is reminded that this offer is a binding contract.*
  - *6.4.5.5.9 Buyer clicks submit.*
  - *6.4.5.5.10 System displays the property with "offer pending"*
  - *6.4.5.5.11 System emails the Seller with offer confirmation.*
- 6.4.5.6 Extensions (or Alternative Flows)
  - *6.4.5.6.1 If the escrow amount is not funded (not sure how this will be done, paid for), the system will reject the bid, or ask for another account.*

APPENDIX

| FutureNet Web Site | Future Net System Design and Functional Specification |
|---|---|

6.4.6 Receive Offer

6.4.6.1 Primary Actors:

*6.4.6.1.1 Seller*

6.4.6.2 Goal

*6.4.6.2.1 Respond to Offer*

6.4.6.3 Preconditions:

*6.4.6.3.1 User is logged in.*

*6.4.6.3.2 Valid Seller.*

*6.4.6.3.3 Valid offer is in place.*

6.4.6.4 Success Guarantee (Post conditions):

*6.4.6.4.1 Seller responds to the offer.*

6.4.6.5 Main Success Scenario (or Basic Flow):

*6.4.6.5.1 Seller receives email that an offfer has been submitted, with a link to review the offer.*

*6.4.6.5.2 Seller receives visual indication on the screen that there is a pending offer, with a link to pending offers.*

*6.4.6.5.3 Seller indicates she would like to review the offer.*

*6.4.6.5.4 Seller is taken to an offer screen where all current offers are displayed, each with*

*6.4.6.5.4.1 Amount of Offer*

*6.4.6.5.4.2 Pre Approved contact information*

*6.4.6.5.4.3 Amount in escrow*

*6.4.6.5.4.4 Additional conditions*

*6.4.6.5.5 Seller selects a offer to review*

*6.4.6.5.6 The offer is displayed in detail*

APPENDIX

FutureNet Web Site

Future Net
System Design and Functional Specification

---

*6.4.6.5.7   Seller chooses to Reject, Accept, or Return to review offer.*

*6.4.6.5.8   Seller selects Accept*

*6.4.6.5.9   A formal acceptance form is displayed with standard conditions.*

*6.4.6.5.10 Seller is given a confirmation cancel screen*

*6.4.6.5.11 Seller confirms*

> *6.4.6.5.11.1 If Seller cancels, she is returned to the previous screen.*

*6.4.6.5.12 Property indication on screen is "sale pending"*

> *6.4.6.5.12.1 Offer option on property disappears.*
>
> *6.4.6.5.12.2 Offer on screen show as "accepted"*
>
> *6.4.6.5.12.3 All pending offers are displayed as rejected.*
>
> *6.4.6.5.12.4 System systems sends out notification that offer(s) were rejected.*
>
> *6.4.6.5.12.5 System emails out an indication to the successful bidder that the offer was accepted.*
>
> *6.4.6.5.12.6 System indicates to Buyer that he has a determined number of days fund the escrow account (per the Sales Agreement)*
>
> *6.4.6.5.12.7 Timeline updates indicating offer was accepted.*

*6.4.6.5.13 Reject*

> *6.4.6.5.13.1 Seller selects reject offer.*
>
> *6.4.6.5.13.2 Seller gets an "offer rejection" screen where she can enter optional comments or counter offers.*
>
> *6.4.6.5.13.3 Seller is asked if she wants to cancel or confirm.*
>
> *6.4.6.5.13.4 Seller selects confirm*
>
> *6.4.6.5.13.5 System shows the offer as canceled.*
>
> *6.4.6.5.13.6 System emails a confirmation notice to Seller, Buyer.*

APPENDIX

| FutureNet Web Site | Future Net |
|---|---|
| | System Design and Functional Specification |

6.4.6.6     Extensions (or Alternative Flows)

*6.4.6.6.1 Seller can call Mortgage Company to check pre-approval. This will not be automated by the system.*

6.4.7 Fund Escrow on Accepted Offer 6.4.7.1     Primary Actors:

*6.4.7.1.1 Buyer*

*6.4.7.1.2 Title Agency*

6.4.7.2     Goal

*6.4.7.2.1 Fund Escrow Account*

6.4.7.3     Preconditions:

*6.4.7.3.1 User is logged in.*

*6.4.7.3.2 Valid Buyer.*

*6.4.7.3.3 Buyer has a successful offer.*

6.4.7.4     Success Guarantee (Post conditions):

*6.4.7.4.1 Escrow Funded, Timeline advanced.*

6.4.7.5     Main Success Scenario (or Basic Flow):

*6.4.7.5.1 Buyer indicates he wants to fund escrow.*

*6.4.7.5.2 System asks him to choose a title company.*

*6.4.7.5.3 System displays a selection of in-network providers*

*6.4.7.5.3.1 If title company is an in network provider*

*6.4.7.5.3.2 System indicates that a check should be cut to find the title company.*

6.4.7.6     Extensions (or Alternative Flows)

*6.4.7.6.1 Seller can call Title Company to check pre-approval. This will not be automated by the system*

APPENDIX

| FutureNet Web Site | Future Net<br>System Design and Functional Specification |
|---|---|

6.4.8 Verify Conditions, Close, Offer Archive Service 6.4.8.1     Primary Actor:

*6.4.8.1.1 Buyer, Seller, Affiliate Mortgage or Title Company*

6.4.8.2     Goal

*6.4.8.2.1 Verify that all conditions for the contract are met.*

*6.4.8.2.2 Make sure parties understand what they need to do.*

6.4.8.3     Preconditions:

*6.4.8.3.1 Offer Made, and Accepted.*

*6.4.8.3.2 Any conditions of the contract can be verified trough in-network providers.*

6.4.8.4     Success Guarantee (Post conditions):

*6.4.8.4.1 System completes timeline.*

6.4.8.5     Main Success Scenario (or Basic Flow):

*6.4.8.5.1 Seller and Buyer are both sent a message which links to the final contract indicating*

*6.4.8.5.2 All terms and conditions*

*6.4.8.5.3 Agreed upon responsibilities*

*6.4.8.5.4 Service providers to be used*

*6.4.8.5.5 Users acknowledge they are ready to close.*

*6.4.8.5.6 For mortgage conditions relevant to close such as inspection, financing, etc, the system will send verification emails asking if the transaction is completed.*

*6.4.8.5.7 Every provider will, as conditions of the contact are fulfilled), verify that the condition is complete.*

*6.4.8.5.8 As this is done the timeline will be updated.*

*6.4.8.5.9 When the last condition has been met, the system will send a verification notice to the title company to indicate close*

*6.4.8.5.10 When the title company verifies close, the timeline will complete.*

APPENDIX

| FutureNet Web Site | Future Net |
|---|---|
| | System Design and Functional Specification |

6.4.8.5.11 *A messages will be sent to Buyer and Seller asking them if they would like their documents archived*

6.4.8.5.12 *For those who agree, their credit card will be charged, and they will have access to the document repository.*

6.4.8.5.13 *For those that don't agree, the document repository will appear empty after 60 days.*

6.4.8.5.14 *The system will actually store all documents for at least 3 years.*

6.4.9 Failure to Meet Contract Conditions; Withdraw Offer 6.4.9.1 Primary Actor:

6.4.9.1.1 *Buyer, Seller, Affiliate Mortgage or Title Company*

6.4.9.2 Goal

6.4.9.2.1 *Withdraw offer on conditions not being met.*

6.4.9.3 Preconditions:

6.4.9.3.1 *Offer Made, and Accepted though in-network providers.*

6.4.9.4 Success Guarantee (Post conditions):

6.4.9.4.1 *System stops timeline.*

6.4.9.5 Main Success Scenario (or Basic Flow):

6.4.9.5.1 *The Buyer or Seller indicates that they want to withdraw the offer because of broken condition (mortgage failed, inspection failed, etc.)*

6.4.9.5.2 *The system prompts the user*

6.4.9.5.3 *Enter the condition*

6.4.9.5.4 *Attach the relevant documents from the repository*

6.4.9.5.5 *Select the name of an affiliate to verify the assertion.*

6.4.9.5.6 *The system asks for confirmation.*

6.4.9.5.7 *Upon confirmation, the system sends messages out to the Buyer and Seller, (message system) and sends a verification message to the appropriate affiliate. (See verification system)*

APPENDIX

FutureNet Web Site

Future Net
System Design and Functional Specification 6.4.9.6 Extensions (or Alternative Flows): Seller's Condition Failed

*6.4.9.6.1 In the case where there is a denial of verification of the Seller's condition, (escrow, mortgage, etc.) the Seller will have the option of:*

*6.4.9.6.2 Re verify in a determinable amount of days. (Second Chance)*

6.4.9.6.3 Notice is sent out that the will be re-verified in X days is sent to Seller.

*6.4.9.6.4 Re-list the property so that it can be bid on again.*

6.4.9.6.5 The timeline should be reset.

6.4.9.6.6 Property is allowed to be bid on again.

6.4.9.6.7 De-list the property for good.

6.4.9.6.8 Property is no longer viewable on the system.

6.4.9.7 Extensions (or Alternative Flows): Buyer's Condition Failed

*6.4.9.7.1 In the case where there is a denial of verification of the Buyer's condition, (home inspection) the Buyer will have the option to:*

*6.4.9.7.2 Re verify in (X) days. (Second Chance)*

*6.4.9.7.3 Notice is sent out that the will be re-verified in X days is sent to Seller.*

*6.4.9.7.4 Withdraw bid.*

*6.4.9.7.5 The timeline should be reset.*

*6.4.9.7.6 Property is allowed to be bid on again.*

*6.4.9.7.7 De-list the property for good.*

*6.4.9.7.8 Property is no longer viewable on the system.*

6.4.10 Engaging Affiliates

6.4.10.1 Primary Actor(s)

*6.4.10.1.1 Buyer or Seller*

*6.4.10.1.2 Valid, in network, affiliate.*

APPENDIX

| FutureNet Web Site | Future Net |
|---|---|
| | System Design and Functional Specification |

*6.4.10.1.3 Any other affiliate who needs to, as a third party, verify some item for a sale of real estate.*

6.4.10.2 Goal

*6.4.10.2.1 Engage third parties services providers.*

6.4.10.3 Preconditions:

*6.4.10.3.1 None*

6.4.10.4 Success Guarantee (Post conditions):

*6.4.10.4.1 Users are presented with easy ways to engage affiliates.*

6.4.10.5 Main Success Scenario (or Basic Flow):

*6.4.10.5.1 User selects to search for affiliate service providers*

*6.4.10.5.2 System returns a list of category of affiliates, and selecting a category (such as Home Inspector) brings of the list of affiliates.*

*6.4.10.5.3 The user selects an affiliate and the details of that affiliate are displayed.*

*6.4.10.5.4 User can go back and search at any time.*

*6.4.10.5.5 The user indicates a desire to work with a given affiliate, and is taking to the Messaging (see above) with the affiliates name pre-filled.*

6.4.10.5.5.1 <u>NOTE: Templates appropriate to the service will be developed in some cases to make sure all relevant data is sent to the affiliate. Even if these custom templates have check boxes or buttons, the affiliate will be notified though the messaging system, and documents will be leveraged via the document repository so there is not real change in the use case.</u>

*6.4.10.5.6 The user can detail his request, and upload documents via the messaging system, as appropriate.*

*6.4.10.5.7 User submits the request and indicates that it is in process.*

*6.4.10.5.8 System emails affiliate indicating that he should log into Future Net to read the request.*

*6.4.10.5.9 Affiliate will do this via the common messaging system.*

APPENDIX

FutureNet Web Site | Future Net
System Design and Functional Specification

6.5 Third Party Service Provider Use Cases

6.5.1 Apply as a Service Provider

6.5.1.1 Primary Actor:

*6.5.1.1.1 Potential Service Provider*

6.5.1.2 Goal

*6.5.1.2.1 Build service provider network.*

6.5.1.3 Make it easy for the service provider to gain business within the Future Net Community.

6.5.1.4 Preconditions:

*6.5.1.4.1 None.*

6.5.1.5 Success Guarantee (Post conditions):

*6.5.1.5.1 Application sent to Future Net management team*

6.5.1.6 Main Success Scenario (or Basic Flow):

*6.5.1.6.1 Potential affiliate logs into Future Net and select that they want to be a member.*

*6.5.1.6.2 System takes the user to an affiliate setup page.*

*6.5.1.6.3 Affiliate enters*

*6.5.1.6.4 Category of their services*

*6.5.1.6.5 Services and prices*

*6.5.1.6.6 Contact information*

*6.5.1.6.7 The potential affiliate reads the "affiliate contract" and accepts the terms*

*6.5.1.6.8 The potential affiliate then submits the application.*

*6.5.1.6.9 The Future Net management team will set up an account for the affiliate if he is accepted.*

APPENDIX

FutureNet Web Site — Future Net
System Design and Functional Specification

6.5.2 Service Provider Modify Profile

6.5.2.1 Primary Actor:

6.5.2.1.1 Affiliate

6.5.2.2 Goal

6.5.2.2.1 Update profile information.

6.5.2.3 Preconditions:

6.5.2.3.1 Registered Affiliate with an account that is logged in.

6.5.2.4 Success Guarantee (Post conditions):

6.5.2.4.1 Account profile is updated to reflect new information.

6.5.2.5 Main Success Scenario (or Basic Flow):

6.5.2.5.1 Affiliate logs in to Future Net and indicates they want to update their profile.

6.5.2.5.2 Systems returns an page where all editable data is a text field.

6.5.2.5.3 Affiliate modified service description, prices, and other options.

6.5.2.5.4 It's recommended that the affiliate agreement not allow changes to the type of service being offered w/o signing a new affiliate agreement.

6.5.2.5.5 Affiliate selects preview to see the changes that were made

6.5.2.5.6 Cancel will return the affiliate to the edit page, while OK will save the page.

APPENDIX
FutureNet Web Site / Future Net
System Design and Functional Specification
7 User Interface Concept Designs
7.1 Anonymous Landing Page
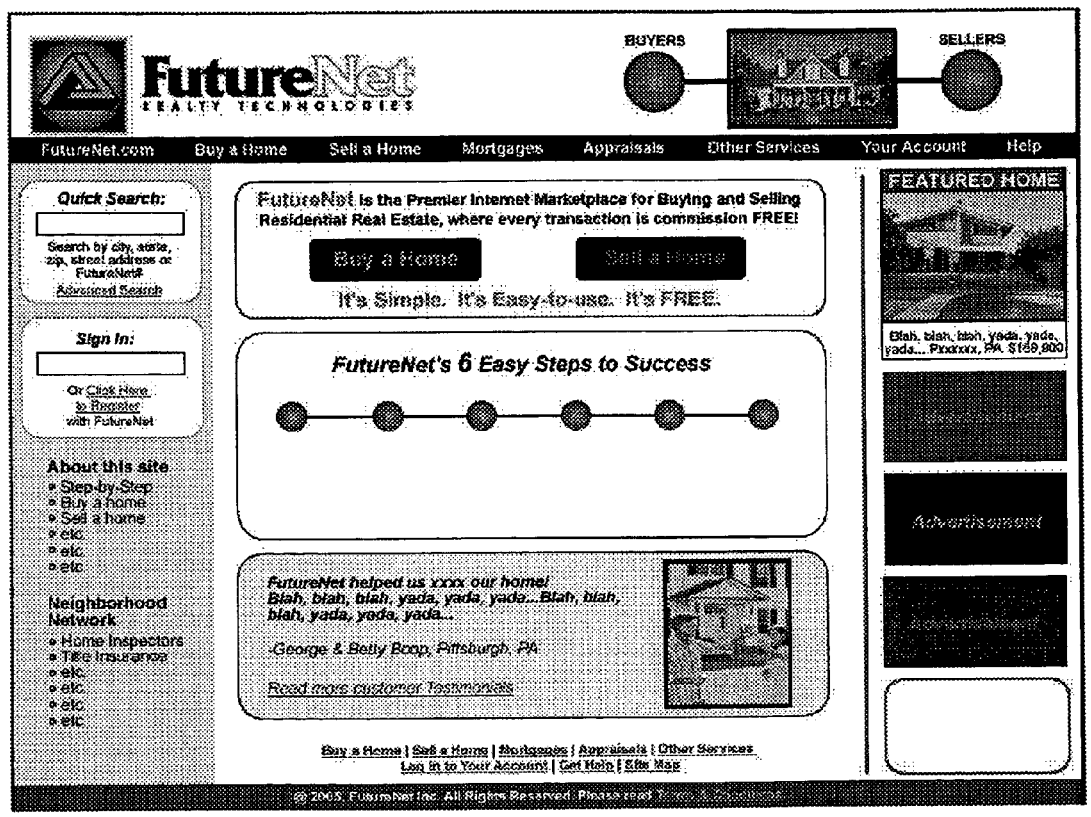

APPENDIX
FutureNet Web Site          Future Net
         System Design and Functional Specification
7.2 Buyer Channel Landing Page
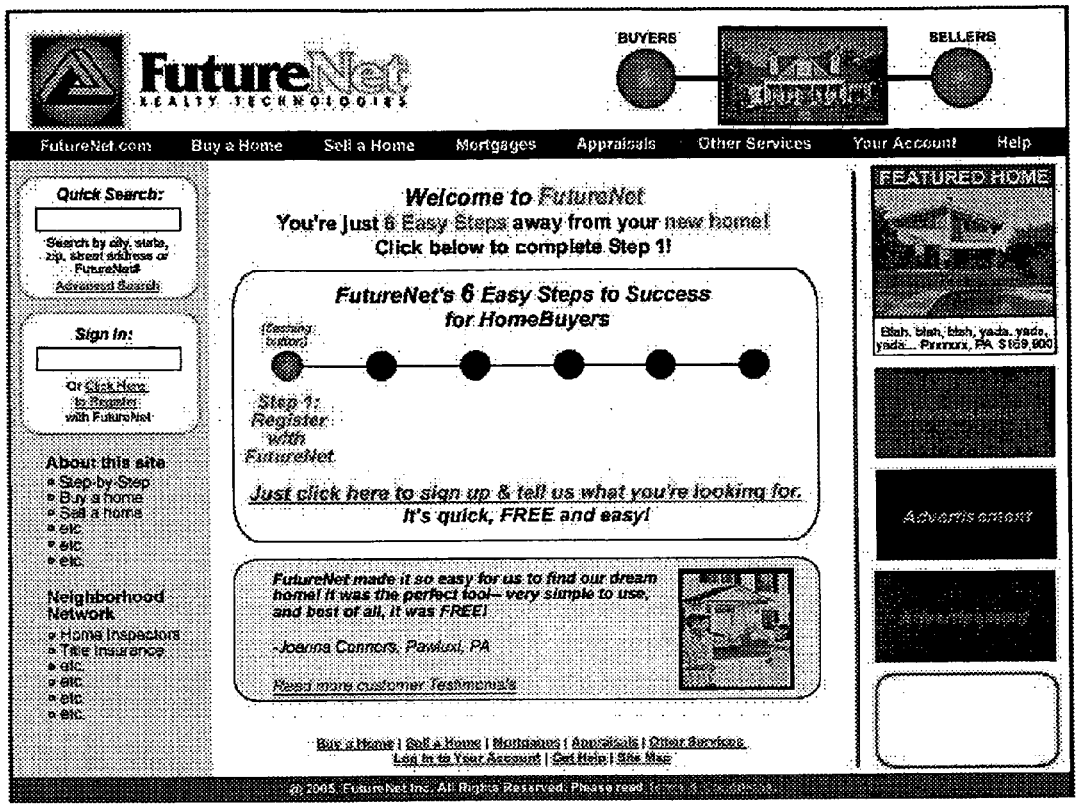

APPENDIX

FutureNet Web Site  Future Net
System Design and Functional Specification

7.3 Search Results Page

APPENDIX

FutureNet Web Site

**Future Net
System Design and Functional Specification**

7.4 Make an Offer Page

APPENDIX

FutureNet Web Site　　　　　　　　　　　　　　　　　　　　　　　　　　　Future Net
　　　　　　　　　　　　　　　　　　　　　　　System Design and Functional Specification

7.5 Buyer Private Page – Active Property

The Timeline should be at top of every relevant page.

Page 71.

APPENDIX
FutureNet Web Site
Future Net
System Design and Functional Specification
7.6 Seller Profile Page – Buyer Offers
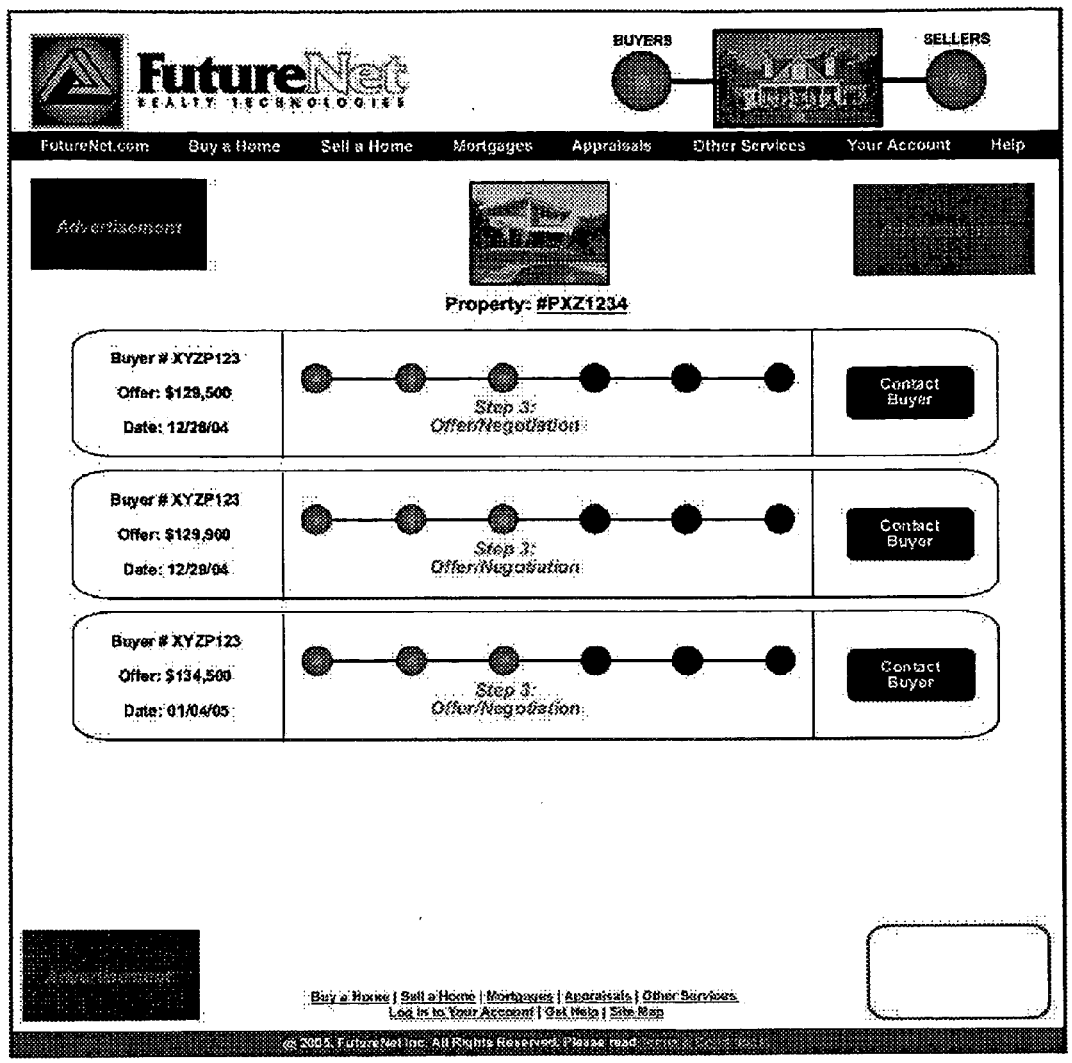
Page 72.

APPENDIX
FutureNet Web Site  Future Net
System Design and Functional Specification
7.7 Buyer / Seller Communication
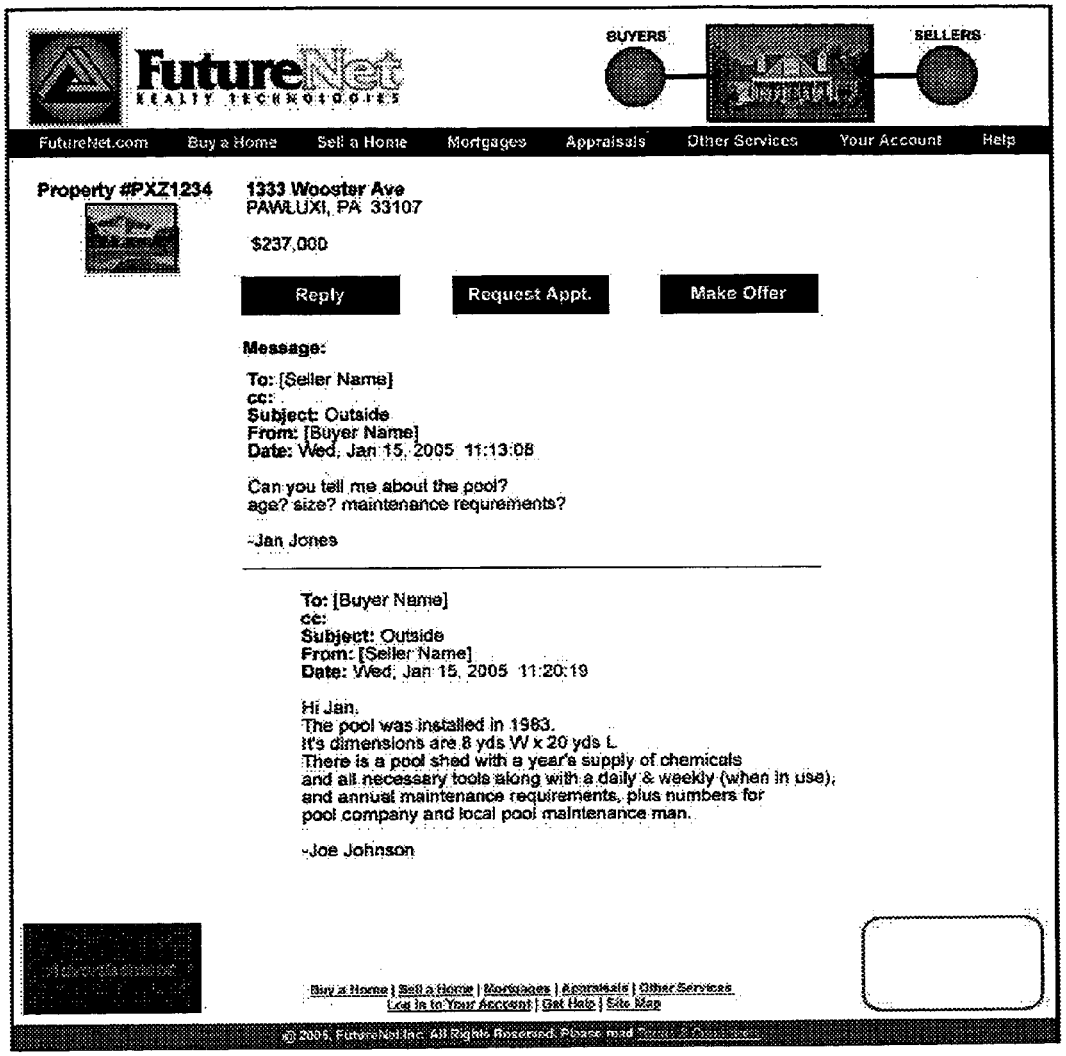

APPENDIX

FutureNet Web Site  Future Net
System Design and Functional Specification

7.8 Service Provider Profile Page

APPENDIX

FutureNet Web Site        Future Net
System Design and Functional Specification

7.9 Service Provider To-Do Page

Action Items:

| Buyer Name | Property Address | Phone | Required Date |
|---|---|---|---|
| ☐ Joe Schmoe | 1234 Franklin St, Pawtuxi 12345 | 330-123-1234 | 01/05/05 |
| ☐ Diane Greene | | | 01/15/05 |
| ☐ Donna Jones | | | 01/15/05 |
| ☐ Mike Purcell | | | 01/29/05 |

New Messages:

Blah, Blah, Blah   Date: 01/05/05
Blah, Blah, Blah   Date: 01/05/05
Blah, Blah, Blah   Date: 01/06/05
Blah, Blah, Blah   Date: 01/06/05

Previous Messages

Vital Documents:

APPENDIX
FutureNet Web Site | Future Net
System Design and Functional Specification
7.10 Service Provider Detail Page

*APPENDIX*

FutureNet Web Site

Future Net
System Design and Functional Specification

8 Core Base Data Model

The database schema should be designed in third normal form.

Each table in the schema should carry a key value that carries no inherent meaning other than its unique identifier. Serialized key values are not permitted for primary key values. Key values are required to use a randomized unique identifier (refer to Apache Commons ID UUID references). Use either e Type1 or Type 4 UUID.

Core Base data tables and partial column listing:
- User
- PropertyListing
- Transaction
- TimelineConfig
- TransactionTimeline
- Affiliate
- AffiliateContract
- Contract
- Document
- DocumentTemplate
- DocumentFormAttribute
- DocumentFormData
- DocumentVersion
- UserProfile
- UserFinTransaction
- Message Tables User:
    UserID [UUID]
    UserLogName
    UserPassword
    FirstName
    LastName
    Phone
    Email
    Address1
    Address2
    Address3
    City
    State
    County
    PostalCode
    Country
    RegisteredDate Table PropertyListing:
    ListingID [UUID]
    ListingDate
    Status [Not Listed, Listed, Under Contract, In Closing, Closed]
    LastChangedDate
    NumberOfHits Page 77.

APPENDIX

| FutureNet Web Site | Future Net |
|---|---|
| | System Design and Functional Specification |

FeaturedListing [T/F]
    FeaturedListingDateStart
    FeaturedListingDateEnd
    Withdraw [T/F]
    WithdrawDate
    PropertyID
    UserID (of Seller)
    PropertyTaxID
    Address1
    Address2
    Address3
    City
    County
    State
    PostalCode
    Country
    SellersCopy
    (the following are some of the MLS type property attributes)
    SquareFootage
    LotSize
    LotDimensions
    HomeType
    NumberOfStories [1, 1-1/2, 2, 3]
    ModelName
    NumberOfRooms
    NumberOfBaths
    NumberOfBedRooms
    NumberOfCarsGarage [1, 1-1/2, 2, 3, 4]
    AttachedGarage [T/F]
    Fireplace
    Berdoom1Size
    Bedroom2Size
    Bedroom3Size
    Bedroom4Size
    KitchenSize
    LivingRoomSize
    DiningRoomSize
    PatioDeck
    SwimmingPool
    FrameOrBrick
    [other attributes . . .]

Table Transaction:

Table TimelineConfig:
    TimelineID [UUID]
    TimelineAlias
    TimelineVersion
    State [PA, OH, NY, etc.]
    StepName
    StepSequence [1, 2, 3, 4, 5, 6, etc.]
    StepCompletedTimedate
    Status

| FutureNet Web Site | Future Net<br>System Design and Functional Specification |
|---|---|

APPENDIX

DependentStepName
    NextStepName
    BuyerSellerFlag

Table TransactionTimeline:
    TransactionTimelineID [UUID]
    TimelineID
    TimelineVersion [1.0, 1.1, 1.2, 2.0, 2.2, . . .]
    BuyerID
    SellerID
    ActiveStep [Listed, Offer Made, Escrow Funded, Under Contract,
        Mortgage Commitment, In Closing, Closed]

Table TransactionPosting:
    TransactionTimelineID [UUID]
    TimelineID
    TimelineVersion [1.0, 1.1, 1.2, 2.0, 2.2, . . .]
    UserID [of affiliate]
    BuyerSellectAction [Buyer, Seller]
    BuyerID
    SellerID
    PostingEvent [Mortgate Commitment, Survey, Escrow Funded, Home Inspection, Disclosure]
    DatePosted
    ApproveedRejected
    ContactName
    ContactPhone
    DocumentsPosted [T/F]
    ConfirmationRequired [T/F]
    ConfirmationRequiredBy [Buyer, Seller]
    ConfirmedByUserID
    ConfirmedDate Table Affiliate:
    [Inherits User Table, plus:]
    OrganizationName
    LogoFilename
    MemberStartDate
    MemberRenewalDate
    Status
    Tier
    Program
    Contact
    Fax
    SaleOffer
    BusinessHoursMonday
    BusinessHoursTuesday
    BusinessHoursWednesday
    BusinessHoursThursday
    BusinessHoursFriday
    BusinessHoursSaturday
    BusinessHoursSunday

APPENDIX

FutureNet Web Site  
Future Net  
System Design and Functional Specification

Table AffiliateContract:
    UserID [of affiliate]
    ContractID
    ContractStartDate
    ContractExpirationDate
    ContractFee Table Contract:
    ContractID
    ContractType [Subscription, Transaction]
    ContractCode
    ContractDuration
    ContractFee Table DocumentTemplate:
    TemplateID [UUID]
    TemplateVersion
    DocumentSourceID
    DocumentType
    DocumentFormAttributeID
    LastUpdated Table Document:
    DocumentID [UUID]
    DocumentVersionID
    TemplateID
    TemplateVersionID
    TransationTimelineID
    FormDataID
    DocumentSourceID
    DocumentFormAttrubuteID
    UserID
    TransactionID
    DateImported
    SignatureRequired
    SignatureID
    SignatureUserID
    DateSigned
    DualSignatureRequired
    ConterpartSignatureID
    CounterpartSignatureUserID
    CounterpartDateSigned Table DocumentFormAttribute:
    DocumentFormAttributeID [UUID]
    TemplateID
    TemplateVersion
    DocumentVersionID
    DocumentFieldID
    DocumentFieldName
    DocumentFieldOrder
    DocumentFieldLabel Table DocumentFormData:
    DocumentFormDataID [UUID]

Page 80.

APPENDIX

FutureNet Web Site

**Future Net
System Design and Functional Specification**

---

DocumentFormAttributeID
DocumentVersionID
DocumentFieldID
DocumentFieldName
DocumentFieldData Table UserProfile:
    UserID
[Buyer/Seller Attributes:]
    ShowContactInfo [T/F]
    PreApproval [T/F]
    LastRoleType [Buyer,Seller]
    PaymentProfileID [external affiliate service payment site profile identifier]

Table UserFinTransaction:
    UserID [UUID]
    TransactionDate
    TransactionType
    PaymentType
    AuthorizationCode
    TransactionAmount
    PaymentTransactionID [external affiliate service payment transaction identifier]

Table Message:
    UserID [UUID]
    ReceivedFromUserID
    ReceivedFromAlias
    SendToUserID
    SendToAlias
    Subject
    Read [T/F]
    SendDate
    ReceivedDate
    Deleted
    MessageText

9 External Integration and Interface Requirements

9.1 Search Proximity

A list of national postal codes / geographic distance information and its corresponding services are required for use in a property search by geographic proximity (find properties within nn miles of a designated zip code).

Period updates of the database are available and should be refreshed to accommodate particularly new developments/properties under construction.

APPENDIX

FutureNet Web Site

Future Net
System Design and Functional Specification

9.2 Mapping service

The property finder feature will integrate with MapQuest using its standard affiliate services.

9.3 CMA

The system will link (questions regarding transparent integration to be discussed later) to electronicappraiser.com to provide market analysis services. An affiliate/license agreement will be negotiated to use electronicappraiser.com site capabilities from within Future Net.

FUTURE: Construct own market analysis calculator based on publicly accessible information. The limitation here is that not all county agencies have online access to public real estate records. Additionally note that there are no standards that govern information content or structure.

9.4 Obscenity/Profanity content filters

As describer earlier, a filtering component(s) will be used to identify obscene or vulgar content. Integration is required to a systems component that monitors images as well as text-based content.

9.5 Payment Transaction Services

An electronic payments provider will be used to process payments for transaction originating within Future Net.

Payments types include:

- Credit Card (American Express, Master Card, Visa)
- Debit Card
- FUTURE: Wire Transfer No payment information will be held in the Future Net database. A license agreement will be negotiated with an online payments service provider. Integration will be transparent to users (uses Future Net look and feel) although transactions will be managed by the external service. This approach is preferred since integration is simpler and this will also help limit Future Net's exposure while gaining user trust (i.e. VeriSign seal).

9.6 Document Management

This is also discussed in detail in earlier sections.

Documents must be stored outside of the Future Net database (avoid using RDBMS blobs via the Future Net persistence layer) using a document management engine. This can be done either through package integration using a third-party document management engine and its APIs, or by integrating through an open source library. The

APPENDIX

FutureNet Web Site

Future Net
System Design and Functional Specification

--- document management engine is preferable, although will incur additional licensing costs.

In either case, the document management system is required to handle the actual document storage, retrieval, and search operations.

When a document is stored, the API must return a unique document identifier that is stored in the Future Net database.

9.7 Mortgage Affiliates

Initial implementation will include links to other services such as mortgage affiliates that provide current mortgage rates.

Future considerations include providing the ability for mortgage providers to submit mortgage rates on FutureNet, or alternatively, real-time integration of current rates for online mortgage calculator from affiliate provided service.

9.8 Credit Repair Agencies

Links to credit repair agencies will be provided. These may be part of the service provider offerings. Further information is needed on this topic.

Initially, no integration will be done. Only links will be provided.

9.9 Search Engines

Search engine registration with all primary search engines (Google, MSN, Lycos, Yahoo, Ask, etc.) is mandatory. The scope of search engine content submission to search engine providers is yet to be determined.

OPTIONAL REQUIREMENT: Site optimization services could be contracted as an additional option by the search engine registration specialist.

9.10 Auction (eBay)

FUTURE: Property auction sales.

Determine investor affiliate options and costs through eBay.

OPTIONAL REQUIREMENT: "We need to figure out how to have them list with eBay, directly through us or most probably through a link. For us to be paid by ebay for registered users as well as bids, we need them to go to eBay through our site. For that reason, I see us linking each one of our Seller's pages to eBay (at least the one's on auction) - how difficult is it to link individually to each page on eBay, so when they go to look at a house on our site it will send them directly to that house on eBay for bid?"

APPENDIX

FutureNet Web Site　　　　　　　　　　　　　　　　　　　　　　Future Net
　　　　　　　　　　　　　　　　　　System Design and Functional Specification

10 Marketing Services

One aspect that requires further investigation is campaign management and tracking required in order to measure effective of marketing campaigns.

List services will initially be managed externally. Lists can be extracted from the Future Net transactional database and provided to external agencies periodically. It is imperative that these service providers abide by legal requirements to manage opt-outs (potential customers that chose not to receive further mail distributions) and any other statutory guidelines. Additionally, these service providers should deliver standard reporting that identifies deliveries, undeliverable pieces (dead-mail, blocks), opt-outs, etc.

During client registration, the user will be prompted for origination information ("How did you head about us", with a list of options: TV, Radio, e-mail, direct mail, etc.).

11 Supplementary Systems Requirements

*11.1 Functionality*

11.1.1 Logging and Error Handling
All errors will be logged to persistent storage (flat file).

11.1.2 Reporting and Business Metrics
More information is required for this section. Suffice it to say that any information stored in the database is ultimately usable for analysis and reporting.

| Metric | Frequency | Description |
| --- | --- | --- |
| Number of listings | On-demand | Number of active property listings |
|  |  |  |

*11.2 Multi-lingual*

The system should be architected to allow multi-lingual content based on locale specification, but will be delivered in English-only for initial delivery.

*11.3 Usability*

*11.4 Systems Availability*

11.4.1 Availability
- Required system availability: 7 x 24

*APPENDIX*

| FutureNet Web Site | Future Net |
|---|---|
| | System Design and Functional Specification |

- System is unavailable between 2:00 am to 3:00 a.m. for planned updates and general maintenance.

11.5 Performance

To be determined

11.6 Scaling Issues

11.6.1 Expected user base

Approximately 200 builders (Sellers) in Western Pennsylvania during initial systems delivery

11.6.2 Database volumes

Additional information is required in this section.

| Sellers – Phase 1 | | | |
|---|---|---|---|
| Min Records | 200 | Average Growth Rate | 10,000 for 2005 |
| Max Records | N/A | | |
| Seller Listings – Phase 1 | | | |
| Min Records | 2000 | Average Growth Rate | 10,000 for 2005 |
| Max Records | 200000 | | |
| Buyers | | | |
| Min Records | 0 | Average Growth Rate % | |
| Max Records | | | |
| Property Transactions (Timelines) | | | |
| Min Records | 10000 | Average Growth Rate % | |
| Max Records | | | |
| Service Providers | | | |
| Min Records | | | |
| Max Records | | | |
| Documents | | | |
| Min Records | | | |
| Max Records | | | |

APPENDIX

| FutureNet Web Site | Future Net |
| --- | --- |
| | System Design and Functional Specification |

*11.7 Security*

11.7.1 Users

The online application will be accessible to the public at large (limited functionality)

Registered users will have access to additional features. Registration is required to buy or sell real estate.

11.7.2 Web Access

Public page information and property search capabilities will be available to the public at large. Only those registered on the site will be available to list a property, to negotiate a purchase of real estate, or to maintain participant profile information (i.e. service providers, Sellers, etc.).

11.7.3 Application Server Database

The database will reside behind a firewall and the application server will remotely access the database.

*11.8 Applications Support*

12 Other

Further development is required to explain progression of time lines (especially related for Buyer and Seller entities, and for property-specific transactions). Include visual representation of milestone events and other communications & document imports.

Consider visual representation of a list of (inbox-type) consolidated events.

The initial experience on FutureNet should trigger excitement and be appealing (analogous to a magazine cover) such that it sets the tone for the user's entire online experience. The will be accomplished by using a creative strategy for the Home Page / Landing Page design that departs from the traditional loon-and-feel transaction-oriented web sites.

NOTE: Use Case review and modifications is deferred until project commencement begins.

What is claimed is:

1. A method automating a real estate transaction between a first party, second party and at least one participating service provider communicatively connected to a real estate website server comprising:
   providing a property listing form to remotely connected first parties by the realty website server;
   receiving a completed property listing form from a first party and automatically creating and publishing the first party's property listing by said website server, wherein the server grants access to the first party's property listing, information, documents and updated information to a second party and at least one participating service provider at appropriate times during the sales transaction using permission based rules;
   displaying to the first party from the first party's tracking web page a timeline subsequent to creating the property listing and displaying to the first party next step events via the first party's timeline, wherein next step events are linked to contract actions required by the first party;
   displaying to a second party from the second party's tracking web page a timeline subsequent to second party registration and displaying to the second party next step events via the second party's timeline, wherein next step events are linked to contract actions required by the second party;
   providing an online search function to said second party enabling electronic search of said real estate property listing;
   submitting to the website server by the second party a customized offer form comprising price, terms and conditions specific to the first party's property listing;
   merging the first party's timeline with the second party's timeline subsequent to the second party making the customized offer that creates a displayable property transaction timeline, wherein both the second party and first party view next step events identified by the property transaction timeline from their respective tracking web page, wherein the next step events are linked to contract actions required by the second party, first party and at least one participating service provider;
   automatically updating the property transaction timeline based on changes to the property listing, first party's information, second party's information, agreements, addendums or amendments, or other documents within the system as the sales transaction progresses, wherein said changes are instantly communicated to the second party, the first party and the at least one participating service provider; and
   facilitating closing of said real estate transaction without intervention by a human intermediary and without the need for in-person or telephonic correspondence outside the real estate website server comprising:
      providing direct messaging communications between the first party, the second party and the at least one participating service provider;
      signing documents using electronic signature;
      implementing offer-counteroffer exchanges between the second party and first party; and
      implementing addendum exchanges to agreements between the second party and first party.

2. The method of claim 1, wherein said step of providing a property listing form further comprises providing at least one first party disclosure form based on legal requirements.

3. The method of claim 2, further comprising the step of: providing a document storage area on said website server, selectively accessible to both said second party and said first party, storing digital copies of all documents including said offer, said first party disclosures, a home certification, or an inspection report.

4. The method of claim 3, wherein said at least one participating service provider includes an ancillary service provider selected from the group consisting of:
   a mortgage lender; a home inspector; an insurance company; a moving company; a storage company; a carpet cleaning company; a painter; and an automobile rental company.

5. The method of claim 3, wherein said website server manages said documents, including managing the access, revision and deletion of said documents through the use of a virtual agent timeline that utilizes dates from said documents to populate the timeline next steps and ensure that all contractual obligations are met prior to closing.

6. The method of claim 1, after said step of electronically communicating said offer to said first party, further comprising the steps of:
   electronically receiving a counteroffer or amendment to the offer from the first party; and electronically responding to the first party with respect to said counteroffer or amendment.

7. The method of claim 1, wherein said real estate property is residential or commercial property.

8. The method of claim 1, where said first party is a property seller, said second party is a property buyer and the real estate transaction is a real estate sales transaction.

9. The method of claim 1, wherein said step of facilitating closing comprises the steps of:
   providing an online integration with a mortgage company;
   negotiating a mortgage rate and terms with said mortgage company electronically through the transmittal of a pre-approval and/or application form(s) and sales agreement contracts, seamlessly enabling approvals and closing to occur in an electronic format;
   receiving a confirmation through the system from a title company that an escrow amount has been deposited, moving the timeline forward to the next step in the process;
   receiving a confirmation from said title company that all local requirements have been satisfied and also receiving confirmation from the mortgage company, if applicable, that the second party and first party are clear to close.

10. The method of claim 1, wherein the second party, the first party, the at least one participating service provider and the real estate website server are connected via the Internet, and communication is facilitated using a direct messaging system that encompasses all parties to the transaction.

11. The method of claim 1, where said first party is a lessor, said second party is lessee and the real estate transaction is a real estate leasing transaction.

12. A system automating a real estate transaction between a first party, second party and at least one participating service provider communicatively connected to a real estate website server, the system comprising:
   means for communicating a property listing form to remotely connected first parties by the realty website server;
   means for receiving a completed property listing form from a first party and automatically creating and publishing the first party's property listing by said website server, wherein the server grants access to the first party's property listing, information, documents and updated information to a second party and at least one participating service provider at appropriate times during the sales transaction using permission based rules;

means for displaying to the first party from the first party's tracking web page a timeline subsequent to creating the property listing and displaying to the first party next step events via the first party's timeline, wherein next step events are linked to contract actions required by the first party;

means for displaying to a second party from the second party's tracking web page a timeline subsequent to second party registration and displaying to the second party next step events via the second party's timeline, wherein next step events are linked to contract actions required by the second party;

means for providing an online search function to said second party enabling electronic search of said real estate property listing;

means for submitting to the website server by the second party a customized offer form comprising price, terms and conditions specific to the first party's property listing;

means for merging the first party's timeline with the second party's timeline subsequent to the second party making the customized offer that creates a displayable property transaction timeline, wherein both the second party and first party view next step events identified by the property transaction timeline from their respective tracking web page, wherein the next step events are linked to contract actions required by the second party, first party and at least one participating service provider;

means for automatically updating the property transaction timeline based on changes to the property listing, first party's information, second party's information, agreements or other documents within the system as the sales transaction progresses, wherein said changes are instantly communicated to the second party, the first party and the at least one participating service provider; and means for facilitating closing of said real estate transaction without intervention by a human intermediary and without the need for in-person or telephonic correspondence outside the real estate website server comprising:
  means for providing direct messaging communications between the first party, the second party and the at least one participating service provider;
  means for signing documents using electronic signature;
  means for implementing offer-counteroffer exchanges between the second party and first party; and
  means for implementing addendum exchanges to agreements between the second party and first party.

13. The system of claim 12, where said first party is a property seller, said second party is a property buyer and the transaction is a real estate sales transaction.

14. The system of claim 12 wherein said property is a residential property or a commercial property and the disclosure forms relate to local legal requirements.

15. The system of claim 12, where said first party is a lessor, said second party is lessee and the transaction is a real estate leasing transaction.

16. The system of claim 12, further comprising an electronic document repository that both stores all transaction-related documents and manages the access, revisions and deletions of said documents.

17. The system of claim 12, wherein said at least one participating service provider is selected from the group consisting of a mortgage company, a title company, a painter, a mover, a landscaper, and an insurance company.

18. The system of claim 12, wherein said website server is utilized to facilitate is an auction.

\* \* \* \* \*